United States Patent
Sonobe et al.

(10) Patent No.: US 11,552,297 B2
(45) Date of Patent: Jan. 10, 2023

(54) BINDER COMPOSITION FOR LITHIUM ION SECONDARY BATTERY ELECTRODE-USE, SLURRY COMPOSITION FOR LITHIUM ION SECONDARY BATTERY ELECTRODE-USE, ELECTRODE FOR LITHIUM ION SECONDARY BATTERY-USE, AND LITHIUM ION SECONDARY BATTERY

(71) Applicant: ZEON CORPORATION, Tokyo (JP)

(72) Inventors: Kenya Sonobe, Tokyo (JP); Yusuke Adachi, Tokyo (JP); Takuya Kaneda, Tokyo (JP); Yasuhiro Isshiki, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 308 days.

(21) Appl. No.: 15/308,418

(22) PCT Filed: Jun. 4, 2015

(86) PCT No.: PCT/JP2015/002831
§ 371 (c)(1),
(2) Date: Nov. 2, 2016

(87) PCT Pub. No.: WO2015/186363
PCT Pub. Date: Oct. 12, 2015

(65) Prior Publication Data
US 2017/0062828 A1    Mar. 2, 2017

(30) Foreign Application Priority Data

Jun. 4, 2014 (JP) .............................. JP2014-115663
Jun. 30, 2014 (JP) .............................. JP2014-134964
Jun. 30, 2014 (JP) .............................. JP2014-135229

(51) Int. Cl.
| | |
|---|---|
| *H01M 4/62* | (2006.01) |
| *H01M 10/0566* | (2010.01) |
| *H01M 4/13* | (2010.01) |
| *C08L 33/02* | (2006.01) |
| *C08L 33/06* | (2006.01) |
| *C08L 33/26* | (2006.01) |
| *H01M 4/131* | (2010.01) |
| *H01M 4/133* | (2010.01) |
| *H01M 4/134* | (2010.01) |
| *H01M 4/38* | (2006.01) |
| *H01M 4/505* | (2010.01) |

(Continued)

(52) U.S. Cl.
CPC ............. *H01M 4/622* (2013.01); *C08L 33/02* (2013.01); *C08L 33/066* (2013.01); *C08L 33/26* (2013.01); *H01M 4/13* (2013.01); *H01M 4/131* (2013.01); *H01M 4/133* (2013.01); *H01M 4/134* (2013.01); *H01M 4/386* (2013.01); *H01M 4/505* (2013.01); *H01M 4/525* (2013.01); *H01M 4/587* (2013.01); *H01M 4/62* (2013.01); *H01M 10/0525* (2013.01); *H01M 10/0566* (2013.01); *C08L 2201/54* (2013.01); *C08L 2203/20* (2013.01); *H01M 2004/027* (2013.01); *H01M 2004/028* (2013.01)

(58) Field of Classification Search
CPC .... H01M 4/622; H01M 4/621; H01M 4/0466; H01M 4/13; H01M 4/131; H01M 4/133; H01M 4/134; H01M 4/505; H01M 4/525; H01M 4/587; H01M 4/62; H01M 10/0525; H01M 10/0566; H01M 2004/027; H01M 2004/028; H01M 4/623
See application file for complete search history.

(56) References Cited

U.S. PATENT DOCUMENTS

| | | | | |
|---|---|---|---|---|
| 3,926,869 A | * | 12/1975 | Horie ..................... | G03C 1/053 524/24 |
| 6,770,397 B1 | * | 8/2004 | Maeda .................. | H01M 4/621 252/182.1 |

(Continued)

FOREIGN PATENT DOCUMENTS

| | | |
|---|---|---|
| CN | 1328102 A | 12/2001 |
| CN | 103003991 A | 3/2013 |

(Continued)

OTHER PUBLICATIONS

Oct. 11, 2017, Extended European Search Report issued by the European Patent Office in the corresponding European Patent Application No. 15803646.7.

(Continued)

*Primary Examiner* — Sadie White
(74) *Attorney, Agent, or Firm* — Kenja IP Law PC

(57) ABSTRACT

Provided is a binder composition for lithium ion secondary battery electrode-use that reduces internal resistance of a lithium ion secondary battery while also providing the lithium ion secondary battery with excellent life characteristics. The binder composition contains a copolymer X and a solvent. The copolymer X is obtained from a monomer composition X that contains at least 20.0 mass % and no greater than 75.0 mass % of an ethylenically unsaturated carboxylic acid compound (A) composed of either or both of an ethylenically unsaturated carboxylic acid and an ethylenically unsaturated carboxylic acid salt, and at least 20.0 mass % and no greater than 75.0 mass % of a copolymerizable compound (B) that has an ethylenically unsaturated bond and a solubility of at least 7 g in 100 g of water at 20° C. The copolymer X has a degree of swelling in electrolysis solution of less than 120 mass %.

18 Claims, No Drawings

(51) Int. Cl.
*H01M 4/525* (2010.01)
*H01M 4/587* (2010.01)
*H01M 10/0525* (2010.01)
*H01M 4/02* (2006.01)

(56) References Cited

U.S. PATENT DOCUMENTS

| | | | |
|---|---|---|---|
| 6,881,517 B1 | 4/2005 | Kanzaki et al. | |
| 2004/0062989 A1* | 4/2004 | Ueno | H01G 9/038 429/217 |
| 2006/0257739 A1* | 11/2006 | Ryu | H01M 4/13 429/217 |
| 2007/0020525 A1* | 1/2007 | Kim | H01M 2/145 429/251 |
| 2007/0026313 A1 | 2/2007 | Sano | |
| 2008/0187838 A1* | 8/2008 | Le | H01M 4/1395 429/231.95 |
| 2009/0130368 A1* | 5/2009 | Beihoffer | B32B 27/12 428/68 |
| 2011/0281163 A1* | 11/2011 | Kasamatsu | H01M 4/133 429/213 |
| 2012/0258360 A1* | 10/2012 | Ogihara | H01M 4/1399 429/213 |
| 2012/0315541 A1* | 12/2012 | Sasaki | H01M 4/131 429/211 |
| 2013/0112928 A1 | 5/2013 | Omote et al. | |
| 2013/0202963 A1 | 8/2013 | Kim et al. | |
| 2013/0330622 A1* | 12/2013 | Sasaki | H01M 4/1395 252/182.1 |
| 2014/0038047 A1* | 2/2014 | Chung | H01M 4/622 252/182.1 |
| 2014/0147726 A1 | 5/2014 | Toyoda et al. | |
| 2014/0308565 A1* | 10/2014 | Lee | H01M 4/622 429/144 |
| 2014/0349185 A1* | 11/2014 | Momose | H01M 4/623 525/218 |
| 2015/0203722 A1 | 7/2015 | Naoki | |
| 2016/0118664 A1 | 4/2016 | Sonobe | |

FOREIGN PATENT DOCUMENTS

| | | | | |
|---|---|---|---|---|
| EP | 2432056 A1 | 3/2012 | | |
| EP | 2680349 A1 | 1/2014 | | |
| EP | 2908364 A1 | 8/2015 | | |
| JP | 2003123766 A | 4/2003 | | |
| JP | 2003268053 A | 9/2003 | | |
| JP | 2006210208 A | 8/2006 | | |
| JP | 2007035434 A | 2/2007 | | |
| JP | 2010182548 A | 8/2010 | | |
| JP | 2011204573 A | 10/2011 | | |
| JP | 2012009775 A | 1/2012 | | |
| JP | 2012064574 A | 3/2012 | | |
| JP | 2012142311 A | 7/2012 | | |
| JP | 2012151108 A | 8/2012 | | |
| JP | 2012204303 A | 10/2012 | | |
| JP | 2012234703 A | 11/2012 | | |
| JP | 2013062080 A | 4/2013 | | |
| JP | 2013131368 A | 7/2013 | | |
| JP | 2014203771 A | 10/2014 | | |
| KR | 1020110137109 A | 12/2011 | | |
| KR | 1020140018882 A | 2/2014 | | |
| WO | 2011001848 A1 | 1/2011 | | |
| WO | 2012008539 A1 | 1/2012 | | |
| WO | 2012115096 A1 | 8/2012 | | |
| WO | WO-2012115096 A1 * | 8/2012 | .......... | H01M 4/0404 |
| WO | 2013099990 A1 | 7/2013 | | |
| WO | 2014051043 A1 | 4/2014 | | |
| WO | 2014057993 A1 | 4/2014 | | |
| WO | 2014188734 A1 | 11/2014 | | |

OTHER PUBLICATIONS

Dec. 6, 2016, International Preliminary Report on Patentability issued in the International Patent Application No. PCT/JP2015/002831.

KJ Chemicals Corporation, DMAA Safety Data Sheet, created on Oct. 1, 1999, revised on Jul. 26, 2016.

Mar. 31, 2021, Communication pursuant to Article 94(3) EPC issued by the European Patent Office in the corresponding European Patent Application No. 15803646.7.

Sep. 7, 2020, Communication pursuant to Article 94(3) EPC issued by the European Patent Office in the corresponding European Patent Application No. 15803646.7.

Nov. 25, 2019, Communication pursuant to Article 94(3) EPC issued by the European Patent Office in the corresponding European Patent Application No. 15803646.7.

* cited by examiner

BINDER COMPOSITION FOR LITHIUM ION SECONDARY BATTERY ELECTRODE-USE, SLURRY COMPOSITION FOR LITHIUM ION SECONDARY BATTERY ELECTRODE-USE, ELECTRODE FOR LITHIUM ION SECONDARY BATTERY-USE, AND LITHIUM ION SECONDARY BATTERY

TECHNICAL FIELD

The present disclosure relates to a binder composition for lithium ion secondary battery electrode-use, a slurry composition for lithium ion secondary battery electrode-use, an electrode for lithium ion secondary battery-use, and a lithium ion secondary battery.

BACKGROUND

Lithium ion secondary batteries have characteristics such as compact size, light weight, high energy-density, and the ability to be repeatedly charged and discharged, and are used in a wide variety of applications. Consequently, in recent years, studies have been made to improve battery members such as electrodes for the purpose of achieving even higher lithium ion secondary battery performance.

An electrode for a lithium ion secondary battery generally includes a current collector and an electrode mixed material layer formed on the current collector. The electrode mixed material layer is formed, for example, by applying, onto the current collector, a slurry composition in which an electrode active material, a binder composition containing a binding material, and so forth are dispersed and/or dissolved in a dispersion medium, and drying the applied slurry composition.

In recent years, there have been attempts to improve binder compositions used in the formation of electrode mixed material layers in order to further improve the performance of secondary batteries such as lithium ion secondary batteries (for example, refer to PTL 1-5).

PTL 1 proposes a technique in which, with respect to a negative electrode in which a silicon-based negative electrode active material is used, a binder composition containing a specific non-crosslinking polyacrylic acid as a binding material is used in order to absorb and ease expansion and contraction of the silicon-based negative electrode active material, and thereby inhibit reduction in cycle characteristics of a lithium ion secondary battery.

PTL 2 proposes a technique in which a binder composition containing a crosslinking compound of a polyvinyl alcohol and an alkali cation-substituted polyacrylic acid is used in order to achieve electrode stability and excellent battery life characteristics.

PTL 3 reports that excellent close adherence and flexibility are exhibited by a binder composition containing a water-soluble polymer that includes a structural unit derived from an ethylenically unsaturated carboxylic acid ester monomer, such as ethyl acrylate, and a structural unit derived from an ethylenically unsaturated carboxylic acid salt monomer, and that exhibits a volume swelling rate with respect to an electrolysis solution of no greater than a specific value. PTL 3 also proposes a technique in which the aforementioned binder composition is used to form an electrode mixed material layer in order to ensure cycle characteristics of a secondary battery.

PTL 4 proposes a technique that enables efficient electrode production and improves cycle characteristics of a secondary battery by forming an electrode mixed material layer using a binder composition that contains a water-soluble resin obtained through polymerization of a monomer composition containing an unsaturated carboxylic acid salt and (meth)acrylamide, and also contains organic particles other than the water-soluble resin.

PTL 5 proposes a technique in which resistance of an electrode mixed material layer is reduced and cycle characteristics of a secondary battery are improved by forming the electrode mixed material layer using a binder composition containing a water-soluble polymer that is obtained through copolymerization of (meth)acrylic acid and a monomer copolymerizable with (meth)acrylic acid (for example, ethyl acrylate or butyl acrylate), and that has a (meth)acrylic acid content within a specific range.

CITATION LIST

Patent Literature

PTL 1: JP 2007-35434 A
PTL 2: JP 2012-64574 A
PTL 3: JP 2012-142311 A
PTL 4: JP 2012-151108 A
PTL 5: JP 2013-131368 A

SUMMARY

Technical Problem

However, it has not been possible to sufficiently inhibit reduction in life characteristics (cycle characteristics and preservation stability) of lithium ion secondary batteries using the conventional binder compositions described above. Moreover, in some instances it has not been possible to sufficiently reduce electrode mixed material layer resistance using these conventional binder compositions, and thus it has not been possible to provide lithium ion secondary batteries with sufficiently good rate characteristics.

Therefore, there is still room for improvement over these conventional binder compositions in terms of providing a lithium ion secondary battery with excellent life characteristics while also reducing internal resistance of the lithium ion secondary battery.

One objective of the present disclosure is to provide a binder composition for lithium ion secondary battery electrode-use that reduces internal resistance of a lithium ion secondary battery while also providing the lithium ion secondary battery with excellent life characteristics.

Another objective of the present disclosure is to provide a slurry composition for lithium ion secondary battery electrode-use that reduces internal resistance of a lithium ion secondary battery while also providing the lithium ion secondary battery with excellent life characteristics.

Yet another objective of the present disclosure is to provide an electrode that reduces internal resistance of a lithium ion secondary battery while also providing the lithium ion secondary battery with excellent life characteristics, and to provide a lithium ion secondary battery that has reduced internal resistance and excellent life characteristics.

Solution to Problem

The inventors conducted diligent investigation with the aim of solving the problems described above. As a result, the inventors discovered that by forming an electrode using a binder composition containing a copolymer that has a degree of swelling in electrolysis solution within a specific range and that is obtained through copolymerization of a monomer composition containing, with specific percentage contents, an ethylenically unsaturated carboxylic acid and/or an ethylenically unsaturated carboxylic acid salt, and a copolymerizable compound having an ethylenically unsaturated bond and a solubility of at least 7 g in 100 g of water at 20° C., a lithium ion secondary battery that includes the aforementioned electrode can be provided with excellent life characteristics and reduced internal resistance. This discovery led to the present disclosure.

Specifically, in order to advantageously solve the problems described above, a presently disclosed binder composition for lithium ion secondary battery electrode-use comprises a copolymer X and a solvent, wherein the copolymer X is obtained through polymerization of a monomer composition X; the monomer composition X contains an ethylenically unsaturated carboxylic acid compound (A) and a compound (B) that is copolymerizable and has an ethylenically unsaturated bond; the ethylenically unsaturated carboxylic acid compound (A) is composed of either or both of an ethylenically unsaturated carboxylic acid and an ethylenically unsaturated carboxylic acid salt; the compound (B) has a solubility of at least 7 g in 100 g of water at 20° C.; in the monomer composition X, a percentage content of the ethylenically unsaturated carboxylic acid compound (A) among all monomers is at least 20.0 mass % and no greater than 75.0 mass %, and a percentage content of the compound (B) among all monomers is at least 20.0 mass % and no greater than 75.0 mass %; and the copolymer X has a degree of swelling in electrolysis solution of less than 120 mass %. When an electrode is formed using the binder composition described above containing the copolymer X that has a degree of swelling in electrolysis solution of less than 120 mass % and that is obtained through polymerization of the monomer composition X containing the ethylenically unsaturated carboxylic acid compound (A) and the compound (B) with specific percentage contents, a lithium ion secondary battery that includes the aforementioned electrode can be provided with excellent life characteristics and reduced internal resistance.

In the presently disclosed binder composition for lithium ion secondary battery electrode-use, the monomer composition X preferably further contains a multifunctional compound (C) having a polyoxyalkylene structure and at least two ethylenically unsaturated bonds, and in the monomer composition X, a percentage content of the multifunctional compound (C) among all monomers is preferably at least 0.1 mass % and no greater than 20.0 mass %. As a result of the copolymer X being formed using the monomer composition X containing the multifunctional compound (C) with the percentage content described above, internal resistance of the lithium ion secondary battery can be further reduced and life characteristics of the lithium ion secondary battery can be further improved. Moreover, as a result of the multifunctional compound (C) being contained in the monomer composition, the solid content concentration of a slurry composition produced using the presently disclosed binder composition can be increased in order to improve electrode producibility.

In the presently disclosed binder composition for lithium ion secondary battery electrode-use, a value (A/B) obtained by dividing the percentage content of the ethylenically unsaturated carboxylic acid compound (A) among all monomers in the monomer composition X by the percentage content of the compound (B) among all monomers in the monomer composition X is preferably less than 1.5. In a situation in which the percentage contents of the ethylenically unsaturated carboxylic acid compound (A) and the compound (B) among all monomers satisfy the relationship described above, internal resistance of the lithium ion secondary battery can be further reduced because the copolymer X can maintain the separation between particles of an electrode active material without excessively swelling in an electrolysis solution, and can thereby ensure lithium ion conductivity.

In the presently disclosed binder composition for lithium ion secondary battery electrode-use, the copolymer X preferably has a lithium carboxylate group. In a situation in which the copolymer X has a lithium carboxylate group (—COOLi), internal resistance of the lithium ion secondary battery produced using the binder composition can be further reduced while also further improving life characteristics of the lithium ion secondary battery.

The presently disclosed binder composition for lithium ion secondary battery electrode-use preferably further comprises a water-soluble polymer Y having a degree of swelling in electrolysis solution of at least 120 mass %, wherein the copolymer X is preferably water-soluble. As a result of the copolymer X being water-soluble and the binder composition further containing the water-soluble polymer having a degree of swelling in electrolysis solution of at least 120 mass %, close adherence can be ensured between a current collector and an electrode mixed material layer formed using the binder composition, and lithium ion conductivity can be improved such as to further reduce internal resistance.

In the presently disclosed binder composition for lithium ion secondary battery electrode-use, a value (Y/X) obtained by dividing a blending amount of the water-soluble polymer Y by a blending amount of the copolymer X is preferably at least 0.01 and no greater than 0.5. In a situation in which the blending amounts of the copolymer X and the water-soluble polymer Y in the binder composition satisfy the relationship described above, close adherence can be ensured between a current collector and an electrode mixed material layer formed using the binder composition, and it is possible to avoid a situation in which production of a slurry composition using the binder composition becomes difficult due to excessively high viscosity. Moreover, life characteristics of the lithium ion secondary battery produced using the binder composition can be further improved.

In the presently disclosed binder composition for lithium ion secondary battery electrode-use, the water-soluble polymer Y is preferably obtained through polymerization of a monomer composition Y that contains a fluorine-containing monomer. In a situation in which the water-soluble polymer Y includes a structural unit derived from a fluorine-containing monomer, life characteristics of the lithium ion secondary battery can be further improved.

The presently disclosed binder composition for lithium ion secondary battery electrode-use preferably further comprises a particulate polymer Z, wherein the copolymer X is preferably water-soluble. As a result of the copolymer X being water-soluble and the binder composition further containing the particulate polymer Z, close adherence can be ensured between a current collector and an electrode mixed material layer formed using the binder composition, and lithium ion conductivity can be improved such as to further reduce internal resistance.

In the presently disclosed binder composition for lithium ion secondary battery electrode-use, a value (Z/X) obtained by dividing a blending amount of the particulate polymer Z by a blending amount of the copolymer X is preferably at least 0.05 and no greater than 3. In a situation in which the blending amounts of the copolymer X and the particulate polymer Z in the binder composition satisfy the relationship described above, close adherence can be ensured between a current collector and an electrode mixed material layer formed using the binder composition, and it is possible to avoid a situation in which production of a slurry composition using the binder composition becomes difficult due to excessively high viscosity. Moreover, life characteristics of the lithium ion secondary battery produced using the binder composition can be further improved.

In the presently disclosed binder composition for lithium ion secondary battery electrode-use, the particulate polymer Z preferably has a gel content of at least 85 mass % and no greater than 98 mass %. In a situation in which the gel content of the particulate polymer Z is in the aforementioned range, close adherence between a current collector and an electrode mixed material layer formed using the binder composition can be further improved, and internal resistance of the lithium ion secondary battery can be further reduced while also further improving life characteristics of the lithium ion secondary battery.

In the presently disclosed binder composition for lithium ion secondary battery electrode-use, the particulate polymer Z preferably has a degree of swelling in electrolysis solution of at least 140 mass % and less than 800 mass %. In a situation in which the degree of swelling in electrolysis solution of the particulate polymer Z is within the aforementioned range, internal resistance of the lithium ion secondary battery can be further reduced while also further improving cycle characteristics of the lithium ion secondary battery.

In the presently disclosed binder composition for lithium ion secondary battery electrode-use, the particulate polymer Z is preferably either or both of a styrene-butadiene-based polymer and an acrylic-based polymer. In a situation in which the binder composition contains a styrene-butadiene-based polymer and/or an acrylic-based polymer as the particulate polymer Z, close adherence can be ensured between a current collector and an electrode mixed material layer formed using the binder composition.

In order to advantageously solve the problems described above, a presently disclosed slurry composition for lithium ion secondary battery electrode-use comprises: any one of the binder compositions for lithium ion secondary battery electrode-use described above; and an electrode active material. As a result of the slurry composition being produced using any one of the binder compositions described above, a lithium ion secondary battery including an electrode that is produced using this slurry composition can be provided with excellent life characteristics and reduced internal resistance.

Furthermore, in order to advantageously solve the problems described above, a presently disclosed electrode for lithium ion secondary battery-use comprises: a current collector; and an electrode mixed material layer on the current collector, wherein the electrode mixed material layer is formed using the slurry composition for lithium ion secondary battery electrode-use described above. As a result of the electrode mixed material layer being formed using the previously described slurry composition, an electrode for lithium ion secondary battery-use can be obtained that provides a lithium ion secondary battery with excellent life characteristics while also reducing internal resistance of the lithium ion secondary battery.

In the presently disclosed electrode for lithium ion secondary battery-use, a degree of coating of the electrode active material calculated by formula (1) shown below is preferably at least 0.25 and no greater than 0.70.

$$\text{Degree of coating of electrode active material} = (\text{BET specific surface area of electrode active material} - \text{BET specific surface area of electrode}) / \text{BET specific surface area of electrode active material} \quad (1)$$

As a result of the degree of coating of the electrode active material being in the aforementioned range, internal resistance of the lithium ion secondary battery can be further reduced while also inhibiting lithium deposition on the electrode surface.

Moreover, in order to advantageously solve the problems described above, a presently disclosed lithium ion secondary battery comprises a positive electrode, a negative electrode, an electrolysis solution, and a separator, wherein either or both of the positive electrode and the negative electrode are the electrode for lithium ion secondary battery-use described above. Through use of the previously described electrode for lithium ion secondary battery-use in this manner, a lithium ion secondary battery can be provided that has reduced internal resistance and excellent life characteristics.

Advantageous Effect

According to the present disclosure, it is possible to provide a binder composition for lithium ion secondary battery electrode-use that reduces internal resistance of a lithium ion secondary battery while also providing the lithium ion secondary battery with excellent life characteristics.

Moreover, according to the present disclosure, it is possible to provide a slurry composition for lithium ion secondary battery electrode-use that reduces internal resistance of a lithium ion secondary battery while also providing the lithium ion secondary battery with excellent life characteristics.

Furthermore, according to the present disclosure, it is possible to provide an electrode that reduces internal resistance of a lithium ion secondary battery while also providing the lithium ion secondary battery with excellent life characteristics, and to provide a lithium ion secondary battery that has reduced internal resistance and excellent life characteristics.

DETAILED DESCRIPTION

The following provides a detailed description of embodiments of the present disclosure.

A presently disclosed binder composition for lithium ion secondary battery electrode-use is used in formation of an electrode for a lithium ion secondary battery. Moreover, a presently disclosed slurry composition for lithium ion secondary battery electrode-use contains the presently disclosed binder composition for lithium ion secondary battery electrode-use and is used in formation of an electrode for a lithium ion secondary battery. Furthermore, a presently disclosed electrode for lithium ion secondary battery-use can be produced using the presently disclosed slurry composition for lithium ion secondary battery electrode-use. Also, a presently disclosed lithium ion secondary battery includes the presently disclosed electrode for lithium ion secondary battery-use.

(Binder Composition for Lithium Ion Secondary Battery Electrode-Use)

The presently disclosed binder composition for lithium ion secondary battery electrode-use contains a binding material and a solvent. Moreover, the presently disclosed binder composition for lithium ion secondary battery electrode-use contains a copolymer X as the binding material. The copolymer X has a degree of swelling in electrolysis solution of less than 120 mass % and is obtained through polymerization of a monomer composition X containing, with specific percentage contents, an ethylenically unsaturated carboxylic acid compound (A) that is composed of either or both of an ethylenically unsaturated carboxylic acid and an ethylenically unsaturated carboxylic acid salt, and a compound (B) that is copolymerizable, has an ethylenically unsaturated bond, and has a solubility of at least 7 g in 100 g of water at 20° C.

<Binding Material>

The binding material is a component that, in a situation in which an electrode is produced by forming an electrode mixed material layer on a current collector using a slurry composition for lithium ion secondary battery electrode-use produced using the presently disclosed binder composition for lithium ion secondary battery electrode-use, can hold components in the electrode mixed material layer such that these components do not become detached from the electrode mixed material layer.

The binding material of the presently disclosed binder composition for lithium ion secondary battery electrode-use is required to include the copolymer X that is obtained through polymerization of the monomer composition X containing the ethylenically unsaturated carboxylic acid compound (A) and the compound (B) with specific percentage contents.

The presently disclosed binder composition for lithium ion secondary battery electrode-use may optionally further contain polymers other than the copolymer X as the binding material (for example, a water-soluble polymer Y and a particulate polymer Z described further below). In other words, the presently disclosed binder composition may contain a binding material composed of only the copolymer X, a binding material in which the copolymer X and the water-soluble polymer Y are combined, a binding material in which the copolymer X and the particulate polymer Z are combined, or a binding material in which the copolymer X, the water-soluble polymer Y, and the particulate polymer Z are combined.

As a result of the presently disclosed binder composition for lithium ion secondary battery electrode-use containing the copolymer X that has a degree of swelling in electrolysis solution of less than 120 mass % and that is obtained through polymerization of the monomer composition X containing the ethylenically unsaturated carboxylic acid compound (A) and the compound (B) with specific percentage contents, a lithium ion secondary battery can be provided with excellent life characteristics while also reducing internal resistance of the lithium ion secondary battery by using the presently disclosed binder composition in production of an electrode.

Although it has not yet been clarified why internal resistance of a lithium ion secondary battery can be reduced and life characteristics of a lithium ion secondary battery can be improved through inclusion of the copolymer X, the main reasons for these effects are thought to be as follows. Specifically, the compound (B) has high solubility in water and is thus a highly polar monomer. Consequently, the resultant copolymer X has low affinity with respect to an electrolysis solution that is typically used in a lithium ion secondary battery and, as a result, swelling of the copolymer X in the electrolysis solution is suppressed to an appropriate level (i.e., to less than 120 mass %). It is presumed that, accordingly, the structure of an electrode plate is preserved and electrode expansion is suppressed, leading to improvement of life characteristics such as cycle characteristics. On the other hand, a carboxyl group of the ethylenically unsaturated carboxylic acid compound (A) improves lithium ion conductivity, reduces lithium ion secondary battery internal resistance, and improves lithium ion secondary battery cycle characteristics. Furthermore, it is presumed that the carboxyl group of the ethylenically unsaturated carboxylic acid compound (A) contributes to the copolymer X appropriately coating an electrode active material. Appropriate coating of the electrode active material improves preservation stability by inhibiting electrolysis solution decomposition at the surface of the electrode active material and suppressing gas production.

[Copolymer X]

The copolymer X that is used as a binding material in the presently disclosed binder composition for lithium ion secondary battery electrode-use is obtained through polymerization of the monomer composition X, which is described below in detail. In the copolymer X, the ratio of structural units that are derived from monomers contained in the monomer composition X is normally the same as the ratio in which these monomers are present in the monomer composition X.

[[Monomer Composition X]]

The monomer composition X used in production of the copolymer X contains, for example, monomers, additives, such as a polymerization initiator, and a polymerization solvent. Moreover, the monomer composition X contains the ethylenically unsaturated carboxylic acid compound (A) and the compound (B) with specific percentage contents as the aforementioned monomers. Specifically, the monomer composition X contains at least 20.0 mass % and no greater than 75.0 mass % of the ethylenically unsaturated carboxylic acid compound (A) and contains at least 20.0 mass % and no greater than 75.0 mass % of the compound (B), where the amount of all monomers in the monomer composition X is taken to be 100 mass %. Furthermore, the monomer composition X may optionally contain, as monomers, a multi-functional compound (C) that is copolymerizable with the ethylenically unsaturated carboxylic acid compound (A) and the compound (B), and compounds other than those described above.

—Ethylenically Unsaturated Carboxylic Acid Compound (A)—

The ethylenically unsaturated carboxylic acid compound (A) can be either or both of an ethylenically unsaturated carboxylic acid and an ethylenically unsaturated carboxylic acid salt. Examples of ethylenically unsaturated carboxylic acids that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids. Examples of ethylenically unsaturated carboxylic acid salts that can be used include sodium salts, potassium salts, and lithium salts of ethylenically unsaturated carboxylic acids.

One type of ethylenically unsaturated carboxylic acid or ethylenically unsaturated carboxylic acid salt may be used individually, or two or more types of ethylenically unsaturated carboxylic acids and/or ethylenically unsaturated carboxylic acid salts may be used in combination in a freely selected ratio.

Examples of ethylenically unsaturated monocarboxylic acids that can be used include acrylic acid, methacrylic acid, and crotonic acid. Examples of derivatives of ethylenically unsaturated monocarboxylic acids that can be used include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids that can be used include maleic acid, fumaric acid, and itaconic acid. Examples of acid anhydrides of ethylenically unsaturated dicarboxylic acids that can be used include maleic anhydride, diacrylic acid anhydride, methyl maleic anhydride, and dimethyl maleic anhydride. Examples of derivatives of ethylenically unsaturated dicarboxylic acids that can be used include methylmaleic acid, dimethylmaleic acid, phenylmaleic acid, chloromaleic acid, dichloromaleic acid, and fluoromaleic acid.

In the presently disclosed binder composition for lithium ion secondary battery electrode-use, an ethylenically unsaturated carboxylic acid salt can be used as the ethylenically unsaturated carboxylic acid compound (A), with a lithium salt of an ethylenically unsaturated carboxylic acid being preferable. The water-solubility of the resultant copolymer X can be increased through use of an ethylenically unsaturated carboxylic acid salt. Consequently, in a situation in which the copolymer X is produced using water as a polymerization solvent, it is possible to prevent polymerization from progressing inhomogeneously due to precipitation of the copolymer X, even if the monomer concentration of the monomer composition X is high. Accordingly, polymerization can be caused to progress homogeneously while achieving high producibility through use of a monomer composition X that has a high monomer concentration. Moreover, when a lithium salt of an ethylenically unsaturated carboxylic acid is used, life characteristics of a lithium ion secondary battery can be further improved while also further reducing internal resistance of the lithium ion secondary battery as a result of slurry composition stability being improved due to introduction of a lithium carboxylate group (—COOLi) into the resultant copolymer X.

From a viewpoint of further improving cycle characteristics and reducing internal resistance of a lithium ion secondary battery that includes an electrode produced using the presently disclosed binder composition, the ethylenically unsaturated carboxylic acid compound (A) is preferably acrylic acid, methacrylic acid, an acrylic acid salt, or a methacrylic acid salt, and is more preferably acrylic acid or an acrylic acid salt.

The percentage content of the ethylenically unsaturated carboxylic acid compound (A) among monomers contained in the monomer composition X used in production of the copolymer X is required to be at least 20.0 mass % and no greater than 75.0 mass %. Moreover, the percentage content of the ethylenically unsaturated carboxylic acid compound (A) among these monomers is preferably at least 21.0 mass % and more preferably at least 22.0 mass %, and is preferably no greater than 72.0 mass %, more preferably no greater than 50.0 mass %, and further preferably no greater than 45.0 mass %. If the percentage content of the ethylenically unsaturated carboxylic acid compound (A) among the monomers is less than 20.0 mass %, rigidity of the copolymer X is reduced, electrode expansion cannot be sufficiently suppressed, and lithium ion secondary battery cycle characteristics are reduced. On the other hand, if the percentage content of the ethylenically unsaturated carboxylic acid compound (A) among the monomers is greater than 75.0 mass %, the copolymer X becomes excessively rigid, and as a result becomes brittle, and cracks may occur in a coating of an electrode active material that is formed by the copolymer X. As a result, a new interface of the electrode active material is created, leading to gas production or the like, which causes a decrease in lithium ion secondary battery preservation stability.

—Compound (B)—

The compound (B) is a copolymerizable compound that has an ethylenically unsaturated bond and a solubility of at least 7 g in 100 g of water at 20° C. The reason for this is that a structural unit derived from the compound (B) having the solubility described above exhibits low swelling with respect to an electrolysis solution and exhibits high polymerizability when water is used as a polymerization solvent. In the present disclosure, even when an ethylenically unsaturated carboxylic acid or an ethylenically unsaturated carboxylic acid salt satisfies the solubility described above, the ethylenically unsaturated carboxylic acid or ethylenically unsaturated carboxylic acid salt is considered to be included in the ethylenically unsaturated carboxylic acid compound (A) and not in the compound (B).

Examples of the compound (B) include compounds having an ethylenically unsaturated bond and a high polarity functional group (for example, a hydroxy group, an amide group, a nitrile group, a phosphate group, or an amino group) such as 2-hydroxypropyl methacrylate (100 or greater), 2-hydroxypropyl acrylate (100 or greater), 2-hydroxyethyl methacrylate (100 or greater), 2-hydroxyethyl acrylate (100 or greater), 2-(methacryloyloxy)ethyl phosphate (100 or greater), acrylamide (100 or greater), methacrylamide (100 or greater), N-methylolacrylamide (100 or greater), acrylonitrile (7.3), and sodium styrenesulfonate (22); and ethylene glycol dimethacrylate (100 or greater). One of these compounds may be used individually, or two or more of these compounds may be used in combination in a freely selected ratio. Note that the numbers shown above in parentheses indicate the water solubility (units: g/100 g) at a temperature of 20° C. The water solubility at a temperature of 20° C. can be measured by the EPA method (EPA Chemical Fate Testing Guideline CG-1500 Water Solubility).

If the copolymer X is produced using a compound having a water solubility of less than 7 g at 20° C., such as methyl acrylate (6), ethyl acrylate (2), or butyl acrylate (2), instead of the compound (B), the copolymer X swells excessively in an electrolysis solution such that the structure of an electrode plate cannot be preserved and electrode expansion cannot be suppressed. Consequently, lithium ion secondary battery life characteristics, such as cycle characteristics, cannot be ensured.

From a viewpoint of suppressing expansion of an electrode plate in an electrolysis solution, further reducing internal resistance, and, as a result, further improving lithium ion secondary battery cycle characteristics, the compound (B) is preferably 2-hydroxyethyl acrylate, acrylamide, N-methylolacrylamide, or acrylonitrile, and is more preferably 2-hydroxyethyl acrylate or acrylamide.

2-Hydroxyethyl acrylate is more preferable from a viewpoint of ensuring close adherence between a current collector and an electrode mixed material layer that is formed using the presently disclosed binder composition.

The percentage content of the above-described compound (B) among monomers contained in the monomer composition X used in production of the copolymer X is required to be at least 20.0 mass % and no greater than 75.0 mass %. The percentage content of the compound (B) among these monomers is preferably at least 30.0 mass %, more preferably at least 35.0 mass %, further preferably at least 48.0 mass %, particularly preferably at least 50.0 mass %, and most preferably at least 55.0 mass %, and is preferably no greater than 74.0 mass %. If the percentage content of the compound (B) among the monomers is less than 20.0 mass %, an electrode plate becomes excessively brittle and it may not be possible to preserve the structure of the electrode plate due to formation of cracks or the like. Consequently, cycle characteristics are reduced and preservation stability is also reduced. Moreover, it may not be possible to sufficiently reduce lithium ion secondary battery internal resistance. On the other hand, if the percentage content of the compound (B) among the monomers is greater than 75.0 mass %, lithium ion secondary battery cycle characteristics are reduced since it is not possible to sufficiently suppress electrode expansion.

A value (A/B) obtained by dividing the percentage content of the ethylenically unsaturated carboxylic acid compound (A) among the monomers by the percentage content of the compound (B) among the monomers is preferably less than 1.5, more preferably no greater than 1.0, and further preferably no greater than 0.8, and is preferably at least 0.2 and more preferably at least 0.3.

As a result of A/B being less than 1.5, lithium ion secondary battery internal resistance can be further reduced because the copolymer X maintains the separation between particles of an electrode active material and ensures lithium ion conductivity, without swelling excessively in an electrolysis solution.

Moreover, reduction of lithium ion secondary battery internal resistance and improvement of lithium ion secondary battery cycle characteristics can be achieved in a good balance as a result of A/B being in the aforementioned range.

—Multifunctional Compound (C)—

The monomer composition X preferably contains a multifunctional compound (C) having a polyoxyalkylene structure and at least two ethylenically unsaturated bonds as a monomer. As a result of the multifunctional compound (C) being used in polymerization of the copolymer X, the copolymer X can be provided with suitably high levels of rigidity and flexibility. Accordingly, electrode plate expansion caused by charging and discharging can be suppressed so as to inhibit reduction of cycle characteristics. Moreover, an ethyleneoxide chain, which has high affinity with water, helps to facilitate polymerization of the copolymer X. Furthermore, lithium ion conductivity can be ensured and lithium ion secondary battery internal resistance can be reduced. Also, as a result of the multifunctional compound (C) being contained in the monomer composition X, the solid content concentration of a slurry composition produced using the presently disclosed binder composition can be increased, and thus electrode producibility can be improved.

Herein, the multifunctional compound (C) may be a compound having a polyoxyalkylene structure represented by a general formula: —$(C_mH_{2m}O)_n$— (in the formula, m is an integer of greater than or equal to 1 and n is an integer of greater than or equal to 2), and at least two ethylenically unsaturated bonds.

One type of compound having a polyoxyalkylene structure and at least two ethylenically unsaturated bonds may be used individually, or two or more types of such compounds may be used in combination in a freely selected ratio.

Note that in the present disclosure, a compound that is equivalent to the multifunctional compound (C) is a compound that is not included in the compound (B).

The multifunctional compound (C) is for example a poly(meth)acrylate of a polyol having a polyoxyalkylene structure. Specific examples of multifunctional compounds that can be used include, but are not specifically limited to, compounds (I) to (V) shown below.

In the present disclosure, "(meth)acrylate" is used to indicate "acrylate" and/or "methacrylate".

(I) A polyethylene glycol diacrylate represented by the following general formula

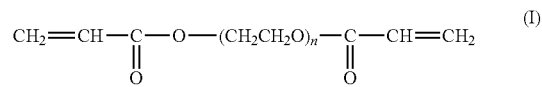

(in the formula, n represents an integer of greater than or equal to 2).

(II) A polytetramethylene glycol diacrylate represented by the following general formula

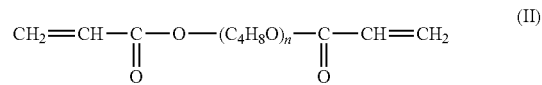

(in the formula, n represents an integer of greater than or equal to 2).

(III) An ethoxylated bisphenol A diacrylate represented by the following general formula

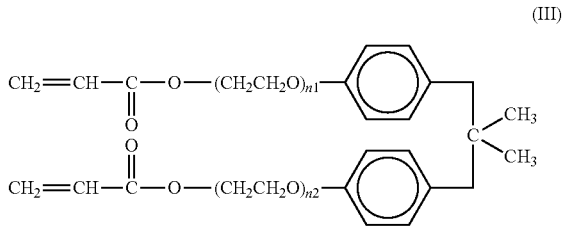

(in the formula, n1 and n2 are integers of greater than or equal to 2 that may be the same or different).

(IV) An ethoxylated glycerin triacrylate represented by the following general formula

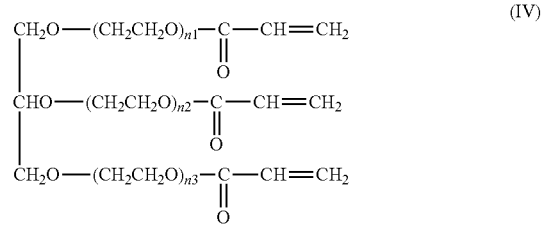

(in the formula, n1, n2, and n3 are integers of greater than or equal to 2 that may be the same or different).

(V) An ethoxylated pentaerythritol tetraacrylate represented by the following general formula

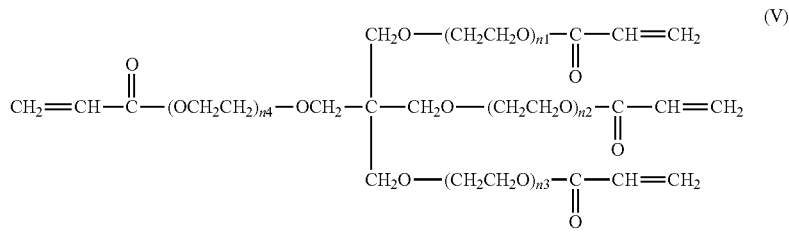

(in the formula, n1, n2, n3, and n4 are integers of greater than or equal to 2 that may be the same or different).

From a viewpoint of ease of polymerization of the copolymer X and ability to increase the solid content concentration of a slurry composition produced using the presently disclosed binder composition in order to improve electrode producibility, the number of ethylenically unsaturated bonds in the multifunctional compound (C) (i.e., the functionality of the multifunctional compound (C)) is preferably at least 2 and no greater than 6, and more preferably at least 2 and no greater than 4.

Moreover, from a viewpoint of improving electrode producibility, the multifunctional compound (C) is preferably a polyacrylate having a functionality of 2-6 and more preferably a polyacrylate having a functionality of 2-4.

Furthermore, from a viewpoint of further improving stability of a slurry composition produced using the presently disclosed binder composition and preservation stability of a lithium ion secondary battery, the integer m in the polyoxyalkylene structure ($-(C_mH_{2m}O)_n-$) of the multifunctional compound (C) is preferably no greater than 20, more preferably no greater than 15, and particularly preferably no greater than 10, and is preferably at least 2. Slurry composition stability may be reduced if the integer m is excessively large. On the other hand, rigidity of the copolymer X may be increased and preservation stability of a lithium ion secondary battery may be reduced if the integer m is excessively small.

For the same reasons as described above, the integer n in the polyoxyalkylene structure ($-(C_mH_{2m}O)_n-$) of the multifunctional compound (C) is preferably no greater than 20, more preferably no greater than 15, and particularly preferably no greater than 10, and is preferably at least 2, more preferably at least 3, and particularly preferably at least 4. Slurry composition stability may be reduced if the integer n is excessively large. On the other hand, rigidity of the copolymer may be increased and preservation stability of a lithium ion secondary battery may be reduced if the integer n is excessively small. In a situation in which a plurality of polyoxyalkylene structures ($-(C_mH_{2m}O)_n-$) are included in molecules of the multifunctional compound (C), it is preferable that an average value of the integer n for the plurality of polyoxyalkylene structures is within the aforementioned range, and it is more preferable that the integer n is within the aforementioned range for every one of the polyoxyalkylene structures.

The percentage content of the above-described multifunctional compound (C) among monomers contained in the monomer composition X used in production of the copolymer X is preferably at least 0.1 mass %, more preferably at least 0.3 mass %, further preferably at least 0.5 mass %, and particularly preferably at least 1.0 mass %, and is preferably no greater than 20.0 mass %, more preferably no greater than 10.0 mass %, and further preferably no greater than 5.0 mass %. As a result of the percentage content of the multifunctional compound (C) among the monomers being at least 0.1 mass %, electrode expansion can be sufficiently suppressed and lithium ion secondary battery cycle characteristics can be further improved. On the other hand, as a result of the percentage content of the multifunctional compound (C) among the monomers being no greater than 20.0 mass %, it is possible to prevent the copolymer X from becoming excessively rigid, and thus becoming brittle, and, as a result, it is possible to inhibit reduction in lithium ion secondary battery preservation stability caused by gas production or the like.

—Other Compounds—

The monomer composition X may contain other known compounds that are copolymerizable with the ethylenically unsaturated carboxylic acid compound (A), the compound (B), and the multifunctional compound (C) described above. The percentage content of compounds other than compounds (A), (B), and (C) among the monomers contained in the monomer composition X used in production of the copolymer X is preferably no greater than 20 mass % and more preferably no greater than 10 mass %.

Specific examples of other compounds that can be used include acrylic acid esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, nonyl acrylate, decyl acrylate, lauryl acrylate, n-tetradecyl acrylate, stearyl acrylate, perfluoroalkyl ethyl acrylates, and phenyl acrylate; methacrylic acid esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, nonyl methacrylate, decyl methacrylate, lauryl methacrylate, n-tetradecyl methacrylate, stearyl methacrylate, perfluoroalkyl ethyl methacrylates, and phenyl methacrylate; and other compounds such as vinyl acetate, glycidyl methacrylate, and 2-vinylpyridine.

—Additives—

Examples of additives that may be blended into the monomer composition X include known additives that can be used in a polymerization reaction. Specific examples include polymerization initiators such as potassium persulfate and polymerization accelerators such as tetramethylethylenediamine. The type and blending amount of such additives may be freely selected depending on the polymerization method and so forth.

—Polymerization Solvent—

The polymerization solvent blended into the monomer composition X may be a known solvent in which the monomers described above can be dissolved or dispersed, and may be selected in accordance with the polymerization method and so forth. Of such solvents, water is preferable as the polymerization solvent. Moreover, the polymerization solvent may be an aqueous solution of a freely selected compound or a mixed solution of water and a small amount of an organic medium.

[[Production of Copolymer X]]

The copolymer X that is used as a binding material in the presently disclosed binder composition can be obtained, for example, through radical polymerization of the monomer composition X, which is obtained by mixing the previously described monomers, additives, and polymerization solvent by a known method. A solution containing the copolymer X and the polymerization solvent that is obtained as a result of polymerization of the monomer composition X may be used as-produced as the binder composition, or may be used as the binder composition after undergoing solvent substitution, addition of optional components, or the like.

The polymerization method may be a commonly known polymerization method such as aqueous solution polymerization, slurry polymerization, suspension polymerization, or emulsion polymerization. However, aqueous solution polymerization using water as the polymerization solvent is preferable in terms that a solvent removal process is not required, solvent safety is high, and there are no issues related to mixing in of a surfactant. Aqueous solution polymerization is a method in which a monomer composition is adjusted to a specific concentration and sufficient purging of dissolved oxygen in the reaction system with an inert gas is performed prior to carrying out a polymerization reaction by adding a radical polymerization initiator and performing heating or light irradiation with ultraviolet light or the like as necessary.

In a situation in which water is used as the polymerization solvent and the above-described monomer composition X is polymerized in water to produce an aqueous solution containing the copolymer X, the pH of the aqueous solution is preferably adjusted to a pH of at least 8 and no greater than 9 after the polymerization. As a result of the resultant aqueous solution being neutralized through adjustment to a pH of 8-9, the slurry composition can be provided with thixotropy, stability of the slurry composition can be increased, and preservation stability of a lithium ion secondary battery can be further improved.

In a situation in which the monomer composition X that is used contains an ethylenically unsaturated carboxylic acid as the ethylenically unsaturated carboxylic acid compound (A), it is preferable that the neutralization of the resultant aqueous solution is performed using a basic lithium compound. Through use of the basic lithium compound, a carboxylic acid group in the copolymer X is converted to a lithium carboxylate group (—COOLi), which further improves thixotropy and stability of the slurry composition, and reduces lithium ion secondary battery internal resistance while also improving lithium ion secondary battery life characteristics. The basic lithium compound may for example be lithium carbonate ($Li_2CO_3$) or lithium hydroxide (LiOH), and is preferably lithium hydroxide.

[[Properties of Copolymer X]]

The degree of swelling in electrolysis solution of the copolymer X, which is produced as described above and is used as a binding material in the presently disclosed binder composition, is required to be less than 120 mass %, is preferably less than 115% and more preferably less than 110 mass %, and is preferably at least 100 mass %, more preferably at least 103 mass %, and further preferably at least 105 mass %. If the degree of swelling in electrolysis solution is 120 mass % or greater, the copolymer X swells excessively in an electrolysis solution such that the structure of an electrode plate cannot be preserved and life characteristics are reduced. On the other hand, lithium ion conductivity can be ensured and lithium ion secondary battery internal resistance can be further reduced through the degree of swelling in electrolysis solution being at least 100 mass %. Moreover, flexibility of the copolymer X can be ensured, cracking and peeling of the copolymer X can be inhibited, and preservation stability of a lithium ion secondary battery can be further increased.

The degree of swelling in electrolysis solution of the copolymer X can be measured by the method described in the examples section of the present specification. Furthermore, the degree of swelling in electrolysis solution of the copolymer X can be adjusted by changing the types and amounts of the ethylenically unsaturated carboxylic acid compound (A) and the compound (B) in the monomer composition X.

It is preferable the copolymer X is present as a water-soluble polymer after pH adjustment.

Herein, when a polymer is referred to as "water-soluble", this means that when 1 part by mass (solid content equivalent) of the polymer is added to 100 parts by mass of deionized water and is stirred to obtain a mixture that is then adjusted to a temperature of at least 20° C. and no higher than 70° C. and a pH of at least 3 and no greater than 12 (pH adjustment is performed using NaOH aqueous solution and/or HCl aqueous solution), and is caused to pass through a 250 mesh screen, the mass of solid content that remains as a residue on the screen without passing through does not exceed 50 mass % of the solid content of the initially added polymer (note that this result is obtained for at least one set of conditions that satisfy the aforementioned temperature and pH ranges).

Note that insoluble content remaining when the copolymer X is dissolved in water may become a contaminant when a slurry composition or an electrode is produced. Particularly in the case of an electrode, the insoluble content may become a voltage concentration point and cause lithium deposition or the like.

[Water-Soluble Polymer Y]

The presently disclosed binder composition for lithium ion secondary battery electrode-use may further contain, as a binding material, a water-soluble polymer Y having a degree of swelling in electrolysis solution of at least 120 mass %.

Close adherence between an electrode mixed material layer and a current collector can be ensured as a result of the water-soluble polymer Y being used in addition to the previously described copolymer X. Moreover, since the water-soluble polymer Y exhibits an appropriate degree of swelling in electrolysis solution, the water-soluble polymer Y can contribute to improving lithium ion conductivity and reducing internal resistance while also ensuring close adherence as described above.

Moreover, since the copolymer X and the water-soluble polymer Y enable formation of an electrode mixed material layer that has low resistance, excellent close adherence with a current collector, and suppressed expansion, it is presumed that, as a result, further reduction of internal resistance and improvement of life characteristics of a lithium ion secondary battery can be achieved.

The structure of the water-soluble polymer Y is not limited so long as the water-soluble polymer Y is water-soluble and has a degree of swelling in electrolysis solution of at least 120 mass %.

The water-soluble polymer Y can for example be, but is not specifically limited to, a polymer that is obtained through polymerization of a monomer composition Y described below. The ratio of structural units in the water-soluble polymer Y that are derived from monomers contained in the monomer composition Y is normally the same as the ratio in which these monomers are present in the monomer composition Y.

[[Monomer Composition Y]]

The monomer composition Y used in production of the water-soluble polymer Y contains, for example, one or more monomers, additives, such as a polymerization initiator, and a polymerization solvent. The monomer composition Y preferably contains a fluorine-containing monomer as a monomer. As a result of the monomer composition Y containing the fluorine-containing monomer, life characteristics of a lithium ion secondary battery that is produced using the binder composition containing the resultant water-soluble polymer Y can be further improved. Besides the fluorine-containing monomer, the monomer composition Y preferably contains an acidic group-containing monomer and a (meth)acrylic acid ester monomer. Furthermore, the monomer composition Y may further contain other compounds as monomers besides the fluorine-containing monomer, the acidic group-containing monomer, and the (meth) acrylic acid ester monomer.

In the present description, "(meth)acryl" is used to indicate "acryl" and/or "methacryl".

—Fluorine-Containing Monomer—

Examples of the fluorine-containing monomer used in production of the water-soluble polymer Y include a fluorine-containing (meth)acrylic acid ester monomer.

The fluorine-containing (meth)acrylic acid ester monomer may for example be a monomer represented by formula (VI) shown below.

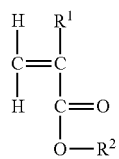

(VI)

In formula (VI), $R^1$ represents a hydrogen atom or a methyl group.

$R^2$ in formula (VI) represents a fluorine atom-containing hydrocarbon group. The carbon number of the hydrocarbon group is normally at least 1 and no greater than 18. The number of fluorine atoms contained in $R^2$ may be one, or may alternatively be two or more.

Examples of the fluorine-containing (meth)acrylic acid ester monomer represented by formula (VI) include fluoroalkyl (meth)acrylates, fluoroaryl (meth)acrylates, and fluoroaralkyl (meth)acrylates. Of these fluorine-containing (meth)acrylic acid ester monomers, fluoroalkyl (meth)acrylates are preferable. Specific examples of monomers such as described above include perfluoroalkyl esters of (meth) acrylic acid such as 2,2,2-trifluoroethyl (meth)acrylate, β-(perfluorooctyl)ethyl (meth)acrylate, 2,2,3,3-tetrafluoropropyl (meth)acrylate, 2,2,3,4,4,4-hexafluorobutyl (meth) acrylate, 1H,1H,9H-perfluoro-1-nonyl (meth)acrylate, 1H,1H,11H-perfluoroundecyl (meth)acrylate, perfluorooctyl (meth)acrylate, trifluoromethyl (meth)acrylate, and 3 [4{1-trifluoromethyl-2,2-bis[bi s(trifluoromethyl)fluoromethyl] ethynyloxy}b enzooxy]2-hydroxypropyl (meth)acrylate.

One of these monomers may be used individually, or two or more of these monomers may be used in combination. Of these monomers, 2,2,2-trifluoroethyl methacrylate is preferable.

The percentage content of the above-described fluorine-containing monomer among monomers contained in the monomer composition Y used in production of the water-soluble polymer Y is preferably at least 2 mass % and more preferably at least 5 mass %, and is preferably no greater than 15 mass % and more preferably no greater than 10 mass %. As a result of the monomer composition Y containing the fluorine-containing monomer in an amount within the aforementioned range, it is possible to further improve life characteristics of a lithium ion secondary battery that is produced using the binder composition containing the resultant water-soluble polymer Y.

—Acidic Group-Containing Monomer—

No specific limitations are placed on the acidic group-containing monomer used in production of the water-soluble polymer Y other than being a monomer that has an acidic group and that is copolymerizable with the previously described fluorine-containing monomer, (meth)acrylic acid ester monomer, and so forth. Examples of the acidic group include a carboxyl group (—COOH), a sulfuric acid group (—$SO_3H$), and a phosphoric acid group (—$PO_3H_2$). The acidic group-containing monomer is preferably a carboxyl group-containing monomer. Examples of the carboxyl group-containing monomer include the same examples as previously described for the "ethylenically unsaturated carboxylic acid compound (A)" in the "Copolymer X" section. Of these carboxyl group-containing monomers, methacrylic acid is preferable.

One type of acidic group-containing monomer may be used individually, or two or more types of acidic group-containing monomers may be used in combination.

The percentage content of the above-described acidic group-containing monomer among monomers contained in the monomer composition Y used in production of the water-soluble polymer Y is preferably at least 20 mass %, more preferably at least 25 mass %, and further preferably at least 30 mass %, and is preferably no greater than 50 mass %, more preferably no greater than 45 mass %, and further preferably no greater than 40 mass %.

—(Meth)Acrylic Acid Ester Monomer—

Examples of the (meth)acrylic acid ester monomer used in production of the water-soluble polymer Y include alkyl acrylates such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, and 2-ethylhexyl acrylate; and alkyl methacrylates such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, and 2-ethylhexyl methacrylate. One of these (meth)acrylic acid ester monomers may be used individually, or two or more of these (meth)acrylic acid ester monomers may be used in combination. Of these (meth)acrylic acid ester monomers, ethyl acrylate is preferable.

The percentage content of the above-described (meth) acrylic acid ester monomer among monomers contained in the monomer composition Y used in production of the water-soluble polymer Y is preferably at least 40 mass % and more preferably at least 45 mass %, and is preferably no greater than 90 mass %, more preferably no greater than 80 mass %, and further preferably no greater than 70 mass %.

—Other Compounds—

Examples of other compounds that can be used include monomers that are copolymerizable with the monomers described above. Specific examples of other compounds that can be used include hydroxyl group-containing monomers such as 2-hydroxyethyl acrylate, 2-hydroxypropyl acrylate, 2-hydroxyethyl methacrylate, and 2-hydroxypropyl methacrylate; sulfuric acid ester group-containing monomers such as acrylamido-2-methylpropane sulfonic acid; amide group-containing monomers such as acrylamide and methacrylamide; crosslinking monomers (crosslinkable monomers) such as allyl glycidyl ether, allyl (meth)acrylate, N-methylolacrylamide, and ethylene di(meth)acrylate; styrene-based monomers such as styrene, chlorostyrene, vinyltoluene, t-butylstyrene, methyl vinylbenzoate, vinylnaphthalene, chloromethylstyrene, α-methylstyrene, and divinyl benzene; olefins such as ethylene and propylene; diene monomers such as butadiene and isoprene; halogen atom-containing monomers such as vinyl chloride and vinylidene chloride; vinyl esters such as vinyl acetate, vinyl propionate, vinyl butyrate, and vinyl benzoate; vinyl ethers such as methyl vinyl ether, ethyl vinyl ether, and butyl vinyl ether; vinyl ketones such as methyl vinyl ketone, ethyl vinyl ketone, butyl vinyl ketone, hexyl vinyl ketone, and isopropenyl vinyl ketone; heterocycle-containing vinyl compounds such as N-vinylpyrrolidone, vinylpyridine, and vinylimidazole; and amino group-containing monomers such as aminoethyl vinyl ether and dimethylaminoethyl vinyl ether. One of these other compounds may be used individually, or two or more of these other compounds may be used in combination.

Although no specific limitations are placed on the percentage content of the other compounds described above among monomers contained in the monomer composition Y used in production of the water-soluble polymer Y, the percentage content of these other compounds is preferably no greater than 40 mass % and more preferably no greater than 30 mass %.

Furthermore, the percentage content of the aforementioned crosslinking monomer, such as ethylene dimethacrylate, among monomers contained in the monomer composition Y used in production of the water-soluble polymer Y is preferably at least 0.1 mass % and more preferably at least 0.2 mass %, and is preferably no greater than 2.5 mass % and more preferably no greater than 2 mass %.

—Additives and Polymerization Solvent—

The additives and polymerization solvent that are blended into the monomer composition Y used in production of the water-soluble polymer Y are not specifically limited, and may for example be the same as those previously described in the "Copolymer X" section.

[[Production of Water-Soluble Polymer Y]]

The water-soluble polymer Y used as a binding material in the presently disclosed binder composition can for example be produced by the same method as described in the "Copolymer X" section using the monomer composition Y, which is obtained by mixing the monomers, additives, and polymerization solvent described above by a known method.

[[Properties of Water-Soluble Polymer Y]]

The degree of swelling in electrolysis solution of the water-soluble polymer Y produced as described above is preferably at least 120 mass %, more preferably at least 150 mass %, further preferably at least 200 mass %, and particularly preferably at least 300 mass %, and is preferably no greater than 600 mass %, more preferably no greater than 500 mass %, and further preferably no greater than 400 mass %. As a result of the degree of swelling in electrolysis solution of the water-soluble polymer Y being at least 120 mass %, close adherence can be ensured between a current collector and an electrode mixed material layer formed using the presently disclosed binder composition, and lithium ion conductivity can also be ensured, particularly at low temperatures. As a result, lithium ion secondary battery internal resistance can be further reduced and lithium ion secondary battery life characteristics can be even further improved. On the other hand, as a result of the degree of swelling in electrolysis solution of the water-soluble polymer Y being no greater than 600 mass %, elution of the water-soluble polymer Y into an electrolysis solution can be inhibited, electrode plate expansion can be suppressed, lithium ion secondary battery internal resistance can be further reduced, and lithium ion secondary battery life characteristics can be further improved.

The degree of swelling in electrolysis solution of the water-soluble polymer Y can be measured by the method described in the examples section of the present specification. Furthermore, the degree of swelling in electrolysis solution of the water-soluble polymer Y can be adjusted by changing the type and amount of the crosslinking monomer and the (meth)acrylic acid ester monomer contained in the monomer composition Y.

[[Ratio of Blending Amount of Water-Soluble Polymer Y and Blending Amount of Copolymer X]]

In the presently disclosed binder composition, a value (Y/X) obtained by dividing the blending amount of the water-soluble polymer Y by the blending amount of the copolymer X is preferably at least 0.01, more preferably at least 0.05, and further preferably at least 0.1, and is preferably no greater than 0.5, more preferably no greater than 0.4, and further preferably no greater than 0.3. As a result of Y/X being at least 0.01, close adherence can be ensured between a current collector and an electrode mixed material layer formed using the binder composition, and lithium ion secondary battery life characteristics can be further improved. Moreover, as a result of Y/X being no greater than 0.5, a situation in which slurry composition production becomes difficult due to excessively high viscosity can be avoided and lithium ion secondary battery life characteristics can be further improved since the characteristics of the copolymer X can be sufficiently displayed.

[Particulate Polymer Z]

The presently disclosed binder composition for lithium ion secondary battery electrode-use may contain a particulate polymer Z as a binding material.

Close adherence between an electrode mixed material layer and a current collector can be ensured as a result of the particulate polymer Z being used in addition to the previously described copolymer X. Moreover, the particulate polymer Z exhibits an appropriate degree of swelling in an electrolysis solution and, consequently, contributes to improving lithium ion conductivity and reducing internal resistance.

The copolymer X and the particulate polymer Z exhibit good compatibility and have a low tendency to separate or become unevenly distributed in a binder composition or a slurry composition. Therefore, it is presumed that in a lithium ion secondary battery, functions of the copolymer X and the particulate polymer Z, which differ in terms of expression mechanism, are combined in a high-level balance such that, as a result, reduction of internal resistance and improvement of life characteristics of the lithium ion secondary battery can be achieved to even higher levels.

The particulate polymer Z is water-insoluble. Accordingly, the particulate polymer Z is normally present in the form of particles in an aqueous slurry composition that contains water as a dispersion medium.

Suitable examples of the particulate polymer Z described above include, but are not specifically limited to, an acrylic-based polymer and a conjugated diene-based polymer. Of these polymers, an acrylic-based polymer or a styrene-butadiene-based polymer is more preferable from a viewpoint of improving close adherence between a current collector and an electrode mixed material layer formed using the presently disclosed binder composition.

The particulate polymer Z can for example be obtained through polymerization of a monomer composition Z that contains one or more monomers, additives such as a polymerization initiator, and a polymerization solvent. The ratio of structural units in the particulate polymer Z that are derived from monomers contained in the monomer composition Z is normally the same as the ratio in which these monomers are present in the monomer composition Z.

[[Acrylic-Based Polymer]]

The following describes an acrylic-based polymer that is preferable as the particulate polymer Z. The acrylic-based polymer is a polymer that includes a structural unit derived from a (meth)acrylic acid ester monomer. The acrylic-based polymer is obtained through polymerization of a monomer composition Z that contains the (meth)acrylic acid ester monomer, and that optionally contains a carboxyl group-containing monomer, an $\alpha,\beta$-unsaturated nitrile monomer, and other compounds (monomers).

The (meth)acrylic acid ester monomer, carboxyl group-containing monomer, $\alpha,\beta$-unsaturated nitrile monomer, and other compounds used in production of the acrylic-based polymer are described below in detail.

—(Meth)Acrylic Acid Ester Monomer—

Examples of the (meth)acrylic acid ester monomer used in production of the acrylic-based polymer include the same (meth)acrylic acid ester monomers as described in the "Water-soluble polymer Y" section. One of these (meth) acrylic acid ester monomers may be used individually, or two or more of these (meth)acrylic acid ester monomers may be used in combination. Of these (meth)acrylic acid ester monomers, n-butyl acrylate is preferable.

The percentage content of the above-described (meth) acrylic acid ester monomer among monomers contained in the monomer composition Z used in production of the acrylic-based polymer is preferably at least 50 mass %, more preferably at least 55 mass %, and further preferably at least 58 mass %, and is preferably no greater than 98 mass %, more preferably no greater than 95 mass %, and further preferably no greater than 94 mass %.

—Carboxyl Group-Containing Monomer—

Examples of the carboxyl group-containing monomer used in production of the acrylic-based polymer include the same examples as previously described for the "ethylenically unsaturated carboxylic acid compound (A)" in the "Copolymer X" section. One of these carboxyl group-containing monomers may be used individually, or two or more of these carboxyl group-containing monomers may be used in combination. Of these carboxyl group-containing monomers, methacrylic acid is preferable.

The percentage content of the above-described carboxyl group-containing monomer among monomers contained in the monomer composition Z used in production of the acrylic-based polymer is preferably at least 0.5 mass % and more preferably at least 1 mass %, and is preferably no greater than 6 mass % and more preferably no greater than 3 mass %.

—$\alpha,\beta$-Unsaturated Nitrile Monomer—

Examples of the $\alpha,\beta$-unsaturated nitrile monomer used in production of the acrylic-based polymer include acrylonitrile and methacrylonitrile. One of these $\alpha,\beta$-unsaturated nitrile monomers may be used individually, or two or more of these $\alpha,\beta$-unsaturated nitrile monomers may be used in combination. Of these $\alpha,\beta$-unsaturated nitrile monomers, acrylonitrile is preferable.

The percentage content of the above-described $\alpha,\beta$-unsaturated nitrile monomer among monomers contained in the monomer composition Z used in production of the acrylic-based polymer is preferably at least 0.5 mass % and more preferably at least 1 mass %, and is preferably no greater than 6 mass % and more preferably no greater than 3 mass %.

—Other Compounds—

Examples of other compounds that can be used include monomers that are copolymerizable with the monomers described above. Specific examples of these other compounds include the examples of other compounds that can be used for the previously described water-soluble polymer Y. More specifically, a crosslinking monomer can be suitably used. One of these other compounds may be used individually, or two or more of these other compounds may be used in combination.

The percentage content of the above-described other compounds among monomers contained in the monomer composition Z used in production of the acrylic-based polymer is preferably at least 0.5 mass % and more preferably at least 1 mass %, and is preferably no greater than 6 mass % and more preferably no greater than 3 mass %.

The method by which the acrylic-based polymer is produced is not specifically limited. The acrylic-based polymer can for example be obtained through polymerization of the monomer composition Z containing the monomers described above by a method such as solution polymerization, suspension polymerization, bulk polymerization, or emulsion polymerization. The polymerization reaction may for example be addition polymerization such as ionic polymerization, radical polymerization, or living radical polymerization. No specific limitations are placed on the additives or the polymerization solvent contained in the monomer composition Z used in production of the acrylic-based polymer, and known examples thereof can be used.

[[Conjugated Diene-Based Polymer]]

The following describes a conjugated diene-based polymer that is preferable as the particulate polymer Z. The conjugated diene-based polymer is a polymer that includes a structural unit derived from a conjugated diene monomer and may be a hydrogenated product thereof.

Specific examples of the conjugated diene-based polymer include aliphatic conjugated diene polymers such as polybutadiene and polyisoprene; aromatic vinyl-aliphatic conjugated diene copolymers such as a styrene-butadiene-based polymer (SBR); vinyl cyanide-conjugated diene copolymers such as an acrylonitrile-butadiene-based polymer (NBR); and hydrogenated SBR, hydrogenated NBR, and the like. Of these conjugated diene-based polymers, an aromatic vinyl-aliphatic conjugated diene copolymer such as a styrene-butadiene-based polymer (SBR) is preferable. The aromatic vinyl-aliphatic conjugated diene copolymer can for example be obtained through polymerization of a monomer composition Z that contains an aromatic vinyl monomer and an aliphatic conjugated diene monomer, and that optionally contains a carboxyl group-containing monomer, a hydroxyl group-containing monomer, a fluorine-containing monomer, and other compounds (monomers).

The aromatic vinyl monomer, aliphatic conjugated diene monomer, carboxyl group-containing monomer, hydroxyl group-containing monomer, fluorine-containing monomer, and other compounds used in production of the aromatic vinyl-aliphatic conjugated diene copolymer are described below in detail.

—Aromatic Vinyl Monomer—

Examples of the aromatic vinyl monomer used in production of the aromatic vinyl-aliphatic conjugated diene copolymer include styrene, a-methylstyrene, vinyltoluene, and divinyl benzene. One of these aromatic vinyl monomers may be used individually, or two or more of these aromatic vinyl monomers may be used in combination. Of these aromatic vinyl monomers, styrene is preferable.

The percentage content of the above-described aromatic vinyl monomer among monomers contained in the monomer composition Z used in production of the aromatic vinyl-aliphatic conjugated diene copolymer is preferably at least 35 mass %, more preferably at least 45 mass %, and further preferably at least 55 mass %, and is preferably no greater than 80 mass %, more preferably no greater than 70 mass %, and further preferably no greater than 65 mass %.

—Aliphatic Conjugated Diene Monomer—

Examples of the aliphatic conjugated diene monomer used in production of the aromatic vinyl-aliphatic conjugated diene copolymer include 1,3-butadiene, 2-methyl-1,3-butadiene, 2,3-dimethyl-1,3-butadiene, 2-chloro-1,3-butadiene, substituted linear conjugated pentadienes, and substituted and side-chain conjugated hexadienes. One of these aliphatic conjugated diene monomers may be used individually, or two or more of these aliphatic conjugated diene monomers may be used in combination. Of these aliphatic conjugated diene monomers, 1,3-butadiene is preferable.

The percentage content of the above-described aliphatic conjugated diene monomer among monomers contained in the monomer composition Z used in production of the aromatic vinyl-aliphatic conjugated diene copolymer is preferably at least 20 mass % and more preferably at least 30 mass %, and is preferably no greater than 70 mass %, more preferably no greater than 60 mass %, further preferably no greater than 50 mass %, and particularly preferably no greater than 35 mass %.

—Carboxyl Group-Containing Monomer—

Examples of the carboxyl group-containing monomer used in production of the aromatic vinyl-aliphatic conjugated diene copolymer include the same examples as previously described for the "ethylenically unsaturated carboxylic acid compound (A)" in the "Copolymer X" section. One of these carboxyl group-containing monomers may be used individually, or two or more of these carboxyl group-containing monomers may be used in combination. Of these carboxyl group-containing monomers, itaconic acid is preferable.

The percentage content of the above-described carboxyl group-containing monomer among monomers contained in the monomer composition Z used in production of the aromatic vinyl-aliphatic conjugated diene copolymer is preferably at least 0.5 mass % and more preferably at least 1 mass %, and is preferably no greater than 6 mass % and more preferably no greater than 3 mass %.

—Hydroxyl Group-Containing Monomer—

Examples of the hydroxyl group-containing monomer used in production of the aromatic vinyl-aliphatic conjugated diene copolymer include 2-hydroxyethyl acrylate, 2-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di(ethylene glycol) maleate, di(ethylene glycol) itaconate, 2-hydroxyethyl maleate, bis(2-hydroxyethyl) maleate, and 2-hydroxyethyl methyl fumarate. One of these hydroxyl group-containing monomers may be used individually, or two or more of these hydroxyl group-containing monomers may be used in combination. Of these hydroxyl group-containing monomers, 2-hydroxyethyl acrylate is preferable.

The percentage content of the above-described hydroxyl group-containing monomer among monomers contained in the monomer composition Z used in production of the aromatic vinyl-aliphatic conjugated diene copolymer is preferably at least 0.5 mass % and more preferably at least 0.8 mass %, and is preferably no greater than 5 mass % and more preferably no greater than 2 mass %.

—Fluorine-Containing Monomer—

Examples of the fluorine-containing monomer used in production of the aromatic vinyl-aliphatic conjugated diene copolymer include the same fluorine-containing monomers as previously described in the "Water-soluble polymer Y" section. One of these fluorine-containing monomers may be used individually, or two or more of these fluorine-containing monomers may be used in combination. Of these fluorine-containing monomers, 2,2,2-trifluoroethyl methacrylate is preferable.

The percentage content of the above-described fluorine-containing monomer among monomers contained in the monomer composition Z used in production of the aromatic vinyl-aliphatic conjugated diene copolymer is preferably at least 1 mass % and more preferably at least 2 mass %, and is preferably no greater than 8 mass % and more preferably no greater than 5 mass %.

—Other Compounds—

Examples of other compounds that can be used include monomers that are copolymerizable with the monomers described above. Specific examples of these other compounds include α,β-unsaturated nitrile monomers and the same other compounds as for the previously described water-soluble polymer Y, exclusive of those compounds that are equivalent to the aromatic vinyl monomer, the aliphatic conjugated diene monomer, the hydroxyl group-containing monomer, and the fluorine-containing monomer. One of these other compounds may be used individually, or two or more of these other compounds may be used in combination.

The percentage content of the above-described other compounds among monomers contained in the monomer composition Z used in production of the conjugated diene-based polymer is preferably no greater than 6 mass %, more preferably no greater than 3 mass %, and further preferably no greater than 1 mass %.

The method by which the conjugated diene-based polymer, such as the aromatic vinyl-aliphatic conjugated diene copolymer, is produced is not specifically limited. The conjugated diene-based polymer can for example be obtained through polymerization of the monomer composition Z containing the monomers described above by a method such as solution polymerization, suspension polymerization, bulk polymerization, or emulsion polymerization. The polymerization reaction may for example be addition polymerization such as ionic polymerization, radical polymerization, or living radical polymerization. No specific limitations are placed on the additives or the polymerization solvent contained in the monomer composition Z used in production of the conjugated diene-based polymer, and known examples thereof can be used.

[[Properties of Particulate Polymer Z]]

The degree of swelling in electrolysis solution of the particulate polymer Z is preferably at least 140 mass %, more preferably at least 200 mass %, and further preferably at least 300 mass %, and is preferably less than 800 mass % and more preferably less than 500 mass %. As a result of the degree of swelling in electrolysis solution of the particulate polymer Z being at least 140 mass %, lithium ion conductivity can be ensured and lithium ion secondary battery internal resistance can be further reduced. Moreover, lithium ion secondary battery preservation stability can be improved. The cause of this effect is presumed to be formation of an SEI coating during initial aging as a result of good lithium ion conductivity. On the other hand, as a result of the degree of swelling in electrolysis solution of the particulate polymer Z being less than 800 mass %, rigidity of the particulate polymer Z can be ensured, particularly during a high-temperature cycle, such that electrode expansion can be sufficiently suppressed, and lithium ion secondary battery cycle characteristics can be further improved.

The degree of swelling in electrolysis solution of the particulate polymer Z can be measured by the method described in the examples section of the present specification. In the case of the aromatic vinyl-aliphatic conjugated diene copolymer, the degree of swelling in electrolysis solution can for example be adjusted by changing the type and amount of the aromatic vinyl monomer in the monomer composition Z, and by changing the gel content, which is controlled by a chain transfer agent, the polymerization temperature, and so forth. In the case of the acrylic-based polymer, the degree of swelling in electrolysis solution can for example be adjusted by changing the types and amounts of the α,β-unsaturated nitrile monomer and the crosslinking monomer in the monomer composition Z, and by changing the gel content, which is controlled by a chain transfer agent, the polymerization temperature, and so forth.

The gel content of the particulate polymer Z is preferably at least 85 mass %, more preferably at least 88 mass %, and further preferably at least 90 mass %, and is preferably no greater than 98 mass %, more preferably no greater than 95 mass %, and further preferably no greater than 93 mass %. Close adherence between a current collector and an electrode mixed material layer formed using the presently disclosed binder composition can be improved as a result of the gel content of the particulate polymer Z being in the aforementioned range. Moreover, lithium ion secondary battery internal resistance can be further reduced and lithium ion secondary battery life characteristics can be further improved.

The gel content of the particulate polymer Z can be measured by the method described in the examples section of the present specification. Moreover, the gel content can for example be adjusted by changing the polymerization temperature, the type and amount of an additive such as a molecular weight modifier, and the conversion rate (amount of monomer consumption) at the end of reaction. For example, the gel content can be increased by reducing the amount of the molecular weight modifier that is used in polymerization and can be reduced by increasing the amount of the molecular weight modifier that is used in polymerization.

[[Ratio of Blending Amount of Particulate Polymer Z and Blending Amount of Copolymer X]]

In the presently disclosed binder composition, a value (Z/X) obtained by dividing the blending amount of the particulate polymer Z by the blending amount of the copolymer X is preferably at least 0.05, more preferably at least 0.2, further preferably at least 0.5, and particularly preferably at least 0.7, and is preferably no greater than 3, more preferably no greater than 2, and further preferably no greater than 1.5. As a result of Z/X being at least 0.05, close adherence can be ensured between a current collector and an electrode mixed material layer formed using the binder composition, and lithium ion secondary battery life characteristics can be further improved. Moreover, as a result of Z/X being no greater than 3, it is possible to avoid a situation in which slurry composition production becomes difficult due to excessively high viscosity, and the particulate polymer Z becomes distributed close to the copolymer X and an electrode active material, without excessively reducing liquid-holding space of the electrode active material, such that lithium ion secondary battery life characteristics can be further improved.

[[Ratio of Blending Amount of Particulate Polymer Z and Blending Amount of Copolymer X and Water-Soluble Polymer Y]]

In the presently disclosed binder composition, a value (Z/(X+Y)) obtained by dividing the blending amount of the particulate polymer Z by the total of the blending amount of the copolymer X and the blending amount of the water-soluble polymer Y is preferably at least 0.1 and more preferably at least 0.2, and is preferably no greater than 2.5, more preferably no greater than 2, and further preferably no greater than 1. Close adherence can be ensured between a current collector and an electrode mixed material layer formed using the binder composition as a result of Z/(X+Y) being at least 0.1, whereas migration of the particulate polymer Z can be inhibited and lithium ion secondary battery internal resistance can be further reduced as a result of Z/(X+Y) being no greater than 2.5.

<Solvent>

The solvent of the presently disclosed binder composition can be any known solvent in which the previously described binding material can be dissolved or dispersed. Of such solvents, water is preferable as the solvent of the binder composition. It should be noted that at least part of the solvent of the binder composition may be a polymerization solvent that was contained in a monomer composition used in production of the copolymer X, the water-soluble polymer Y, and/or the particulate polymer Z. However, this is not a specific limitation.

<Other Components>

Besides the components described above, the presently disclosed binder composition may optionally contain other known components that can be contained in a binder composition. One example of a known component such as described above is a thickener. The presently disclosed binder composition may contain, as the aforementioned thickener, a natural thickener such as carboxymethyl cellulose, a polysaccharide thickener, alginic acid, or starch, or a synthetic thickener such as polyacrylic acid. Note that the thickener is exclusive of materials that are equivalent to the copolymer X and the water-soluble polymer Y described above.

Of these thickeners, carboxymethyl cellulose and polyacrylic acid are preferable from a viewpoint of providing a slurry composition with thixotropy and increasing stability of the slurry composition.

In a situation in which the aforementioned other components are used in production of a slurry composition, an electrode, and a lithium ion secondary battery, these other components may be pre-mixed with the copolymer X, and also with the optionally-used water-soluble polymer Y and particulate polymer Z (referred to collectively as "copolymer X and so forth"), to form the binder composition before producing the slurry composition, or may be mixed with an electrode active material and the copolymer X and so forth in production of the slurry composition without being pre-mixed with the copolymer X and so forth.

<Production of Binder Composition>

The presently disclosed binder composition can be produced by mixing the components described above. Specifically, the binder composition can be produced by mixing the above-described components using a mixer such as a ball mill, a sand mill, a bead mill, a pigment disperser, a grinding machine, an ultrasonic disperser, a homogenizer, a planetary mixer, or a FILMIX.

In a situation in which the copolymer X, and also the optionally-used water-soluble polymer Y and particulate polymer Z, are each produced through polymerization of a monomer composition in an aqueous solvent, a binder composition containing water as a solvent can be produced by mixing these components as-produced in the form of an aqueous solution or an aqueous dispersion.

Furthermore, production of the binder composition and production of a slurry composition, which is described below, may be implemented simultaneously by, for example, mixing the copolymer X with an electrode active material and then subsequently adding the water-soluble polymer Y and the particulate polymer Z as necessary.

(Slurry Composition for Lithium Ion Secondary Battery Electrode-Use)

The presently disclosed slurry composition for lithium ion secondary battery electrode-use contains the presently disclosed binder composition for lithium ion secondary battery electrode-use described above and an electrode active material. When the presently disclosed slurry composition is used to produce an electrode, internal resistance of a lithium ion secondary battery that includes the electrode can be reduced while also providing the lithium ion secondary battery with excellent life characteristics.

The presently disclosed slurry composition for lithium ion secondary battery electrode-use is particularly suitable for use as a slurry composition for lithium ion secondary battery negative electrode-use.

(Slurry Composition for Lithium Ion Secondary Battery Negative Electrode-Use)

The following first describes a presently disclosed slurry composition for lithium ion secondary battery negative electrode-use that can be produced using the presently disclosed binder composition.

The presently disclosed slurry composition for lithium ion secondary battery negative electrode-use contains the above-described binder composition and a negative electrode active material, and may contain a dispersion medium, such as water, and other components that are added as necessary. In other words, the slurry composition for lithium ion secondary battery negative electrode-use contains at least the above-described copolymer X, a negative electrode active material, and a dispersion medium, such as water, and may optionally contain binding materials other than the copolymer X, such as the water-soluble polymer Y and the particulate polymer Z, and other components, such as a thickener.

<Negative Electrode Active Material>

The negative electrode active material of a lithium ion secondary battery is normally a material that can occlude and release lithium. Examples of the material that can occlude and release lithium include a carbon-based negative electrode active material, a non-carbon-based negative electrode active material, and an active material formed by combining these two.

The negative electrode active material of the presently disclosed slurry composition for secondary battery negative electrode-use is preferably a carbon-based negative electrode active material.

[Carbon-Based Negative Electrode Active Material]

The carbon-based negative electrode active material can be defined as an active material that contains carbon as its main framework and into which lithium can be inserted (also referred to as "doping"). Examples of the carbon-based negative electrode active material include carbonaceous materials and graphitic materials.

A carbonaceous material is a material with a low degree of graphitization (i.e., low crystallinity) that can be obtained by carbonizing a carbon precursor by heat treatment at 2000° C. or lower. The lower limit of the heat treatment temperature in the carbonization is not specifically limited and may for example be 500° C. or higher.

Examples of the carbonaceous material include graphitizing carbon whose carbon structure can easily be changed according to the heat treatment temperature and non-graphitizing carbon typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include sintered phenolic resin, polyacrylonitrile-based carbon fiber, quasi-isotropic carbon, sintered furfuryl alcohol resin (PFA), and hard carbon.

The graphitic material is a material having high crystallinity of a similar level to graphite. The graphitic material can be obtained by heat-treating graphitizing carbon at 2000° C. or higher. The upper limit of the heat treatment temperature is not specifically limited and may for example be 5000° C. or lower.

Examples of the graphitic material include natural graphite and artificial graphite.

Examples of the artificial graphite include an artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher.

Herein, natural graphite whose surface is at least partially coated with amorphous carbon (amorphous-coated natural graphite) is preferably used as the carbon-based negative electrode active material.

[Non-Carbon-Based Negative Electrode Active Material]

The non-carbon-based negative electrode active material is an active material that is not a carbon-based negative electrode active material composed only of a carbonaceous material or a graphitic material. Examples of the non-carbon-based negative electrode active material include a metal-based negative electrode active material.

The metal-based negative electrode active material is an active material that contains metal, the structure of which usually contains an element that allows insertion of lithium, and that exhibits a theoretical electric capacity of 500 mAh/g or higher per unit mass when lithium is inserted. Examples of the metal-based negative electrode active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal.

Of these metal-based negative electrode active materials, active materials containing silicon (silicon-based negative electrode active materials) are preferred. One reason for this is that the capacity of a lithium ion secondary battery can be increased though use of a silicon-based negative electrode active material.

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon. One of these silicon-based negative electrode active materials may be used individually, or two or more of these silicon-based negative electrode active materials may be used in combination.

The silicon-containing alloy may for example be an alloy composition that contains silicon and at least one element selected from the group consisting of titanium, iron, cobalt, nickel, and copper.

Alternatively, the silicon-containing alloy may for example be an alloy composition that contains silicon, aluminum, and transition metals such as iron, and further contains rare-earth elements such as tin and yttrium.

$SiO_x$ is a compound that contains Si and at least one of SiO and $SiO_2$, where x is usually at least 0.01 and less than 2. $SiO_x$ can for example be formed by utilizing a disproportionation reaction of silicon monoxide (SiO). Specifically, $SiO_x$ can be prepared by heat-treating SiO, optionally in the presence of a polymer such as polyvinyl alcohol, to produce silicon and silicon dioxide. After SiO has been pulverized and mixed with the optional polymer, the heat treatment can be performed at a temperature of 900° C. or higher, and preferably 1000° C. or higher, in an atmosphere containing organic gas and/or vapor.

The composite of a Si-containing material and conductive carbon may be, for example, a compound obtained, for example, by heat-treating a pulverized mixture of SiO, a polymer such as polyvinyl alcohol, and optionally a carbon material in an atmosphere containing organic gas and/or vapor. Furthermore, a commonly known method can be used to obtain the aforementioned composite, such as a method of coating the surfaces of particles of SiO with organic gas or the like by chemical vapor deposition, or a method of forming composite particles (granulation) by a mechanochemical process using SiO particles and graphite or artificial graphite.

From a viewpoint of increasing lithium ion secondary battery capacity, the silicon-containing alloy and SiO are preferable as the silicon-based negative electrode active material.

Although no specific limitations are placed on the BET specific surface area of the negative electrode active material, normally the BET specific surface area is approximately from 1 $m^2/g$ to 20 $m^2/g$. The BET specific surface area of the negative electrode active material can be measured by the method described in the examples section of the present specification.

<Dispersion Medium>

Examples of the dispersion medium in the slurry composition for lithium ion secondary battery negative electrode-use include, but are not specifically limited to, known dispersion media. Of such dispersion media, water is preferable as the aforementioned dispersion medium. At least part of the dispersion medium of the slurry composition may be composed of the solvent that was contained in the binder composition used to produce the slurry composition. However, this is not a specific limitation.

<Other Components>

Besides the components described above and the other components described in the "Binder composition for lithium ion secondary battery electrode-use" section, the slurry composition for lithium ion secondary battery negative electrode-use may contain components such as a conductive material, a reinforcing material, a leveling agent, and an additive for electrolysis solution. These components may be commonly known materials such as described in WO 2012/115096 A1 and are not specifically limited other than being materials that do not affect the battery reaction. One of these components may be used individually, or two or more of these components may be used in combination in a freely selected ratio.

(Production Method of Slurry Composition for Lithium Ion Secondary Battery Negative Electrode-Use)

The slurry composition for lithium ion secondary battery negative electrode-use can be produced by dispersing the components described above in the dispersion medium. Specifically, the slurry composition can be produced by mixing the above-described components and the dispersion medium using a mixer such as a ball mill, a sand mill, a bead mill, a pigment disperser, a grinding machine, an ultrasonic disperser, a homogenizer, a planetary mixer, or a FILMIX.

Although water is typically used as the dispersion medium, an aqueous solution of a freely selected compound or a mixed solution of water and a small amount of an organic medium may alternatively be used.

The proportions of the components in the slurry composition can be adjusted as appropriate.

Herein, from a viewpoint of ensuring lithium ion secondary battery performance while increasing slurry composition stability and negative electrode producibility, the content of the copolymer X in the slurry composition per 100 parts by mass of the negative electrode active material is preferably at least 0.5 parts by mass, more preferably at least 0.7 parts by mass, and further preferably at least 1.2 parts by mass, and is preferably no greater than 10 parts by mass, more preferably no greater than 1.8 parts by mass, and further preferably no greater than 1.4 parts by mass. As a result of the content of the copolymer X in the slurry composition being in the aforementioned range, characteristics of the copolymer X can be appropriately expressed such as to enable, in particular, further reduction of lithium ion secondary battery internal resistance.

In a situation in which the slurry composition contains the water-soluble polymer Y, the content of the water-soluble polymer Y in the slurry composition per 100 parts by mass of the negative electrode active material is preferably at least 0.05 parts by mass and more preferably at least 0.1 parts by mass, and is preferably no greater than 2.0 parts by mass, more preferably no greater than 1.0 parts by mass, further preferably no greater than 0.5 parts by mass, and particularly preferably no greater than 0.3 parts by mass. As a result of the blending amount of the water-soluble polymer Y being at least 0.05 parts by mass per 100 parts by mass of the electrode active material, close adherence between an electrode mixed material layer and a current collector can be further increased and lithium ion secondary battery cycle characteristics can be improved. On the other hand, as a result of the blending amount of the water-soluble polymer Y being no greater than 2.0 parts by mass, it is possible to avoid a situation in which production of the slurry composition becomes difficult due to excessively high viscosity or in which internal resistance increases excessively. In the presently disclosed slurry composition, a suitable range for a value (Y/X) obtained by dividing the blending amount of the water-soluble polymer Y by the blending amount of the copolymer X is the same range as previously described for the presently disclosed binder composition.

In a situation in which the slurry composition further contains the particulate polymer Z, the content of the particulate polymer Z in the slurry composition per 100 parts by mass of the negative electrode active material is preferably at least 0.05 parts by mass, more preferably at least 0.1 parts by mass, further preferably at least 0.2 parts by mass, particularly preferably at least 0.5 parts by mass, and most preferably at least 0.7 parts by mass, and is preferably no greater than 3.0 parts by mass, more preferably no greater than 2.0 parts by mass, and further preferably no greater than 1.5 parts by mass. As a result of the blending amount of the particulate polymer Z being at least 0.05 parts by mass per 100 parts by mass of the electrode active material, close adherence between an electrode mixed material layer and a current collector can be further increased and lithium ion secondary battery cycle characteristics can be improved. On the other hand, as a result of the content of the particulate polymer Z being no greater than 3.0 parts by mass, it is possible to avoid a situation in which production of the slurry composition becomes difficult due to excessively high viscosity or in which internal resistance increases excessively. In the presently disclosed slurry composition, suitable ranges for a value (Z/X) obtained by dividing the blending amount of the particulate polymer Z by the blending amount of the copolymer X and a value (Z/(X+Y)) obtained by dividing the blending amount of the particulate polymer Z by the total of the blending amount of the copolymer X and the blending amount of the water-soluble polymer Y are the same as the ranges previously described for the presently disclosed binder composition.

In a situation in which the slurry composition contains a thickener, the content of the thickener in the slurry composition per 100 parts by mass of the negative electrode active material is preferably at least 0.1 parts by mass and no greater than 5 parts by mass. As a result of the blending amount of the thickener being in the aforementioned range, it is possible to ensure thixotropy and stability of the slurry composition.

(Slurry Composition for Lithium Ion Secondary Battery Positive Electrode-Use)

The following describes a slurry composition for lithium ion secondary battery positive electrode-use that can be produced using the presently disclosed binder composition.

The presently disclosed slurry composition for lithium ion secondary battery positive electrode-use contains the previously described binder composition and a positive electrode active material, and may contain a dispersion medium, such as water, and other components, such as a thickener, that are added as necessary. In other words, the slurry composition for lithium ion secondary battery positive electrode-use contains at least the above-described copolymer X, a positive electrode active material, and a dispersion medium, such as water, and may optionally contain binding materials other than the copolymer X, such as the water-soluble polymer Y and the particulate polymer Z, and other components, such as a conductive material and a thickener. The presently disclosed slurry composition for lithium ion secondary battery positive electrode-use preferably contains carboxymethyl cellulose as a thickener.

Description of the dispersion medium and the other components of the slurry composition for lithium ion secondary battery positive electrode-use is omitted since the dispersion medium and the other components may be the same as those previously described for the slurry composition for lithium ion secondary battery negative electrode-use.

<Positive Electrode Active Material>

Specific examples of the positive electrode active material include transition metal-containing compounds such as a transition metal oxide, a transition metal sulfide, and a composite metal oxide comprising lithium and a transition metal. Examples of the transition metal include Ti, V, Cr, Mn, Fe, Co, Ni, Cu, and Mo.

Examples of the transition metal oxide include MnO, $MnO_2$, $V_2O_5$, $V_6O_{13}$, $TiO_2$, $Cu_2V_2O_3$, amorphous $V_2O$—$P_2O_5$, amorphous MoO3, amorphous $V_2O_5$, and amorphous $V_6O_{13}$.

Examples of the transition metal sulfide include $TiS_2$, $TiS_3$, amorphous $MoS_2$, and FeS.

Examples of the composite metal oxide comprising lithium and a transition metal include a lithium-containing composite metal oxide with a layered structure, a lithium-containing composite metal oxide with a spinel structure, and a lithium-containing composite metal oxide with an olivine structure.

Examples of the lithium-containing composite metal oxide with a layered structure include lithium-containing cobalt oxide ($LiCoO_2$), lithium-containing nickel oxide ($LiNiO_2$), lithium-containing composite oxide of Co—Ni—Mn (Li(Co Mn Ni)$O_2$), lithium-containing composite oxide of Ni—Mn—Al, lithium-containing composite oxide of Ni—Co—Al, and a solid solution comprising $LiMaO_2$ and $Li_2MbO_3$. Examples of the lithium-containing composite oxide of Co—Ni—Mn include $Li[Ni_{0.5}Co_{0.2}Mn_{0.3}]O_2$ and $Li[Ni_{1/3}Co_{1/3}Mn_{1/3}]O_2$. Examples of the solid solution comprising $LiMaO_2$ and $Li_2MbO_3$ include $xLiMaO_2 \cdot (1-x)Li_2MbO_3$ and the like, where x represents a number satisfying 0<x<1, Ma represents one or more types of transition metals having an average oxidation state of 3+, and Mb represents one or more types of transition metals having an average oxidation state of 4+. Examples of solid solutions such as described above include $Li[Ni_{0.17}Li_{0.2}Co_{0.07}Mn_{0.56}]O_2$.

The term "average oxidation state" as used herein refers to an average oxidation state of the "one or more types of transition metals" and is calculated from the molar quantities and the valences of the transition metals. For example, in a situation in which the "one or more types of transition metals" is made up of 50 mol % of $Ni^{2+}$ and 50 mol % of $Mn^{4+}$, the average oxidation state of the "one or more types of transition metals" is $(0.5)\times(2+)+(0.5)\times(4+)=3+$.

Examples of the lithium-containing composite metal oxide with a spinel structure include lithium manganate ($LiMn_2O_4$) and compounds obtained by substituting part of Mn contained in lithium manganate ($LiMn_2O_4$) with another transition metal. One specific example thereof is $Li_s[Mn_{2-t}Mc_t]O_4$, such as $LiNi_{0.5}Mn_{1.5}O_4$, where Mc represents one or more types of transition metals having an average oxidation state of 4+, specific examples of which include Ni, Co, Fe, Cu, and Cr; t represents a number satisfying 0<t<1; and s represents a number satisfying 0≤s≤1. Another example of the positive electrode active material is lithium-rich spinel compounds represented by $Li_{1+x}Mn_{2-x}O_4$ (0<x<2).

Examples of the lithium-containing composite metal oxide with an olivine structure include olivine-type lithium phosphate compounds represented by $Li_yMdPO_4$, such as olivine-type lithium iron phosphate ($LiFePO_4$) and olivine-type manganese lithium phosphate ($LiMnPO_4$), where Md represents one or more types of transition metals having an average oxidation state of 3+, examples of which include Mn, Fe, and Co, and y represents a number satisfying $0 \leq y=2$. Md of the olivine-type lithium phosphate compounds represented by $Li_yMdPO_4$ may be partly substituted with another metal. Examples of the metal possibly substituting the part of Md include Cu, Mg, Zn, V, Ca, Sr, Ba, Ti, Al, Si, B, and Mo.

<Production Method of Slurry Composition for Lithium Ion Secondary Battery Positive Electrode-Use>

The slurry composition for lithium ion secondary battery positive electrode-use can be produced by dispersing the components described above in the dispersion medium in the same way as for the slurry composition for lithium ion secondary battery negative electrode-use. The proportions of the components in the slurry composition for positive electrode-use can be adjusted as appropriate.

(Electrode for Lithium Ion Secondary Battery-Use)

The presently disclosed electrode for lithium ion secondary battery-use includes an electrode mixed material layer that is obtained using the presently disclosed slurry composition. More specifically, the presently disclosed electrode for lithium ion secondary battery-use includes a current collector and an electrode mixed material layer formed on the current collector. The electrode mixed material layer contains at least an electrode active material and the copolymer X as a binding material. Components contained in the electrode mixed material layer are the same as the components contained in the previously described slurry composition for lithium ion secondary battery electrode-use. Moreover, suitable ratios of these components in the electrode mixed material layer are the same as the suitable ratios of these components in the slurry composition for electrode-use.

As a result of the electrode for lithium ion secondary battery-use being produced using the presently disclosed binder composition for lithium ion secondary battery electrode-use, the electrode for lithium ion secondary battery-use can improve life characteristics of a lithium ion secondary battery while also reducing internal resistance of the lithium ion secondary battery.

<Production of Electrode for Lithium Ion Secondary Battery-Use>

The electrode for lithium ion secondary battery-use described above can for example be produced through a step of applying the previously described slurry composition for lithium ion secondary battery electrode-use onto the current collector (application step) and a step of drying the slurry composition for lithium ion secondary battery electrode-use that has been applied onto the current collector to form the electrode mixed material layer on the current collector (drying step).

[Application Step]

The slurry composition for lithium ion secondary battery electrode-use can be applied onto the current collector by any commonly known method without any specific limitations. Specific examples of application methods that can be used include doctor blading, dip coating, reverse roll coating, direct roll coating, gravure coating, extrusion coating, and brush coating. The slurry composition may be applied onto one side or both sides of the current collector. The thickness of the slurry coating on the current collector after application but before drying may be set as appropriate in accordance with the thickness of the electrode mixed material layer to be obtained after drying.

The current collector onto which the slurry composition is applied is a material having electrical conductivity and electrochemical durability. Specifically, the current collector may for example be made of iron, copper, aluminum, nickel, stainless steel, titanium, tantalum, gold, or platinum. Of these materials, copper foil is particularly preferable as a current collector used for a negative electrode. On the other hand, aluminum foil is particularly preferable as a current collector used for a positive electrode. One of the aforementioned materials may be used individually, or two or more of the aforementioned materials may be used in combination in a freely selected ratio.

[Drying Step]

The slurry composition that has been applied onto the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector as described above, an electrode mixed material layer is formed on the current collector, thereby providing an electrode for lithium ion secondary battery-use that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

Furthermore, when the electrode mixed material layer contains a curable polymer, the polymer is preferably cured after the electrode mixed material layer has been formed.

<Properties of Electrode for Lithium Ion Secondary Battery-Use>

The degree of coating of the electrode active material in the presently disclosed electrode for lithium ion secondary battery-use, which is calculated by the following formula (1), Degree of coating of electrode active material=(BET specific surface area of electrode active material−BET specific surface area of electrode)/ BET specific surface area of electrode active material is preferably at least 0.25, more preferably at least 0.30, and further preferably at least 0.40, and is preferably no greater than 0.70, more preferably no greater than 0.65, and further preferably no greater than 0.60. As a result of the degree of coating of the electrode active material being at least 0.25, deposition of lithium on the electrode surface can be effectively inhibited. On the other hand, as a result of the degree of coating of the electrode active material being no greater than 0.70, lithium ion secondary battery internal resistance can be even further reduced.

The BET specific surface area of the presently disclosed electrode for lithium ion secondary battery-use is preferably at least 1.0 $m^2/g$, more preferably at least 1.2 $m^2/g$, and further preferably at least 1.5 $m^2/g$, and is preferably no greater than 3.0 $m^2/g$, more preferably no greater than 2.5 $m^2/g$, and further preferably no greater than 2.0 $m^2/g$.

Herein, the BET specific surface area of the electrode can be measured by the method described in the examples section of the present specification.

(Lithium Ion Secondary Battery)

The presently disclosed lithium ion secondary battery includes a positive electrode, a negative electrode, an electrolysis solution, and a separator. In the presently disclosed lithium ion secondary battery, the negative electrode may for example be the presently disclosed electrode (negative electrode) for lithium ion secondary battery-use. The lithium ion secondary battery has reduced internal resistance and excellent life characteristics as a result of including the presently disclosed negative electrode for lithium ion secondary battery-use.

It will be appreciated that although the following explanation focuses on the lithium ion secondary battery including the aforementioned negative electrode for lithium ion secondary battery-use, the presently disclosed binder composition may alternatively be used in production of a lithium ion secondary battery in which only the positive electrode is the presently disclosed electrode (positive electrode) for lithium ion secondary battery-use or a lithium ion secondary battery in which both the positive electrode and the negative electrode are the presently disclosed electrode for lithium ion secondary battery-use.

<Positive Electrode>

The positive electrode of the aforementioned lithium ion secondary battery may be any known positive electrode that is used as the positive electrode of a lithium ion secondary battery. Specifically, the positive electrode that is used may for example be a positive electrode obtained by forming a positive electrode mixed material layer on a current collector.

The current collector may be made of a metal material such as aluminum. The positive electrode mixed material layer may be a layer containing a known positive electrode active material, conductive material, and binding material.

<Electrolysis Solution>

The electrolysis solution may be formed by dissolving an electrolyte in a solvent.

The solvent may be an organic solvent that can dissolve an electrolyte. Specifically, the solvent may be an alkyl carbonate solvent to which a viscosity modification solvent is added. Examples of the alkyl carbonate solvent include ethylene carbonate, propylene carbonate, and γ-butyrolactone. Examples of the viscosity modification solvent include 2,5-dimethyltetrahydrofuran, tetrahydrofuran, diethyl carbonate, ethyl methyl carbonate, dimethyl carbonate, methyl acetate, dimethoxyethane, dioxolane, methyl propionate, and methyl formate.

The electrolyte may be a lithium salt. Examples of the lithium salt include lithium salts described in JP 2012-204303 A. Of these lithium salts, $LiPF_6$, $LiClO_4$, and $CF_3SO_3Li$ are preferred as electrolytes because they readily dissolve in organic solvents and exhibit a high degree of dissociation.

<Separator>

Examples of the separator include separators described in JP 2012-204303 A. Of these separators, a fine porous membrane made of polyolefinic resin (polyethylene, polypropylene, polybutene, or polyvinyl chloride) is preferred since such a membrane can reduce the total thickness of the separator, which increases the ratio of the electrode active material in the lithium ion secondary battery, and consequently increases the capacity per unit volume.

<Production Method of Lithium Ion Secondary Battery>

The lithium ion secondary battery may be produced, for example, by stacking the positive electrode and the negative electrode with the separator in-between, rolling or folding the resultant stack as necessary in accordance with the battery shape to place the stack in a battery container, filling the battery container with the electrolysis solution, and sealing the battery container. In order to prevent pressure increase inside the lithium ion secondary battery and occurrence of overcharging or overdischarging, an overcurrent preventing device such as a PTC device or a fuse; an expanded metal; or a lead plate may be provided as necessary. The shape of the lithium ion secondary battery may for example be a coin type, button type, sheet type, cylinder type, prismatic type, or flat type.

EXAMPLES

The following provides a more specific description of the present disclosure based on examples. However, the present disclosure is not limited to the following examples. In the following, "%" and "parts" used to express quantities are by mass, unless otherwise specified.

In the examples and comparative examples of Experiments 1-4, evaluations were performed by the following methods in order to evaluate the degree of swelling in electrolysis solution of the copolymer X, the water-soluble polymer Y, and the particulate polymer Z, the viscosity of a 1% aqueous solution of the water-soluble polymer Y, the glass-transition temperature and the gel content of the particulate polymer Z, the degree of coating of an electrode active material in an electrode, electrode producibility, close adherence between a negative electrode mixed material layer and a current collector, rate characteristics and cycle characteristics of a lithium ion secondary battery, post-cycling expansion of a negative electrode, preservation stability, and presence of lithium deposition.

<Degree of Swelling in Electrolysis Solution>

An aqueous solution containing the copolymer X, an aqueous solution containing the water-soluble polymer Y, and an aqueous dispersion containing the particulate polymer Z were each used to form a film with a thickness of 1±0.3 mm by drying in an environment of 50% humidity and a temperature of from 23° C. to 25° C. Each of the resultant films was dried for 10 hours in a vacuum dryer at a temperature of 60° C. and approximately 1 g of the dried film was cut out and precisely weighed. The mass of a film piece obtained by this cutting was taken to be W0. The film piece was immersed in an electrolysis solution (composition: $LiPF_6$ solution of 1.0 M in concentration (mixed solvent of 3/7 (volume ratio) ethylene carbonate (EC)/ethyl methyl carbonate (EMC) used as solvent; 2 volume % (solvent ratio) of vinylene carbonate used as additive)) for 3 days at an ambient temperature of 60° C., and was allowed to swell. Thereafter, the film piece was pulled out of the electrolysis solution and the mass thereof was measured after electrolysis solution on the surface of the film piece had been wiped off using a KimWipe. The mass of the swollen film piece was taken to be W1.

The degree of swelling in electrolysis solution was calculated using the following calculation formula.

Degree of swelling in electrolysis solution(mass %)=$W1/W0 \times 100$

<Viscosity of 1% Aqueous Solution>

A B-type viscometer (25° C., rotational speed 60 rpm) was used to measure the viscosity of a 1% aqueous solution of the water-soluble polymer Y after concentration and pH adjustment.

<Glass-Transition Temperature>

An aqueous dispersion containing the particulate polymer Z was used to form a film of 1±0.3 mm in thickness by drying for 3 days in an environment of 50% humidity and a temperature of from 23° C. to 26° C. The resultant film was dried for 10 hours in a vacuum dryer at a temperature of 60° C. The dried film was used as a measurement sample in order to measure the glass-transition temperature Tg (° C.) in accordance with JIS K7121, under conditions of a measurement temperature of from −100° C. to 180° C. and a heating rate of 5° C./minute, using a differential scanning calorimeter (DSC 6220 produced by SIT NanoTechnology Inc.).

<Gel Content>

An aqueous dispersion containing the particulate polymer Z was used to form a film with a thickness of 1±0.3 mm by drying in an environment of 50% humidity and a temperature of from 23° C. to 25° C. The resultant film was dried for 10 hours in a vacuum dryer at a temperature of 60° C. Thereafter, the dried film was cut to a square piece of from 3 mm to 5 mm in length and the mass of the film piece, which was approximately 1 g, was precisely weighed. The mass of the film piece obtained by this cutting was taken to be w0. The film piece was immersed in 50 g of tetrahydrofuran (THF) for 24 hours. Thereafter, the film piece was pulled out of the THF, was vacuum dried for 3 hours at a temperature of 105° C., and the mass w1 of insoluble content was measured.

The gel content was calculated according to the following calculation formula.

Gel content(mass %)=w1/w0×100

<Degree of Coating of Electrode Active Material (Experiment 4)>

The BET specific surface area of an electrode active material (negative electrode active material) and the BET specific surface area of a produced electrode (negative electrode) were each measured as described below.

In the case of the BET specific surface area of the electrode active material, a powder of the electrode active material was used as a measurement sample, and in the case of the BET specific surface area of the electrode, strips of 2.5 cm×0.5 cm in size were cut from the produced electrode (including a current collector), and 60 of these strips were used as measurement samples.

Each of the measurement samples was subjected to vacuum degassing for 30 minutes at 120° C. Thereafter, an automatic specific surface area/pore size distribution measuring device "BELSORP-mini II" (produced by Microtrac-BEL Corp.) was used to measure a nitrogen adsorption isotherm for the measurement sample by a constant volume gas adsorption method at liquid nitrogen temperature (−196° C.). The obtained adsorption isotherm was used to prepare a BET plot, two points having a greatest correlation coefficient within a range of from a relative pressure of 0.05 to a relative pressure of 0.30 were selected, and the BET specific surface area (m²/g) was calculated.

The BET specific surface area of the electrode active material and the BET specific surface area of the electrode obtained as described above were used in order to calculate the degree of coating of the electrode active material according to the following calculation formula.

Degree of coating of electrode active material=(BET specific surface area of electrode active material−BET specific surface area of electrode)/BET specific surface area of electrode active material <Electrode Producibility (Experiments 1-3)>

The solid content concentration of a produced slurry composition that had been adjusted to a viscosity of 1100±100 mPa·s (measured by a B-type viscometer at 12 rpm) was evaluated based on the following criteria. A higher solid content concentration for the slurry composition indicates that the slurry composition can be dried more easily, and thus indicates better producibility.

A: Solid content concentration of at least 40 mass %
B: Solid content concentration of at least 35 mass % and less than 40 mass %
C: Solid content concentration of less than 35 mass %

<Close Adherence Between Negative Electrode Mixed Material Layer and Current Collector (Experiment 1)>

A test piece having a rectangular shape of 100 mm in length and 10 mm in width was cut out from a produced negative electrode for lithium ion secondary battery-use. Cellophane tape (tape prescribed by JIS Z1522) was attached to the surface of the negative electrode mixed material layer with the surface on which the negative electrode mixed material layer was formed facing downward. Thereafter, one end of the current collector was pulled vertically at a pulling rate of 50 mm/minute to peel off the current collector while measuring stress during the peeling (note that the cellophane tape was fixed to a test bed). This measurement was performed 3 times to obtain an average value. The average value was taken to be the peel strength and was evaluated based on the following criteria. A larger value for the peel strength indicates better close adherence between the negative electrode mixed material layer and the current collector.

A: Peel strength of at least 2.0 N/m
B: Peel strength of at least 1.5 N/m and less than 2.0 N/m
C: Peel strength of less than 1.5 N/m <Close Adherence Between Negative Electrode Mixed Material Layer and Current Collector (Experiment 2)>

The peel strength was obtained in the same way as described in "Close adherence between negative electrode mixed material layer and current collector (Experiment 1)" and was evaluated based on the following criteria. A larger value for the peel strength indicates better close adherence between the negative electrode mixed material layer and the current collector.

A: Peel strength of at least 15.0 N/m
B: Peel strength of at least 10.0 N/m and less than 15.0 N/m
C: Peel strength of less than 10.0 N/m <Close Adherence Between Negative Electrode Mixed Material Layer and Current Collector (Experiment 3)>

The peel strength was obtained in the same way as described in "Close adherence between negative electrode mixed material layer and current collector (Experiment 1)" and was evaluated based on the following criteria. A larger value for the peel strength indicates better close adherence between the negative electrode mixed material layer and the current collector.

A: Peel strength of at least 2.0 N/m
B: Peel strength of at least 1.5 N/m and less than 2.0 N/m
C: Peel strength of at least 1.0 N/m and less than 1.5 N/m
D: Peel strength of less than 1.0 N/m <Rate Characteristics of Lithium Ion Secondary Battery (Experiment 1)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2

C constant-current method at a temperature of 25° C. Thereafter, CC-CV charging of the lithium ion secondary battery was performed with a 0.2 C constant current (upper limit cell voltage 4.30 V) and CC discharging of the lithium ion secondary battery was performed to 3.00 V with a 0.2 C constant current.

Next, the lithium ion secondary battery was charged and discharged between 4.30 V and 3.00 V with a 0.2 C constant current at an ambient temperature of 25° C. The discharge capacity in this operation was taken to be C0. Thereafter, CC-CV charging of the lithium ion secondary battery was performed with a 0.2 C constant current in same way as described above and discharging of the lithium ion secondary battery was performed with a 1.0 C constant current. The discharge capacity in this operation was taken to be C1. A capacity change rate represented by $\Delta C=(C1/C0)\times 100(\%)$ was obtained as a rate characteristic and was evaluated based on the following criteria. A larger value for the capacity change rate $\Delta C$ indicates higher discharge capacity at high currents and lower internal resistance.

A: $\Delta C$ of at least 85%
B: $\Delta C$ of at least 75% and less than 85%
C: $\Delta C$ of at least 65% and less than 75%
D: $\Delta C$ of less than 65%

<Rate Characteristics of Lithium Ion Secondary Battery (Experiment 2)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed with a 0.2 C constant current (upper limit cell voltage 4.20 V) and CC discharging of the lithium ion secondary battery was performed to 3.00 V with a 0.2 C constant current.

Next, the lithium ion secondary battery was charged and discharged between 4.20 V and 3.00 V with a 0.2 C constant current at an ambient temperature of 25° C. The discharge capacity in this operation was taken to be C0. Thereafter, CC-CV charging of the lithium ion secondary battery was performed with a 0.2 C constant current in the same way as described above and discharging of the lithium ion secondary battery was performed with a 3.0 C constant current. The discharge capacity in this operation was taken to be C1. A capacity change rate represented by $\Delta C=(C1/C0)\times 100(\%)$ was obtained as a rate characteristic and was evaluated based on the following criteria. A larger value for the capacity change rate $\Delta C$ indicates higher discharge capacity at high currents and lower internal resistance.

A: $\Delta C$ of at least 80%
B: $\Delta C$ of at least 75% and less than 80%
C: $\Delta C$ of at least 65% and less than 75%
D: $\Delta C$ of less than 65%

<Rate Characteristics of Lithium Ion Secondary Battery (Experiments 3 and 4)>

The capacity change rate represented by $\Delta C=(C1/C0)\times 100(\%)$ was obtained as a rate characteristic in the same way as described in "Rate characteristics of lithium ion secondary battery (Experiment 1)" and was evaluated based on the following criteria. A larger value for the capacity change rate $\Delta C$ indicates higher discharge capacity at high currents and lower internal resistance.

A: $\Delta C$ of at least 70%
B: $\Delta C$ of at least 65% and less than 70%
C: $\Delta C$ of at least 55% and less than 65%
D: $\Delta C$ of less than 55%

<Cycle Characteristics of Lithium Ion Secondary Battery (Experiment 1)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

Next, 100 cycles were carried out of an operation in which the lithium ion secondary battery was charged and discharged between a cell voltage of 4.30 V and a cell voltage of 3.00 V with a charge/discharge rate of 1.0 C at an ambient temperature of 25° C. The capacity of the $1^{st}$ cycle, which in other words is an initial discharge capacity X1, and a discharge capacity X2 of the $100^{th}$ cycle were measured and used to calculate a capacity change rate represented by $\Delta C'=(X2/X1)\times 100(\%)$, which was evaluated based on the following criteria. A larger value for the capacity change rate $\Delta C'$ indicates better cycle characteristics.

A: $\Delta C'$ of at least 85%
B: $\Delta C'$ of at least 80% and less than 85%
C: $\Delta C'$ of at least 75% and less than 80%
D: $\Delta C'$ of less than 75%

<Post-Cycling Negative Electrode Expansion (Experiment 1)>

A lithium ion secondary battery that had been subjected to the cycling test (Experiment 1) described above was discharged to a cell voltage of 3.00 V with a 0.2 C constant current and was then charged by CC-CV charging with a 1.0 C constant current (upper limit cell voltage 4.30 V) at a temperature of 25° C. The lithium ion secondary battery was then disassembled in order to take out the negative electrode. The thickness T1 of a negative electrode mixed material layer of the negative electrode was measured using a thickness gauge. The thickness of the negative electrode mixed material layer prior to assembly of the lithium ion secondary battery was taken to be T0. A thickness change rate represented by $\Delta T=\{(T1-T0)/T0\}\times 100(\%)$ was calculated and was evaluated based on the following criteria. The rate of change of the thickness of the negative electrode represented by $\Delta T$ reflects the contributions of increased thickness due to collapse of electrode plate structure during cycling, increased thickness due to deposition of Li or the like on the negative electrode surface, and so forth. A small value for the thickness change rate indicates that the negative electrode has not expanded after cycling.

A: $\Delta T$ of less than 30%
B: $\Delta T$ of at least 30% and less than 35%
C: $\Delta T$ of at least 35%

<Cycle Characteristics of Lithium Ion Secondary Battery (Experiment 2)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.20 V) and CC discharging of the lithium ion secondary battery was performed to 3.00 V by a 0.2 C constant-current method. An initial discharge capacity X1 of this operation was measured.

Next, 50 cycles were carried out of an operation in which the lithium ion secondary battery was charged and discharged between a cell voltage of 4.20 V and a cell voltage of 3.00 V with a charge/discharge rate of 1.0 C at an ambient temperature of 45° C. Next, 50 cycles were carried out of an operation in which the lithium ion secondary battery was charged and discharged between a cell voltage of 4.20 V and a cell voltage of 3.00 V with a charge/discharge rate of 0.5 C at an ambient temperature of 0° C. Thereafter, CC-CV charging of the lithium ion secondary battery was performed by a 0.2 C constant-current method (cell voltage 4.20 V) and discharging of the lithium ion secondary battery was performed to a cell voltage of 3.00 V by a 0.2 C constant-current method at a temperature of 25° C. A discharge capacity X2 of this operation was measured.

The initial discharge capacity X1 and the discharge capacity X2 were used to calculate a capacity change rate represented by $\Delta C'=(X2/X1)\times100(\%)$, which was evaluated based on the following criteria. A larger value for the capacity change rate $\Delta C'$ indicates better cycle characteristics.

A: $\Delta C'$ of at least 80%
B: $\Delta C'$ of at least 75% and less than 80%
C: $\Delta C'$ of at least 70% and less than 75%
D: $\Delta C'$ of less than 70%

<Cycle Characteristics of Lithium Ion Secondary Battery (Experiments 3 and 4)>

The capacity change rate represented by $\Delta C'=(X2/X1)\times100(\%)$ was obtained in the same way as described in "Cycle characteristics of lithium ion secondary battery (Experiment 1)" and was evaluated based on the following criteria. A larger value for the capacity change rate $\Delta C'$ indicates better cycle characteristics.

A: $\Delta C'$ of at least 90%
B: $\Delta C'$ of at least 87% and less than 90%
C: $\Delta C'$ of at least 85% and less than 87%
D: $\Delta C'$ of less than 85%

<Preservation Stability of Lithium Ion Nattery (Experiment 1)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 2.75 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to a cell voltage of 3.00 V by a 0.2 C constant-current method.

Next, a cell volume (V0) of the lithium ion secondary battery was calculated by the Archimedean method. The lithium ion secondary battery was subsequently charged to a cell voltage of 4.40 V by a 0.2 C constant-current method at a temperature of 25° C. and was then left for 3 days at a temperature of 80±2° C. Thereafter, the lithium ion secondary battery was discharged to a cell voltage of 3.00 V by a 0.2 C constant-current method at a temperature of 25° C. Next, a cell volume (V1) of the lithium ion secondary battery was measured and an amount of gas production was calculated according to the calculation formula shown below. The calculated amount of gas production was evaluated based on the following criteria. A smaller amount of gas production indicates better high-temperature preservation characteristics.

Amount of gas production (mL)=V1 (mL)−V0 (mL)
A: Amount of gas production of less than 4.0 mL
B: Amount of gas production of at least 4.0 mL and less than 5.0 mL
C: Amount of gas production of at least 5.0 mL and less than 6.0 mL
D: Amount of gas production of at least 6.0 mL <Preservation Stability of Lithium Ion Secondary Battery (Experiment 2)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.20 V) and CC discharging of the lithium ion secondary battery was performed to a cell voltage of 3.00 V by a 0.2 C constant-current method.

Next, a cell volume (V0) of the lithium ion secondary battery was calculated by the Archimedean method. The lithium ion secondary battery was subsequently charged to a cell voltage of 4.40 V by a 0.2 C constant-current method at a temperature of 25° C. and was then left for 3 days at a temperature of 80±2° C. Thereafter, the lithium ion secondary battery was discharged to a cell voltage of 3.00 V by a 0.2 C constant-current method at a temperature of 25° C. Next, a cell volume (V1) of the lithium ion secondary battery was measured and an amount of gas production was calculated according to the calculation formula shown below. The calculated amount of gas production was evaluated based on the following criteria. A smaller amount of gas production indicates better high-temperature preservation characteristics.

Amount of gas production (mL)=V1 (mL)−V0 (mL)
A: Amount of gas production of less than 1.0 mL
B: Amount of gas production of at least 1.0 mL and less than 1.5 mL
C: Amount of gas production of at least 1.5 mL and less than 2.0 mL
D: Amount of gas production of at least 2.0 mL <Preservation Stability of Lithium Ion Secondary Battery (Experiment 3)>

The amount of gas production was calculated in the same way as in Experiment 1 and was evaluated based on the following criteria. A smaller amount of gas production indicates better high-temperature preservation characteristics A: Amount of gas production of less than 2.0 mL
B: Amount of gas production of at least 2.0 mL and less than 3.0 mL C: Amount of gas production of at least 3.0 mL and less than 4.0 mL D: Amount of gas production of at least 4.0 mL <Presence of Lithium Deposition (Experiment 4)>

A produced lithium ion secondary battery was left for 5 hours at a temperature of 25° C. after being filled with an electrolysis solution. Next, the lithium ion secondary battery was charged to a cell voltage of 3.65 V by a 0.2 C constant-current method at a temperature of 25° C., and was then subjected to aging treatment for 12 hours at a temperature of 60° C. The lithium ion secondary battery was subsequently discharged to a cell voltage of 3.00 V by a 0.2 C constant-current method at a temperature of 25° C. Thereafter, CC-CV charging of the lithium ion secondary battery was performed by a 0.2 C constant-current method (upper limit cell voltage 4.30 V) and CC discharging of the lithium ion secondary battery was performed to 3.00 V by a 0.2 C constant-current method.

Next, 10 cycles were carried out of an operation in which the lithium ion secondary battery was charged and discharged between a cell voltage of 4.30V and a cell voltage of 3.00V with a charge/discharge rate of 1.0 C at an ambient temperature of 25° C. Thereafter, the lithium ion secondary battery was charged to a cell voltage of 4.40 V at 0.2 C. A cell was disassembled after this charging and the surface of the negative electrode was visually inspected for the presence of lithium deposition thereon.

(Experiment 1)

Example 1-1

[Production of Aqueous Solution Containing Copolymer X1]

A 1 L flask equipped with a septum was charged with 720 g of deionized water. The deionized water was heated to a temperature of 40° C. and the inside of the flask was purged with nitrogen gas at a flow rate of 100 mL/minute. Next, 10 g of deionized water, 9.5 g (25.0%) of acrylic acid as the ethylenically unsaturated carboxylic acid compound (A), 28.5 g (74.9%) of acrylamide as the compound (B), and 0.038 g (0.1%) of ethoxylated pentaerythritol tetraacrylate (ATM-35E produced by Shin-Nakamura Chemical Co., Ltd.; equivalent to compound (V) for which $n1+n2+n3+n4=35$; functionality=4) were mixed and were injected into the flask using a syringe. Thereafter, 8.0 g of a 2.5% potassium persulfate aqueous solution was added to the flask as a polymerization initiator using a syringe. After 15 minutes had passed, 40 g of a 2.0% tetramethylethylenediamine aqueous solution was added as a polymerization accelerator using a syringe. After 4 hours had passed, a further 4.0 g of the 2.5% potassium persulfate aqueous solution was added to the flask as a polymerization initiator and a further 20 g of the 2.0% tetramethylethylenediamine aqueous solution was added as a polymerization accelerator. The flask was heated to a temperature of 60° C. in order to promote a polymerization reaction. After 3 hours had passed, the flask was opened to air to terminate the polymerization reaction, and the product was deodorized at a temperature of 80° C. to remove residual monomers.

The product was subsequently adjusted to a pH of 8 using a 10% lithium hydroxide aqueous solution to yield an aqueous solution containing a copolymer X1 (water-soluble) having a lithium carboxylate group. The degree of swelling in electrolysis solution of the copolymer X1 was measured. The results are shown in Table 1.

[Production of Slurry Composition for Lithium Ion Secondary Battery Negative Electrode-Use]

A planetary mixer was charged with 100 parts of artificial graphite (theoretical capacity: 360 mAh/g) as a negative electrode active material and 2.0 parts by solid content equivalents of the aqueous solution containing the copolymer X1 (solid content concentration: 4.5%) as a binder composition. The contents of the planetary mixer were diluted to a solid content concentration of 60% using deionized water. Thereafter, kneading was performed for 60 minutes at a rotational speed of 40 rpm to obtain a slurry in the form of a paste. A further 80 parts of deionized water was added in order to adjust the viscosity to 1100±100 mPa·s (measured by a B-type viscometer at 12 rpm) and thereby produce a slurry composition for lithium ion secondary battery negative electrode-use. At this point, the slurry composition had a solid content concentration of 45 mass %. Electrode producibility was evaluated based on the solid content concentration. The results are shown in Table 1.

[Production of Negative Electrode for Lithium Ion Secondary Battery-Use]

A comma coater was used to apply the slurry composition for lithium ion secondary battery negative electrode-use onto the surface of copper foil of 15 μm in thickness, used as a current collector, such that the application amount of the slurry composition was from 12.8 mg/cm$^2$ to 13.2 mg/cm$^2$. The copper foil onto which the slurry composition for lithium ion secondary battery negative electrode-use had been applied was conveyed inside an 80° C. oven for 2 minutes and a 110° C. oven for 2 minutes at a speed of 300 mm/minute in order to dry the slurry composition on the copper foil and thereby obtain a negative electrode web.

The resultant negative electrode web was pressed using a roll press such as to have a density of from 1.68 g/cm$^3$ to 1.72 g/cm$^3$. The pressed negative electrode web was then left for 4 hours under vacuum conditions at an ambient temperature of 105° C. in order to remove moisture and further promote crosslinking, and a negative electrode was obtained as a result. The produced negative electrode was used in order to evaluate close adherence between the negative electrode mixed material layer and the current collector. The results are shown in Table 1.

[Production of Positive Electrode for Lithium Ion Secondary Battery-Use]

A planetary mixer was charged with 100 parts of LiCoO$_2$ as a positive electrode active material, 2 parts of acetylene black (HS-100 produced by Denki Kagaku Kogyo Kabushiki Kaisha) as a conductive material, and 2 parts of PVDF (polyvinylidene fluoride, KF-1100 produced by Kureha Corporation) as a binding material. 2-Methylpyrrolidone was also added as a dispersion medium such that the total solid content concentration was 67% and mixing was performed to yield a slurry composition for lithium ion secondary battery positive electrode-use.

A comma coater was used to apply the resultant slurry composition for lithium ion secondary battery positive electrode-use onto aluminum foil of 20 μm in thickness, used as a current collector, such that the application amount of the slurry composition was from 26.5 mg/cm$^2$ to 27.5 mg/cm$^2$. Thereafter, the aluminum foil onto which the slurry composition for lithium ion secondary battery positive electrode-use had been applied was conveyed inside a 60° C. oven for 2 minutes at a speed of 0.5 m/minute in order to dry the slurry composition. Heat treatment was subsequently performed for 2 minutes at a temperature of 120° C. to obtain a positive electrode web.

The resultant positive electrode web was pressed using a roll press such as to have a density of from 3.40 g/cm$^3$ to 3.50 g/cm$^3$. The pressed positive electrode web was then left for 3 hours under vacuum conditions at an ambient temperature of 120° C. in order to remove the dispersion medium, and a positive electrode was obtained as a result.
[Production of Lithium Ion Secondary Battery]

A wound cell (discharge capacity equivalent to 480 mAh) was prepared using a single-layer separator made from polypropylene and the above-described negative and positive electrodes, and was placed inside an aluminum packing material. Thereafter, the aluminum packing material was filled with an $LiPF_6$ solution having a concentration of 1.0 M as an electrolysis solution (mixed solvent of 3/7 (volume ratio) ethylene carbonate (EC)/ethyl methyl carbonate (EMC) used as solvent; 2 volume % (solvent ratio) of vinylene carbonate contained as additive). The aluminum packing material was then closed with heat sealing at a temperature of 150° C. to tightly seal up the opening of the aluminum packing material, and a lithium ion secondary battery was accordingly produced. The lithium ion secondary battery was used in order to evaluate rate characteristics, cycle characteristics, post-cycling negative electrode expansion, and preservation stability. The results are shown in Table 1.

Examples 1-2 to 1-10 and 1-16 to 1-22

In each example, a copolymer X (water-soluble in each example) was produced in the same way as the copolymer X1 with the exception that the monomers shown in Tables 1-3 were used in the proportions shown in these tables. Moreover, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1-1 with the exception that an aqueous solution containing the aforementioned copolymer X was used as the binder composition.

Note that in some of these examples, in addition to the materials used in Example 1-1, 2-hydroxyethyl acrylate was used as the compound (B) and polyethylene glycol diacrylate (Light Acrylate 9EG-A produced by Kyoeisha Chemical Co., Ltd.; equivalent to compound (I) for which n=9; functionality=2) was used as the multifunctional compound (C).

The degree of swelling in electrolysis solution of the copolymer X, electrode producibility, close adherence between the negative electrode mixed material layer and the current collector, rate characteristics and cycle characteristics of the lithium ion secondary battery, post-cycling negative electrode expansion, and preservation stability were evaluated in the same way as in Example 1-1. The results are shown in Tables 1-3.

Example 1-11

A copolymer (water-soluble) was produced in the same way as in Example 1-5 with the exception that, in production of the aqueous solution containing the copolymer, the 10% lithium hydroxide aqueous solution was replaced with a 5% sodium hydroxide aqueous solution. Moreover, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1-5 with the exception that the above-described aqueous solution containing the copolymer was used as the binder composition.

The degree of swelling in electrolysis solution of the copolymer X, electrode producibility, close adherence between the negative electrode mixed material layer and the current collector, rate characteristics and cycle characteristics of the lithium ion secondary battery, post-cycling negative electrode expansion, and preservation stability were evaluated in the same way as in Example 1-1. The results are shown in Table 2.

Examples 1-12, 1-13, 1-15, and 1-23

A slurry composition for lithium ion secondary battery negative electrode-use, a negative electrode for lithium ion secondary battery-use, a positive electrode for lithium ion secondary battery-use, and a lithium ion secondary battery were produced in the same way as in each of Examples 1-5, 1-8, 1-10, and 1-22 with the exception that, in production of the slurry composition for lithium ion secondary battery negative electrode-use, the blending amount of the aqueous solution containing the copolymer X1 (solid content concentration: 4.5%) was changed to 1.0 parts by solid content equivalents, and an aqueous dispersion of a particulate polymer Z, which was composed of a styrene-butadiene copolymer produced as described below, was additionally blended in an amount of 1.0 parts by solid content equivalents.

The degree of swelling in electrolysis solution of the copolymer X, electrode producibility, close adherence between the negative electrode mixed material layer and the current collector, rate characteristics and cycle characteristics of the lithium ion secondary battery, post-cycling negative electrode expansion, and preservation stability were evaluated in the same way as in Example 1-1. The results are shown in Tables 1-3.
[Production of Aqueous Dispersion of Particulate Polymer Z1 Composed of Styrene-Butadiene Copolymer]

A 5 MPa pressure vessel equipped with a stirrer was charged with 65 parts (63.1%) of styrene as an aromatic vinyl monomer, 35 parts (34.0%) of 1,3-butadiene as an aliphatic conjugated diene monomer, 2 parts (1.9%) of itaconic acid as a carboxyl group-containing monomer, 1 part (1.0%) of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. The contents of the pressure vessel were sufficiently stirred and were then heated to a temperature of 55° C. to initiate polymerization.

Cooling was performed in order to terminate the reaction once the amount of monomer consumption had reached 95.0%. The aqueous dispersion containing the resultant polymer was adjusted to a pH of 8 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer Z1 composed of a styrene-butadiene copolymer. The styrene-butadiene copolymer had a gel content of 92 mass % and a glass-transition temperature (Tg) of 10° C.

Example 1-14

A slurry composition for lithium ion secondary battery negative electrode-use, a negative electrode for lithium ion secondary battery-use, a positive electrode for lithium ion secondary battery-use, and a lithium ion secondary battery were produced in the same way as in Example 1-13 with the exception that, in production of the slurry composition for lithium ion secondary battery negative electrode-use, the above-described aqueous dispersion of the particulate polymer Z1 composed of the styrene-butadiene copolymer was replaced with 1.0 parts by solid content equivalents of an aqueous dispersion of a particulate polymer Z2 composed of an acrylic-based polymer that was produced as described below.

The degree of swelling in electrolysis solution of the copolymer X, electrode producibility, close adherence between the negative electrode mixed material layer and the current collector, rate characteristics and cycle characteristics of the lithium ion secondary battery, post-cycling negative electrode expansion, and preservation stability were evaluated in the same way as in Example 1-1. The results are shown in Table 2.

[Production of Aqueous Dispersion of Particulate Polymer Z2 Composed of Acrylic-Based Polymer]

A 5 MPa pressure vessel equipped with a stirrer was charged with 82 parts (93.2%) of n-butyl acrylate as a (meth)acrylic acid ester monomer, 2 parts (2.3%) of acrylonitrile as an α,β-unsaturated monomer, 2 parts of methacrylic acid as a carboxyl group-containing monomer, 1 part (1.1%) of N-methylolacrylamide and 1 part (1.1%) of allyl glycidyl ether as crosslinking monomers, 4 parts of sodium lauryl sulfate as an emulsifier, 150 parts of deionized water as a solvent, and 0.5 parts of ammonium persulfate as a polymerization initiator. The contents of the pressure vessel were sufficiently stirred and were then heated to a temperature of 80° C. to initiate polymerization.

Cooling was performed in order to terminate the reaction once the amount of monomer consumption had reached 96.0%. The aqueous dispersion containing the resultant acrylic-based polymer was adjusted to a pH of 7 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer Z2 composed of the acrylic-based polymer. The acrylic-based polymer had a gel content of 90 mass % and a glass-transition temperature (Tg) of −50° C.

Comparative Examples 1-1 to 1-5

In each comparative example, a copolymer X (aqueous solution) was produced in the same way as the copolymer X1 with the exception that the monomers shown in Table 3 were used in the amounts shown in the same table. Moreover, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 1-1 with the exception that the aqueous solution containing the aforementioned copolymer X was used as the binder composition. In Comparative Example 1-5, methyl methacrylate was used as another compound contained in the monomer composition.

The degree of swelling in electrolysis solution of the copolymer X, electrode producibility, close adherence between the negative electrode mixed material layer and the current collector, rate characteristics and cycle characteristics of the lithium ion secondary battery, post-cycling negative electrode expansion, and preservation stability were evaluated in the same way as in Example 1-1. The results are shown in Table 3.

In Tables 1-3 shown below:
"AA" represents acrylic acid;
"AAm" represents acrylamide;
"2-HEA" represents 2-hydroxyethyl acrylate;
"EPETA" represents ethoxylated pentaerythritol tetraacrylate;
"PEGDA" represents polyethylene glycol diacrylate; and
"MMA" represents methyl methacrylate.

TABLE 1

| | | | | Example 1-1 | Example 1-2 | Example 1-3 | Example 1-4 | Example 1-5 | Example 1-6 | Example 1-7 | Example 1-8 | Example 1-9 | Example 1-10 |
|---|---|---|---|---|---|---|---|---|---|---|---|---|---|
| Copolymer X | Monomer composition | Ethylenically unsaturated carboxylic acid compound (A) [mass %] | AA | 25.0 | 24.9 | 24.8 | 24.3 | 23.8 | 22.7 | 20.8 | 47.6 | 61.9 | 71.4 |
| | | Compound (B) [mass %] | AAm | 74.9 | 74.6 | 74.2 | 72.8 | 71.4 | 68.2 | 62.5 | 47.6 | 33.3 | 23.8 |
| | | | 2-HEA | — | — | — | — | — | — | — | — | — | — |
| | | Multifunctional compound (C) [mass %] | EPETA | 0.1 | 0.5 | 1.0 | 2.9 | 4.8 | 9.1 | 16.7 | 4.8 | 4.8 | 4.8 |
| | | | PEGDA | — | — | — | — | — | — | — | — | — | — |
| | | Other compounds [mass %] | MMA | — | — | — | — | — | — | — | — | — | — |
| | | A/B [—] | | 0.33 | 0.33 | 0.33 | 0.33 | 0.33 | 0.33 | 0.33 | 1.00 | 1.86 | 3.00 |
| | | Compound used in neutralization | | LiOH | LiOH | LiOH | LiOH | LiOH | LiOH | LiOH | LiOH | LiOH | LiOH |
| | | pH after neutralization [—] | | 8 | 8 | 8 | 8 | 8 | 8 | 8 | 8 | 8 | 8 |
| | | Degree of swelling in electrolysis solution [mass %] | | 103 | 103 | 103 | 105 | 105 | 110 | 110 | 105 | 110 | 110 |
| | | Blending amount [parts by mass] | | 2 | 2 | 2 | 2 | 2 | 2 | 2 | 2 | 2 | 2 |
| Particulate polymer Z | Particulate polymer Z1 [parts by mass] | | | — | — | — | — | — | — | — | — | — | — |
| | Particulate polymer Z2 [parts by mass] | | | — | — | — | — | — | — | — | — | — | — |
| | Electrode producibility | | | A | A | A | A | A | A | A | A | A | A |
| | Close adherence between negative electrode mixed material layer and current collector | | | B | B | B | B | B | B | B | B | B | B |
| | Rate characteristics | | | B | A | A | A | A | A | A | A | B | B |
| | Cycle characteristics | | | B | A | A | A | A | B | B | B | B | B |
| | Post-cycling negative electrode thickness | | | B | A | A | A | A | B | B | B | B | B |
| | Preservation stability | | | B | A | A | A | A | B | C | B | B | C |

TABLE 2

| | | | | Example 1-11 | Example 1-12 | Example 1-13 | Example 1-14 | Example 1-15 | Example 1-16 | Example 1-17 | Example 1-18 | Example 1-19 | Example 1-20 |
|---|---|---|---|---|---|---|---|---|---|---|---|---|---|
| Copolymer X | Monomer composition | Ethylenically unsaturated carboxylic acid compound (A) [mass %] | AA | 23.8 | 23.8 | 47.6 | 47.6 | 71.4 | 23.8 | 23.8 | 23.8 | 22.7 | 25.0 |
| | | Compound (B) [mass %] | AAm | 71.4 | 71.4 | 47.6 | 47.6 | 23.8 | — | 17.9 | 35.7 | 34.1 | 70.0 |
| | | | 2-HEA | — | — | — | — | — | 71.4 | 53.5 | 35.7 | 34.1 | 5.0 |
| | | Multifunctional compound (C) [mass %] | EPETA | 4.8 | 4.8 | 4.8 | 4.8 | 4.8 | 4.8 | 4.8 | 4.8 | — | — |
| | | | PEGDA | — | — | — | — | — | — | — | — | 9.1 | — |
| | | Other compounds [mass %] | MMA | — | — | — | — | — | — | — | — | — | — |
| | | A/B [—] | | 0.33 | 0.33 | 1.00 | 1.00 | 3.00 | 0.33 | 0.33 | 0.33 | 0.33 | 0.33 |
| | Compound used in neutralization | | | NaOH | LiOH | LiOH | LiOH | LiOH | LiOH | LiOH | LiOH | LiOH | LiOH |
| | pH after neutralization [—] | | | 8 | 8 | 8 | 8 | 8 | 8 | 8 | 8 | 8 | 8 |
| | Degree of swelling in electrolysis solution [mass %] | | | 105 | 105 | 110 | 110 | 110 | 115 | 115 | 110 | 115 | 105 |
| | Blending amount [parts by mass] | | | 2 | 1 | 1 | 1 | 1 | 2 | 2 | 2 | 2 | 2 |
| Particulate polymer Z | Particulate polymer Z1 [parts by mass] | | | — | 1 | 1 | — | 1 | — | — | — | — | — |
| | Particulate polymer Z2 [parts by mass] | | | — | — | — | 1 | — | — | — | — | — | — |
| Electrode producibility | | | | A | A | A | A | C | A | A | A | A | A |
| Close adherence between negative electrode mixed material layer and current collector | | | | B | A | A | A | B | A | A | A | B | B |
| Rate characteristics | | | | B | B | B | A | B | A | A | A | A | C |
| Cycle characteristics | | | | B | A | B | B | B | A | A | A | A | C |
| Post-cycling negative electrode thickness | | | | C | A | A | A | B | B | A | A | A | C |
| Preservation stability | | | | B | A | B | B | B | A | A | A | A | C |

TABLE 3

| | | | | Example 1-21 | Example 1-22 | Example 1-23 | Comparative Example 1-1 | Comparative Example 1-2 | Comparative Example 1-3 | Comparative Example 1-4 | Comparative Example 1-5 |
|---|---|---|---|---|---|---|---|---|---|---|---|
| Copolymer X | Monomer composition | Ethylenically unsaturated carboxylic acid compound (A) [mass %] | AA | 75.0 | 50.0 | 50.0 | 15.0 | 85.0 | 15.0 | 15.0 | 15.0 |
| | | Compound (B) [mass %] | AAm | 20.0 | 50.0 | 50.0 | 85.0 | 15.0 | 80.0 | — | — |
| | | | 2-HEA | 5.0 | — | — | — | — | — | 85.0 | 65.0 |
| | | Multifunctional compound (C) [mass %] | EPETA | — | — | — | — | — | 5.0 | — | — |
| | | | PEGDA | — | — | — | — | — | — | — | — |
| | | Other compounds [mass %] | MMA | — | — | — | — | — | — | — | 20.0 |
| | | A/B [—] | | 3.00 | 1.00 | 1.00 | 0.18 | 5.67 | 0.19 | 0.18 | 0.23 |
| | Compound used in neutralization | | | LiOH | LiOH | LiOH | LiOH | LiOH | LiOH | LiOH | LiOH |
| | pH after neutralization [—] | | | 8 | 8 | 8 | 8 | 8 | 8 | 8 | 8 |
| | Degree of swelling in electrolysis solution [mass %] | | | 110 | 110 | 110 | 120 | 120 | 115 | 140 | 160 |
| | Blending amount [parts by mass] | | | 2 | 2 | 1 | 2 | 2 | 2 | 2 | 2 |
| Particulate polymer Z | Particulate polymer Z1 [parts by mass] | | | — | — | 1 | — | — | — | — | — |
| | Particulate polymer Z2 [parts by mass] | | | — | — | — | — | — | — | — | — |
| Electrode producibility | | | | A | A | A | A | A | A | B | B |
| Close adherence between negative electrode mixed material layer and current collector | | | | B | B | A | C | C | C | C | C |
| Rate characteristics | | | | B | B | B | D | C | D | D | D |
| Cycle characteristics | | | | C | C | C | D | D | D | D | D |
| Post-cycling negative electrode thickness | | | | C | C | C | C | C | C | C | C |
| Preservation stability | | | | C | C | B | D | D | D | D | D |

From Examples 1-1 to 1-23 and Comparative Examples 1-1 to 1-5 in Tables 1-3, it can be seen that, in Examples 1-1 to 1-23, lithium ion secondary battery internal resistance could be sufficiently reduced while also obtaining excellent life characteristics, such as cycle characteristics and preservation stability.

Moreover, Examples 1-1 to 1-10 and 1-16 to 1-22 in the aforementioned tables demonstrate that close adherence between a negative electrode mixed material layer and a current collector and lithium ion secondary battery life characteristics can be improved, while also further reducing lithium ion secondary battery internal resistance, by changing the types and blending proportions of monomers used in production of the copolymer X.

Furthermore, Examples 1-5 and 1-11 in the aforementioned tables demonstrate that lithium ion secondary battery internal resistance can be reduced and lithium ion secondary battery life characteristics can be improved by using a lithium hydroxide aqueous solution in neutralization of the aqueous solution containing the copolymer X such that the resultant copolymer has a lithium carboxylate group.

Also, Examples 1-5, 1-8, 1-10, and 1-22 and Examples 1-12 to 1-14 and 1-23 in the aforementioned tables demonstrate that close adherence between a negative electrode mixed material layer and a current collector can be improved by using the copolymer X and the particulate polymer Z in combination.

(Experiment 2)
<Production of Water-Soluble Polymer Y>

Water soluble polymers Y1 to Y5 that were used in examples and comparative examples of Experiment 2 were produced by the following methods. The degree of swelling in electrolysis solution and the viscosity of a 1% aqueous solution of each of the water-soluble polymers Y1 to Y5 were measured. The degree of swelling in electrolysis solution is shown in Tables 4-6.

[Water-Soluble Polymer Y1]

A 5 MPa pressure vessel equipped with a stirrer was charged with 32.5 parts (32.8%) of methacrylic acid as an acidic group-containing monomer, 65.7 parts (66.4%) of ethyl acrylate as a (meth)acrylic acid ester monomer, 0.8 parts (0.8%) of ethylene dimethacrylate as a crosslinking monomer, 1.0 parts of polyoxyalkylene alkenyl ether ammonium sulfate (LATEMUL PD-104 produced by Kao Corporation) as a reactive surfactant, 0.6 parts of t-dodecyl mercaptan, 150 parts of deionized water, and 1.0 parts of potassium persulfate (polymerization initiator). The contents of the pressure vessel were sufficiently stirred and were then heated to 60° C. to initiate polymerization. Cooling was performed in order to terminate the reaction once the polymerization conversion rate had reached 96%. Thereafter, 10% NaOH was added in order to adjust the pH to 8 and yield an aqueous solution containing a water-soluble polymer Y1.

A sample of the resultant aqueous solution containing the water-soluble polymer Y1 was taken and was adjusted to a 1 mass % aqueous solution through addition of water. Viscosity of the adjusted sample at pH 8 was measured to be 68 mPa·s.

[Water-Soluble Polymer Y2]

A 5 MPa pressure vessel equipped with a stirrer was charged with 32.5 parts (32.8%) of methacrylic acid as an acidic group-containing monomer, 7.5 parts (7.6%) of 2,2,2-trifluoroethyl methacrylate as a fluorine-containing monomer, 58.2 parts (58.8%) of ethyl acrylate as a (meth)acrylic acid ester monomer, 0.8 parts (0.8%) of ethylene dimethacrylate as a crosslinking monomer, 1.0 parts of polyoxyalkylene alkenyl ether ammonium sulfate (LATEMUL PD-104 produced by Kao Corporation) as a reactive surfactant, 0.6 parts of t-dodecyl mercaptan, 150 parts of deionized water, and 1.0 parts of potassium persulfate (polymerization initiator). The contents of the pressure vessel were sufficiently stirred and were then heated to 60° C. to initiate polymerization. Cooling was performed in order to terminate the reaction once the polymerization conversion rate had reached 96%. Thereafter, 10% ammonia water was added in order to adjust the pH to 8 and yield an aqueous solution containing a water-soluble polymer Y2.

The viscosity of a 1 mass % aqueous solution of the water-soluble polymer Y2, measured in the same way as for the water-soluble polymer Y1, was 60 mPa·s.

[Water-Soluble Polymer Y3]

An aqueous solution containing a water-soluble polymer Y3 was obtained in the same way as for the water-soluble polymer Y1 with the exception that the amount of ethylene dimethacrylate used as the crosslinking monomer was changed to 0.4 parts.

Accordingly, the make-up of the monomer composition was 33.0% of methacrylic acid, 66.6% of ethyl acrylate, and 0.4% of ethylene dimethacrylate.

The viscosity of a 1 mass % aqueous solution of the water-soluble polymer Y3, measured in the same way as for the water-soluble polymer Y1, was 46 mPa·s.

[Water-Soluble Polymer Y4]

An aqueous solution of a water-soluble polymer Y4 was obtained in the same way as for the water-soluble polymer Y1 with the exception that the amount of ethylene dimethacrylate used as the crosslinking monomer was changed to 1.5 parts.

Accordingly, the make-up of the monomer composition was 32.6% of methacrylic acid, 65.9% of ethyl acrylate, and 1.5% of ethylene dimethacrylate.

The viscosity of a 1 mass % aqueous solution of the water-soluble polymer Y4, measured in the same way as for the water-soluble polymer Y1, was 240 mPa·s.

[Water-Soluble Polymer Y5]

A 5 MPa pressure vessel equipped with a stirrer was charged with 32.5 parts (32.8%) of methacrylic acid as an acidic group-containing monomer, 45.7 parts (46.2%) of ethyl acrylate as a (meth)acrylic acid ester monomer, 20.0 parts (20.2%) of acrylamide as an amide group-containing monomer, 0.8 parts (0.8%) of ethylene dimethacrylate as a crosslinking monomer, 1.0 parts of polyoxyalkylene alkenyl ether ammonium sulfate (LATEMUL PD-104 produced by Kao Corporation) as a reactive surfactant, 0.6 parts of t-dodecyl mercaptan, 150 parts of deionized water, and 1.0 parts of potassium persulfate (polymerization initiator). The contents of the pressure vessel were sufficiently stirred and were then heated to 60° C. to initiate polymerization. Cooling was performed in order to terminate the reaction once the polymerization conversion rate had reached 96%. Thereafter, 10% NaOH was added in order to adjust the pH to 8 and yield an aqueous solution containing a water-soluble polymer Y5.

The viscosity of a 1 mass % aqueous solution of the water-soluble polymer Y5, measured in the same way as for the water-soluble polymer Y1, was 74 mPa·s.

<Production of Particulate Polymer Z>

Particulate polymers Z1 and Z2 that were used in examples and comparative examples of Experiment 2 were produced in the same way as in Experiment 1.

Example 2-1

[Production of Aqueous Solution Containing Copolymer X2]

A 1 L flask equipped with a septum was charged with 720 g of deionized water. The deionized water was heated to a temperature of 40° C. and the inside of the flask was purged with nitrogen gas at a flow rate of 100 mL/minute. Next, 10 g of deionized water, 9.5 g (25.0%) of acrylic acid as the ethylenically unsaturated carboxylic acid compound (A), and 28.5 g (75.0%) of acrylamide as the compound (B) were mixed and were injected into the flask using a syringe. Thereafter, 8.0 g of a 2.5% potassium persulfate aqueous solution was added to the flask as a polymerization initiator using a syringe. After 15 minutes had passed, 40 g of a 2.0% tetramethylethylenediamine aqueous solution was added as a polymerization accelerator using a syringe. After 4 hours had passed, a further 4.0 g of the 2.5% potassium persulfate aqueous solution was added to the flask as a polymerization initiator and a further 20 g of the 2.0% tetramethylethylenediamine aqueous solution was added as a polymerization accelerator. Heating was performed to a temperature of 60° C. in order to promote a polymerization reaction. After 3 hours had passed, the flask was opened to air to terminate the polymerization reaction, and the product was deodorized at a temperature of 80° C. to remove residual monomers.

Thereafter, the product was adjusted to a pH of 8 using a 10% lithium hydroxide aqueous solution in order to yield an aqueous solution containing a copolymer X2 (water-soluble) having a lithium carboxylate group. The degree of swelling in electrolysis solution of the copolymer X2 was measured. The results are shown in Table 4.

[Production of Slurry Composition for Lithium Ion Secondary Battery Negative Electrode-Use]

A planetary mixer was charged with 100 parts of amorphous-coated natural graphite (theoretical capacity: 350 mAh/g) as a negative electrode active material, 1 part of acetylene black (HS-100 produced by Denki Kagaku Kogyo Kabushiki Kaisha) as a conductive material, and 1.49 parts by solid content equivalents of the aqueous solution containing the copolymer X2 (solid content concentration: 4.5%). The contents of the planetary mixer were diluted to a solid content concentration of 60% using deionized water and were subsequently kneaded for 60 minutes at a rotational speed of 45 rpm. Thereafter, 0.01 parts by solid content equivalents of the aqueous solution containing the water-soluble polymer Y1 (solid content concentration: 30%) was added and further kneading was performed for 40 minutes at a rotational speed of 40 rpm. Deionized water was added in order to adjust the viscosity to 1100±100 mPa·s (measured by a B-type viscometer at 12 rpm) and thereby produce a slurry composition for lithium ion secondary battery negative electrode-use. At this point, the slurry composition had a solid content concentration of 45 mass %. Electrode producibility was evaluated based on the solid content concentration. The results are shown in Table 4.

[Production of Negative Electrode for Lithium Ion Secondary Battery-Use]

A comma coater was used to apply the slurry composition for lithium ion secondary battery negative electrode-use onto the surface of copper foil of 15 μm in thickness, used as a current collector, such that the application amount of the slurry composition was from 8.8 mg/cm$^2$ to 9.2 mg/cm$^2$. The copper foil onto which the slurry composition for lithium ion secondary battery negative electrode-use had been applied was conveyed inside an 80° C. oven for 2 minutes and a 110° C. oven for 2 minutes at a speed of 400 mm/minute in order to dry the slurry composition on the copper foil, and thereby obtain a negative electrode web.

The resultant negative electrode web was pressed using a roll press such as to have a density of from 1.48 g/cm$^3$ to 1.52 g/cm$^3$. The pressed negative electrode web was then left for 4 hours under vacuum conditions at an ambient temperature of 105° C. to obtain a negative electrode. The negative electrode was used in order to evaluate close adherence between the negative electrode mixed material layer and the current collector. The results are shown in Table 4.

[Production of Positive Electrode for Lithium Ion Secondary Battery-Use]

A planetary mixer was charged with 100 parts of a lithium-containing composite oxide of Co—Ni—Mn as a positive electrode active material, 2 parts of acetylene black (HS-100 produced by Denki Kagaku Kogyo Kabushiki Kaisha) as a conductive material, and 2 parts of PVDF (polyvinylidene fluoride, KF-1100 produced by Kureha Corporation) as a binding material. 2-Methylpyrrolidone was also added as a dispersion medium such that the total solid content concentration was 67% and mixing was performed to yield a slurry composition for lithium ion secondary battery positive electrode-use.

A comma coater was used to apply the resultant slurry composition for lithium ion secondary battery positive electrode-use onto aluminum foil of 20 μm in thickness, used as a current collector, such that the application amount of the slurry composition was from 16.5 mg/cm$^2$ to 17.5 mg/cm$^2$. Thereafter, the aluminum foil onto which the slurry composition for lithium ion secondary battery positive electrode-use had been applied was conveyed inside a 60° C. oven for 2 minutes at a speed of 0.5 m/minute in order to dry the slurry composition. Thereafter, heat treatment was performed for 2 minutes at a temperature of 120° C. to obtain a positive electrode web.

The resultant positive electrode web was pressed using a roll press such as to have a density of from 3.10 g/cm$^3$ to 3.30 g/cm$^3$. The pressed positive electrode web was then left for 3 hours under vacuum conditions at an ambient temperature of 120° C. in order to remove the dispersion medium, and a positive electrode was obtained as a result.

[Production of Lithium Ion Secondary Battery]

A wound cell (discharge capacity equivalent to 400 mAh) was prepared using a single-layer separator made from polypropylene and the above-described negative and positive electrodes, and was placed inside an aluminum packing material. Thereafter, the aluminum packing material was filled with an LiPF$_6$ solution having a concentration of 1.0 M as an electrolysis solution (mixed solvent of 3/7 (volume ratio) ethylene carbonate (EC)/ethyl methyl carbonate (EMC) used as solvent; 2 volume % (solvent ratio) of vinylene carbonate contained as additive). The aluminum packing material was then closed with heat sealing at a temperature of 150° C. to tightly seal up the opening of the aluminum packing material, and a lithium ion secondary battery was accordingly produced. The lithium ion secondary battery was used in order to evaluate rate characteristics, cycle characteristics, and preservation stability. The results are shown in Table 4.

Examples 2-2 to 2-5

In each example, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-1 with the exception that the amounts of the copolymer X2 and the water-soluble polymer Y1 were changed as shown in Table 4.

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 4.

Examples 2-6, 2-7, 2-10 to 2-14, and 2-23 to 2-25

In each example, a copolymer X (water-soluble in each example) was produced in the same way as the copolymer X2 with the exception that the monomers shown in Tables 4-6 were used in the proportions shown in these tables. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that the aforementioned copolymer X was used.

The degree of swelling in electrolysis solution of the copolymer X was measured in the same way as in Example 2-1. Moreover, electrode producibility, close adherence between a negative electrode mixed material layer and a current collector, and lithium ion secondary battery rate characteristics, cycle characteristics, and preservation stability were evaluated in the same way as in Example 2-1. The results are shown in Tables 4-6.

Note that in production of the copolymer X in some of these examples, in addition to the materials used in Example 2-1, 2-hydroxyethyl acrylate and acrylonitrile were used as the compound (B) and ethoxylated pentaerythritol tetraacrylate (ATM-35E produced by Shin-Nakamura Chemical Co., Ltd.; equivalent to compound (V) for which n1+n2+n3+n4=35; functionality=4) was used as the multifunctional compound (C) as shown in Tables 4-6.

Examples 2-8 and 2-9

In each example, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that, after addition of the aqueous solution containing the water-soluble polymer Y1, the aqueous dispersion of the particulate polymer Z1 or Z2 was added in a solid content equivalent amount shown in Table 4, kneading was performed for 45 minutes at a rotational speed of 40 rpm, and deionized water was subsequently used to adjust the viscosity to 1100±100 mPa·s (measured by a B-type viscometer at 12 rpm).

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 4.

Examples 2-15 and 2-16

In each example, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-11 with the exception that, after addition of the aqueous solution containing the water-soluble polymer Y1, the aqueous dispersion of the particulate polymer Z1 or Z2 was added in a solid content equivalent amount shown in Table 5, kneading was performed for 45 minutes at a rotational speed of 40 rpm, and deionized water was subsequently used to adjust the viscosity to 1100±100 mPa·s (measured by a B-type viscometer at 12 rpm).

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 5.

Example 2-17

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that the amount of the copolymer X1 was changed as shown in Table 5 and, after addition of the aqueous solution containing the water-soluble polymer Y1, a 2% aqueous solution of carboxymethyl cellulose sodium salt (MAC350HC produced by Nippon Paper Industries Co., Ltd., degree of swelling in electrolysis solution 115 mass %) was further added in the solid content equivalent amount shown in Table 5, kneading was performed for 45 minutes at a rotational speed of 40 rpm, and deionized water was subsequently used to adjust the viscosity to 1100±100 mPa·s (measured by a B-type viscometer at 12 rpm).

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 5.

Example 2-18

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that, after addition of the aqueous solution containing the water-soluble polymer Y1, a 2% aqueous solution of carboxymethyl cellulose sodium salt (MAC350HC produced by Nippon Paper Industries Co., Ltd., degree of swelling in electrolysis solution 115 mass %) was further added in the solid content equivalent amount shown in Table 5, kneading was performed for 45 minutes at a rotational speed of 40 rpm, the particulate polymer Z1 was further added in the solid content equivalent amount shown in Table 5, kneading was performed for 30 minutes at a rotational speed of 40 rpm, and deionized water was subsequently used to adjust the viscosity to 1100±100 mPa·s (measured by a B-type viscometer at 12 rpm).

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 5.

Examples 2-19 to 2-22

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that the water-soluble polymer Y1 was replaced with the water-soluble polymers Y2 to Y5 in Examples 2-19 to 2-22, respectively.

Electrode producibility, close adherence between a negative electrode mixed material layer and a current collector, and lithium ion secondary battery rate characteristics, cycle characteristics, and preservation stability were evaluated in the same way as in Example 2-1. The results are shown in Tables 5 and 6.

Example 2-26

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-19 with the exception that, after addition of the aqueous solution containing the water-soluble polymer Y2, the aqueous dispersion of the particulate polymer Z1 was further added in the solid content equivalent amount shown in Table 6, kneading was performed for 45 minutes at a rotational speed of 40 rpm, and deionized water was subsequently used to adjust the viscosity to 1100±100 mPa·s (measured by a B-type viscometer at 12 rpm).

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 6.

Example 2-27

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that, in production of the aqueous solution containing the copolymer X2, the 10% lithium hydroxide aqueous solution was replaced with a 10% sodium hydroxide aqueous solution.

Electrode producibility, close adherence between a negative electrode mixed material layer and a current collector, and lithium ion secondary battery rate characteristics, cycle characteristics, and preservation stability were evaluated in the same way as in Example 2-1. The results are shown in Table 6.

Comparative Examples 2-1 to 2-3

In each comparative example, a copolymer X (water-soluble in each comparative example) was produced in the same way as the copolymer X2 with the exception that the monomers shown in Table 6 were used in the proportions shown in the same table. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 2-3 with the exception that the aforementioned copolymer X was used.

Note that as shown in Table 6, methyl acrylate was used as another compound (monomer) in production of the copolymer X in addition to the materials used in Example 2-1.

The degree of swelling in electrolysis solution of the copolymer X was measured in the same way as in Example 2-1. Moreover, electrode producibility, close adherence between a negative electrode mixed material layer and a current collector, and lithium ion secondary battery rate characteristics, cycle characteristics, and preservation stability were evaluated in the same way as in Example 2-1. The results are shown in Table 6.

In Tables 4-6 shown below:
"AA" represents acrylic acid;
"AAm" represents acrylamide;
"2-HEA" represents 2-hydroxyethyl acrylate;
"AN" represents acrylonitrile;
"EPETA" represents ethoxylated pentaerythritol tetraacrylate;
"MA" represents methyl acrylate; and
"CMC" represents carboxymethyl cellulose sodium salt.

TABLE 4

| | | | | Example 2-1 | Example 2-2 | Example 2-3 | Example 2-4 | Example 2-5 |
|---|---|---|---|---|---|---|---|---|
| Co-polymer X | Monomer composition | Ethylenically unsaturated carboxylic acid compound (A) [mass %] | AA | 25.0 | 25.0 | 25.0 | 25.0 | 25.0 |
| | | Compound (B) [mass %] | AAm | 75.0 | 75.0 | 75.0 | 75.0 | 75.0 |
| | | | 2-HEA | — | — | — | — | — |
| | | | AN | — | — | — | — | — |
| | | Multifunctional compound (C) [mass %] | EPETA | — | — | — | — | — |
| | | Other compounds [mass %] | MA | — | — | — | — | — |
| | | A/B [—] | | 0.33 | 0.33 | 0.33 | 0.33 | 0.33 |
| | | Compound used in neutralization | | LiOH | LiOH | LiOH | LiOH | LiOH |
| | | Degree of swelling in electrolysis solution [mass %] | | 105 | 105 | 105 | 105 | 105 |
| | | Blending amount [parts by mass] | | 1.49 | 1.4 | 1.3 | 1.1 | 1 |

TABLE 4-continued

| | | | | | | | |
|---|---|---|---|---|---|---|---|
| Water-soluble polymer Y | Type | | Y1 | Y1 | Y1 | Y1 | Y1 |
| | Degree of swelling in electrolysis solution [mass %] | | 350 | 350 | 350 | 350 | 350 |
| | Blending amount [parts by mass] | | 0.01 | 0.1 | 0.2 | 0.4 | 0.5 |
| | Y/X [-] | | 0.007 | 0.071 | 0.154 | 0.364 | 0.500 |
| Particulate polymer Z | Type | | — | — | — | — | — |
| | Gel content [mass %] | | — | — | — | — | — |
| | Degree of swelling in electrolysis solution [mass %] | | — | — | — | — | — |
| | Blending amount [parts by mass] | | — | — | — | — | — |
| | Z/X [-] | | — | — | — | — | — |
| | Z/(X + Y) [-] | | — | — | — | — | — |
| Thickener | Type | | — | — | — | — | — |
| | Blending amount [parts by mass] | | — | — | — | — | — |
| | Electrode productibility | | B | B | B | B | B |
| | Close adherence between negative electrode mixed material layer and current collector | | B | B | B | B | B |
| | Rate characteristics | | B | A | A | B | B |
| | Cycle characteristics | | C | B | B | B | C |
| | Preservation stability | | C | B | B | B | C |

| | | | | Example 2-6 | Example 2-7 | Example 2-8 | Example 2-9 | Example 2-10 |
|---|---|---|---|---|---|---|---|---|
| Copolymer X | Monomer composition | Ethylenically unsaturated carboxylic acid compound (A) [mass %] | AA | 50.0 | 75.0 | 25.0 | 25.0 | 24.0 |
| | | Compound (B) [mass %] | AAm | 50.0 | 25.0 | 75.0 | 75.0 | 75.0 |
| | | | 2-HEA | — | — | — | — | — |
| | | | AN | — | — | — | — | — |
| | | Multifunctional compound (C) [mass %] | EPETA | — | — | — | — | 1.0 |
| | | Other compounds [mass %] | MA | — | — | — | — | — |
| | | A/B [-] | | 1.00 | 3.00 | 0.33 | 0.33 | 0.32 |
| | | Compound used in neutralization | | LiOH | LiOH | LiOH | LiOH | LiOH |
| | | Degree of swelling in electrolysis solution [mass %] | | 110 | 110 | 105 | 105 | 105 |
| | | Blending amount [parts by mass] | | 1.3 | 1.3 | 1.3 | 1.3 | 1.3 |
| Water-soluble polymer Y | Type | | | Y1 | Y1 | Y1 | Y1 | Y1 |
| | Degree of swelling in electrolysis solution [mass %] | | | 350 | 350 | 350 | 350 | 350 |
| | Blending amount [parts by mass] | | | 0.2 | 0.2 | 0.2 | 0.2 | 0.2 |
| | Y/X [-] | | | 0.154 | 0.154 | 0.154 | 0.154 | 0.154 |
| Particulate polymer Z | Type | | | — | — | Z1 | Z2 | — |
| | Gel content [mass %] | | | — | — | 91 | 90 | — |
| | Degree of swelling in electrolysis solution [mass %] | | | — | — | 150 | 450 | — |
| | Blending amount [parts by mass] | | | — | — | 1 | 1 | — |
| | Z/X [-] | | | — | — | 0.77 | 0.77 | — |
| | Z/(X + Y) [-] | | | — | — | 0.67 | 0.67 | — |
| Thickener | Type | | | — | — | — | — | — |
| | Blending amount [parts by mass] | | | — | — | — | — | — |
| | Electrode productibility | | | B | B | B | B | A |
| | Close adherence between negative electrode mixed material layer and current collector | | | B | B | A | A | B |
| | Rate characteristics | | | B | B | B | A | A |
| | Cycle characteristics | | | B | B | B | B | A |
| | Preservation stability | | | B | B | B | A | B |

TABLE 5

| | | | | Example 2-11 | Example 2-12 | Example 2-13 | Example 2-14 | Example 2-15 | Example 2-16 |
|---|---|---|---|---|---|---|---|---|---|
| Copolymer X | Monomer composition | Ethylenically unsaturated carboxylic acid compound (A) [mass %] | AA | 25.0 | 25.0 | 25.0 | 20.0 | 25.0 | 25.0 |
| | | Compound (B) [mass %] | AAm | 70.0 | 65.0 | 60.0 | 50.0 | 70.0 | 70.0 |
| | | | 2-HEA | — | — | — | — | — | — |
| | | | AN | — | — | — | — | — | — |

TABLE 5-continued

|  |  |  |  |  |  |  |  |
|---|---|---|---|---|---|---|---|
| Copolymer X | Monomer composition | Multifunctional compound (C) [mass %] | EPETA | 5.0 | 10.0 | 15.0 | 30.0 | 5.0 | 5.0 |
|  |  | Other compounds [mass %] | MA | — | — | — | — | — | — |
|  |  | A/B [−] |  | 0.36 | 0.38 | 0.42 | 0.40 | 0.36 | 0.36 |
|  |  | Compound used in neutrahzation |  | LiOH | LiOH | LiOH | LiOH | LiOH | LiOH |
|  |  | Degree of swelling in electrolysis solution [mass %] |  | 105 | 110 | 115 | 118 | 105 | 105 |
|  |  | Blending amount [parts by mass] |  | 1.3 | 1.3 | 1.3 | 1.3 | 1.3 | 1.3 |
| Water soluble polymer Y | Type |  |  | Y1 | Y1 | Y1 | Y1 | Y1 | Y1 |
|  | Degree of swelling in electrolysis solution [mass %] |  |  | 350 | 350 | 350 | 350 | 350 | 350 |
|  | Blending amount [parts by mass] |  |  | 0.2 | 0.2 | 0.2 | 0.2 | 0.2 | 0.2 |
|  | Y/X [−] |  |  | 0.154 | 0.154 | 0.154 | 0.154 | 0.154 | 0.154 |
| Particulate polymer Z | Type |  |  | — | — | — | — | Z1 | Z2 |
|  | Gel content [mass %] |  |  | — | — | — | — | 91 | 90 |
|  | Degree of swelling in electrolysis solution [mass %] |  |  | — | — | — | — | 150 | 450 |
|  | Blending amount [parts by mass] |  |  | — | — | — | — | 1 | 1 |
|  | Z/X [−] |  |  | — | — | — | — | 0.77 | 0.77 |
|  | Z/(X + Y) [−] |  |  | — | — | — | — | 0.67 | 0.67 |
| Thickener | Type |  |  | — | — | — | — | — | — |
|  | Blending amount [parts by mass] |  |  | — | — | — | — | — | — |
| Electrode producibility |  |  |  | A | A | A | A | A | A |
| Close adherence between negative electrode mixed material layer and current collector |  |  |  | B | B | B | B | A | A |
| Rate characteristics |  |  |  | A | A | A | A | B | A |
| Cycle characteristics |  |  |  | A | A | A | B | A | A |
| Preservation stability |  |  |  | B | A | A | B | A | A |

|  |  |  |  | Example 2-17 | Example 2-18 | Example 2-19 | Example 2-20 | Example 2-21 |
|---|---|---|---|---|---|---|---|---|
| Copolymer X | Monomer composition | Ethylenically unsaturated carboxylic acid compound (A) [mass %] | AA | 25.0 | 25.0 | 25.0 | 25.0 | 25.0 |
|  |  | Compound (B) [mass %] | AAm | 75.0 | 75.0 | 75.0 | 75.0 | 75.0 |
|  |  |  | 2-HEA | — | — | — | — | — |
|  |  |  | AN | — | — | — | — | — |
|  |  | Multifunctional compound (C) [mass %] | EPETA | — | — | — | — | — |
|  |  | Other compounds [mass %] | MA | — | — | — | — | — |
|  |  | A/B [−] |  | 0.33 | 0.33 | 0.33 | 0.33 | 0.33 |
|  |  | Compound used in neutrahzation |  | LiOH | LiOH | LiOH | LOH | LOH |
|  |  | Degree of swelling in electrolysis solution [mass %] |  | 105 | 105 | 105 | 105 | 105 |
|  |  | Blending amount [parts by mass] |  | 0.8 | 0.8 | 1.3 | 1.3 | 1.3 |
| Water soluble polymer Y | Type |  |  | Y1 | Y1 | Y2 | Y3 | Y4 |
|  | Degree of swelling in electrolysis solution [mass %] |  |  | 350 | 350 | 350 | 670 | 230 |
|  | Blending amount [parts by mass] |  |  | 0.2 | 0.2 | 0.2 | 0.2 | 0.2 |
|  | Y/X [−] |  |  | 0.250 | 0.250 | 0.154 | 0.154 | 0.154 |
| Particulate polymer Z | Type |  |  | — | Z1 | — | — | — |
|  | Gel content [mass %] |  |  | — | 91 | — | — | — |
|  | Degree of swelling in electrolysis solution [mass %] |  |  | — | 150 | — | — | — |
|  | Blending amount [parts by mass] |  |  | — | 1 | — | — | — |
|  | Z/X [−] |  |  | — | 1.25 | — | — | — |
|  | Z/(X + Y) [−] |  |  | — | 1.00 | — | — | — |
| Thickener | Type |  |  | CMC | CMC | — | — | — |
|  | Blending amount [parts by mass] |  |  | 0.5 | 0.5 | — | — | — |
| Electrode producibility |  |  |  | B | B | B | B | B |
| Close adherence between negative electrode mixed material layer and current collector |  |  |  | B | A | B | B | B |
| Rate characteristics |  |  |  | A | A | A | A | B |
| Cycle characteristics |  |  |  | B | B | A | A | B |
| Preservation stability |  |  |  | B | B | A | B | B |

TABLE 6

|  |  |  |  | Example 2-22 | Example 2-23 | Example 2-24 | Example 2-25 | Example 2-26 |
|---|---|---|---|---|---|---|---|---|
| Copolymer X | Monomer composition | Ethylenically unsaturated calboxylic acid compound (A) [mass %] | AA | 25.0 | 25.0 | 50.0 | 25.0 | 25.0 |
|  |  | Compound (B) [mass %] | AAm | 75.0 | — | — | — | 75.0 |
|  |  |  | 2-HEA | — | 75.0 | 50.0 | — | — |
|  |  |  | AN | — | — | — | 75.0 | — |
|  |  | Multifunctional compound (C) [mass %] | EPETA | — | — | — | — | — |
|  |  | Other compounds [mass %] | MA | — | — | — | — | — |
|  |  | A/B [—] |  | 0.33 | 0.33 | 1.00 | 0.33 | 0.33 |
|  |  | Compound used in neutralization |  | LiOH | LiOH | LiOH | LiOH | LiOH |
|  |  | Degree of swelling in electrolysis solution [mass %] |  | 105 | 107 | 113 | 115 | 105 |
|  |  | Blending amount [parts by mass] |  | 1.3 | 1.3 | 1.3 | 1.3 | 1.3 |
| Water-soluble polymer Y |  | Type |  | Y5 | Y1 | Y1 | Y1 | Y2 |
|  |  | Degree of swelling in electrolysis solution [mass %] |  | 180 | 350 | 350 | 350 | 350 |
|  |  | Blending amount [parts by mass] |  | 0.2 | 0.2 | 0.2 | 0.2 | 0.2 |
|  |  | Y/X [—] |  | 0.154 | 0.154 | 0.154 | 0.154 | 0.154 |
| Particulate polymer Z |  | Type |  | — | — | — | — | Z1 |
|  |  | Gel content [mass %] |  | — | — | — | — | 91 |
|  |  | Degree of swelling in electrolysis solution [mass %] |  | — | — | — | — | 150 |
|  |  | Blending amount [parts by mass] |  | — | — | — | — | 1 |
|  |  | Z/X [—] |  | — | — | — | — | 0.77 |
|  |  | Z/(X + Y) [—] |  | — | — | — | — | 0.67 |
| Thickener |  | Type |  | — | — | — | — | — |
|  |  | Blending amount [parts by mass] |  | — | — | — | — | — |
|  |  | Electrode producibility |  | B | B | B | B | A |
|  |  | Close adherence between negative electrode mixed material layer and current collector |  | B | B | B | B | A |
|  |  | Rate characteristics |  | B | B | C | B | A |
|  |  | Cycle characteristics |  | B | B | C | C | A |
|  |  | Preservation stability |  | B | B | B | B | A |

|  |  |  |  | Example 2-27 | Comparative Example 2-1 | Comparative Example 2-2 | Comparative Example 2-3 |
|---|---|---|---|---|---|---|---|
| Copolymer X | Monomer composition | Ethylenically unsaturated calboxylic acid compound (A) [mass %] | AA | 25.0 | 25.0 | 10.0 | 80.0 |
|  |  | Compound (B) [mass %] | AAm | 75.0 | 40.0 | 80.0 | 10.0 |
|  |  |  | 2-HEA | — | — | — | — |
|  |  |  | AN | — | — | — | — |
|  |  | Multifunctional compound (C) [mass %] | EPETA | — | — | — | — |
|  |  | Other compounds [mass %] | MA | — | 35.0 | 10.0 | 10.0 |
|  |  | A/B [—] |  | 0.33 | 0.63 | 0.13 | 8.00 |
|  |  | Compound used in neutralization |  | NaOH | LiOH | LiOH | LiOH |
|  |  | Degree of swelling in electrolysis solution [mass %] |  | 105 | 140 | 115 | 125 |
|  |  | Blending amount [parts by mass] |  | 1.3 | 1.3 | 1.3 | 1.3 |
| Water-soluble polymer Y |  | Type |  | Y1 | Y1 | Y1 | Y1 |
|  |  | Degree of swelling in electrolysis solution [mass %] |  | 350 | 350 | 350 | 350 |
|  |  | Blending amount [parts by mass] |  | 0.2 | 0.2 | 0.2 | 0.2 |
|  |  | Y/X [—] |  | 0.154 | 0.154 | 0.154 | 0.154 |
| Particulate polymer Z |  | Type |  | — | — | — | — |
|  |  | Gel content [mass %] |  | — | — | — | — |
|  |  | Degree of swelling in electrolysis solution [mass %] |  | — | — | — | — |
|  |  | Blending amount [parts by mass] |  | — | — | — | — |
|  |  | Z/X [—] |  | — | — | — | — |
|  |  | Z/(X + Y) [—] |  | — | — | — | — |
| Thickener |  | Type |  | — | — | — | — |
|  |  | Blending amount [parts by mass] |  | — | — | — | — |
|  |  | Electrode producibility |  | B | B | B | B |

TABLE 6-continued

| | | | | |
|---|---|---|---|---|
| Close adherence between negative electrode mixed material layer and current collector | B | B | B | B |
| Rate characteristics | B | C | C | C |
| Cycle characteristics | B | D | D | D |
| Preservation stability | B | D | D | D |

From Examples 2-1 to 2-17 and Comparative Examples 2-1 to 2-3 in Tables 4-6, it can be seen that, in Examples 2-1 to 2-27, lithium ion secondary battery internal resistance could be sufficiently reduced while also obtaining excellent lithium ion secondary battery life characteristics, such as cycle characteristics and preservation stability.

Moreover, Examples 2-1 to 2-5 in the aforementioned tables demonstrate that lithium ion secondary battery internal resistance can be further reduced and lithium ion secondary battery life characteristics can be further improved by changing the blending amount of the copolymer X, the blending amount of the water-soluble polymer Y, and the ratio (Y/X) of these blending amounts.

Furthermore, Examples 2-3, 2-6, 2-7, 2-10 to 2-14, and 2-23 to 2-25 in the aforementioned tables demonstrate that lithium ion secondary battery internal resistance can be further reduced, and electrode producibility and lithium ion secondary battery life characteristics can be further improved by changing the type and blending proportions of monomers used in production of the copolymer X.

Also, Examples 2-3, 2-8, 2-9, and 2-19 and Examples 2-11, 2-15, 2-16, and 2-26 in the aforementioned tables demonstrate that electrode producibility, close adherence between a negative electrode mixed material layer and a current collector, and lithium ion secondary battery preservation characteristics can be further improved by additionally using the particulate polymer Z.

Additionally, Examples 2-17 and 2-18 in the aforementioned tables demonstrate that lithium ion secondary battery internal resistance can be sufficiently reduced while also obtaining excellent lithium ion secondary battery life characteristics, such as cycle characteristics and preservation stability, even in a situation in which a thickener is also used.

Moreover, Examples 2-3 and 2-19 to 2-22 in the aforementioned tables demonstrate that lithium ion secondary battery internal resistance can be further reduced and lithium ion secondary battery life characteristics can be further improved by changing the composition of the water-soluble polymer Y. In particular, it can be seen from comparison of Examples 2-3 and 2-19 that lithium ion secondary battery life characteristics can be further improved through inclusion of a structural unit derived from a fluorine-containing monomer in the water-soluble polymer Y.

Furthermore, Examples 2-3 and 2-27 in the aforementioned tables demonstrate that lithium ion secondary battery internal resistance can be further reduced by using a lithium hydroxide aqueous solution in neutralization of the aqueous solution containing the copolymer X such that the resultant copolymer X has a lithium carboxylate group.

(Experiment 3)
<Production of Particulate polymer Z>

Particulate polymers Z1 to Z5 that were used in examples and comparative examples of Experiment 3 were produced by the following methods. The gel content, the degree of swelling in electrolysis solution, and the glass-transition temperature of each of the particulate polymers Z1 to Z5 were measured. The gel content and the degree of swelling in electrolysis solution are shown in Tables 7-9.

[Particulate Polymer Z1 (Styrene-Butadiene-Based Polymer)]

An aqueous dispersion containing the particulate polymer Z1 composed of a styrene-butadiene-based polymer was obtained in the same way as in Experiment 1.

[Particulate Polymer Z2 (Acrylic-Based Polymer)]

An aqueous dispersion containing the particulate polymer Z2 composed of an acrylic-based polymer was obtained in the same way as in Experiment 1.

[Particulate Polymer Z3 (Styrene-Butadiene-Based Polymer)]

An aqueous dispersion containing a particulate polymer Z3 composed of a styrene-butadiene-based polymer was obtained in the same way as for the particulate polymer Z1 with the exception that 0.4 parts of t-dodecyl mercaptan was used as a molecular weight modifier. The particulate polymer Z3 had a glass-transition temperature (Tg) of 10° C.

[Particulate Polymer Z4 (Styrene-Butadiene-Based Polymer)]

An aqueous dispersion containing a particulate polymer Z4 composed of a styrene-butadiene-based polymer was obtained in the same way as for the particulate polymer Z1 with the exception that 0.2 parts of t-dodecyl mercaptan was used as a molecular weight modifier. The particulate polymer Z4 had a glass-transition temperature (Tg) of 10° C.

[Particulate Polymer Z5 (Styrene-Butadiene-Based Polymer)]

A 5 MPa pressure vessel equipped with a stirrer was charged with 63 parts (61.2%) of styrene as an aromatic vinyl monomer, 33 parts (32.0%) of 1,3-butadiene as an aliphatic conjugated diene monomer, 2 parts (1.9%) of itaconic acid as a carboxyl group-containing monomer, 4 parts (3.9%) of 2,2,2-trifluoroethyl methacrylate as a fluorine-containing monomer, 1 part (1.0%) of 2-hydroxyethyl acrylate, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. The contents of the pressure vessel were sufficiently stirred and were then heated to a temperature of 55° C. to initiate polymerization.

Cooling was performed in order to terminate the reaction once the amount of monomer consumption had reached 95.0%. The aqueous dispersion containing the resultant polymer was adjusted to a pH of 8 through addition of a 5% sodium hydroxide aqueous solution. Thereafter, unreacted monomers were removed by distillation under heating and reduced pressure. Cooling was then performed to a temperature of 30° C. or lower to yield an aqueous dispersion containing a particulate polymer Z5 composed of a styrene-butadiene-based polymer. The particulate polymer Z5 had a glass-transition temperature (Tg) of 10° C.

Example 3-1

[Production of Aqueous Solution Containing Copolymer X3]

An aqueous solution containing a copolymer X3 was produced as described below, in the same way as the copolymer X2 in Experiment 2.

A 1 L flask equipped with a septum was charged with 720 g of deionized water. The deionized water was heated to a temperature of 40° C. and the inside of the flask was purged with nitrogen gas at a flow rate of 100 mL/minute. Next, 10 g of deionized water, 9.5 g (25.0%) of acrylic acid as the ethylenically unsaturated carboxylic acid compound (A), and 28.5 g (75.0%) of acrylamide as the compound (B) were mixed and were injected into the flask using a syringe. Thereafter, 8.0 g of a 2.5% potassium persulfate aqueous solution was added to the flask as a polymerization initiator using a syringe. After 15 minutes had passed, 40 g of a 2.0% tetramethylethylenediamine aqueous solution was added as a polymerization accelerator using a syringe. After 4 hours had passed, a further 4.0 g of the 2.5% potassium persulfate aqueous solution was added to the flask as a polymerization initiator and a further 20 g of the 2.0% tetramethylethylenediamine aqueous solution was added as a polymerization accelerator. Heating was performed to a temperature of 60° C. in order to promote a polymerization reaction. After 3 hours had passed, the flask was opened to air to terminate the polymerization reaction, and the product was deodorized at a temperature of 80° C. to remove residual monomers.

Thereafter, the product was adjusted to a pH of 8 using a 10% lithium hydroxide aqueous solution in order to yield an aqueous solution containing a copolymer X3 (water-soluble) having a lithium carboxylate group. The degree of swelling in electrolysis solution of the copolymer X3 was measured. The results are shown in Table 7.

[Production of Slurry Composition for Lithium Ion Secondary Battery Negative Electrode-Use]

A planetary mixer was charged with 100 parts of artificial graphite (theoretical capacity: 360 mAh/g) as a negative electrode active material and 1.0 parts by solid content equivalents of the aqueous solution containing the copolymer X3 (solid content concentration: 4.5%). The contents of the planetary mixer were diluted to a solid content concentration of 60% using deionized water and were subsequently kneaded for 60 minutes at a rotational speed of 45 rpm. Thereafter, 0.2 parts by solid content equivalents of the aqueous dispersion containing the particulate polymer Z1 (solid content concentration: 40%) was added and further kneading was performed for 40 minutes at a rotational speed of 40 rpm. Deionized water was added in order to adjust the viscosity to 1100±100 mPa·s (measured by a B-type viscometer at 12 rpm) and thereby produce a slurry composition for lithium ion secondary battery negative electrode-use. At this point, the slurry composition had a solid content concentration of 45 mass %. Electrode producibility was evaluated based on the solid content concentration. The results are shown in Table 7.

[Production of Negative Electrode for Lithium Ion Secondary Battery-Use]

A comma coater was used to apply the slurry composition for lithium ion secondary battery negative electrode-use onto the surface of copper foil of 15 μm in thickness, used as a current collector, such that the application amount of the slurry composition was from 13.8 mg/cm² to 14.2 mg/cm². The copper foil onto which the slurry composition for lithium ion secondary battery negative electrode-use had been applied was conveyed inside an 80° C. oven for 2 minutes and a 110° C. oven for 2 minutes at a speed of 400 mm/minute in order to dry the slurry composition on the copper foil, and thereby obtain a negative electrode web.

The resultant negative electrode web was pressed using a roll press such as to have a density of from 1.68 g/cm³ to 1.72 g/cm³. The pressed negative electrode web was then left for 4 hours under vacuum conditions at an ambient temperature of 105° C. to obtain a negative electrode. The negative electrode was used in order to evaluate close adherence between the negative electrode mixed material layer and the current collector. The results are shown in Table 7.

[Production of Positive Electrode for Lithium Ion Secondary Battery-Use]

A planetary mixer was charged with 100 parts of $LiCoO_2$ as a positive electrode active material, 2 parts of acetylene black (HS-100 produced by Denki Kagaku Kogyo Kabushiki Kaisha) as a conductive material, and 2 parts of PVDF (polyvinylidene fluoride, KF-1100 produced by Kureha Corporation) as a binding material. 2-Methylpyrrolidone was also added as a dispersion medium such that the total solid content concentration was 67% and mixing was performed to yield a slurry composition for lithium ion secondary battery positive electrode-use.

A comma coater was used to apply the resultant slurry composition for lithium ion secondary battery positive electrode-use onto aluminum foil of 20 μm in thickness, used as a current collector, such that the application amount of the slurry composition was from 26.0 mg/cm² to 27.0 mg/cm². Thereafter, the aluminum foil onto which the slurry composition for lithium ion secondary battery positive electrode-use had been applied was conveyed inside a 60° C. oven for 2 minutes at a speed of 0.5 m/minute in order to dry the slurry composition. Thereafter, heat treatment was performed for 2 minutes at a temperature of 120° C. to obtain a positive electrode web.

The resultant positive electrode web was pressed using a roll press such as to have a density of from 3.40 g/cm³ to 3.50 g/cm³. The pressed positive electrode web was then left for 3 hours under vacuum conditions at an ambient temperature of 120° C. in order to remove the dispersion medium, and a positive electrode was obtained as a result.

[Production of Lithium Ion Secondary Battery]

A wound cell (discharge capacity equivalent to 520 mAh) was prepared using a single-layer separator made from polypropylene and the above-described negative and positive electrodes, and was placed inside an aluminum packing material. Thereafter, the aluminum packing material was filled with an $LiPF_6$ solution having a concentration of 1.0 M as an electrolysis solution (mixed solvent of 3/7 (volume ratio) ethylene carbonate (EC)/ethyl methyl carbonate (EMC) used as solvent; 2 volume % (solvent ratio) of vinylene carbonate contained as additive). The aluminum packing material was then closed with heat sealing at a temperature of 150° C. to tightly seal up the opening of the aluminum packing material, and a lithium ion secondary battery was accordingly produced. The lithium ion secondary battery was used in order to evaluate rate characteristics, cycle characteristics, and preservation stability. The results are shown in Table 7.

Examples 3-2 to 3-5 and 3-25

In each example, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-1 with the exception that the amount of the particulate polymer Z1 was changed as shown in Tables 7 and 9.

Electrode producibility, close adherence between a negative electrode mixed material layer and a current collector, and lithium ion secondary battery rate characteristics, cycle characteristics, and preservation stability were evaluated in the same way as in Example 3-1. The results are shown in Tables 7 and 9.

Examples 3-6, 3-7, 3-14, 3-19, 3-20, and 3-22 to 3-24

In each example, a copolymer X (water-soluble in each example) was produced in the same way as the copolymer X3 with the exception that the monomers shown in Tables 7-9 were used in the proportions shown in these tables. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that a binder composition containing the aforementioned copolymer X and the particulate polymer Z1 was used.

The degree of swelling in electrolysis solution of the copolymer X was measured in the same way as in Example 3-1. Moreover, electrode producibility, close adherence between a negative electrode mixed material layer and a current collector, and lithium ion secondary battery rate characteristics, cycle characteristics, and preservation stability were evaluated in the same way as in Example 3-1. The results are shown in Tables 7-9.

Note that in production of the copolymer X in some of these examples, in addition to the materials used in Example 3-1, 2-hydroxyethyl acrylate and acrylonitrile were used as the compound (B) and ethoxylated pentaerythritol tetraacrylate (ATM-35E produced by Shin-Nakamura Chemical Co., Ltd.; equivalent to compound (V) for which n1+n2+n3+n4=35; functionality=4) was used as the multifunctional compound (C) as shown in Tables 7-9.

Examples 3-8 to 3-10 and 3-21

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that the particulate polymer Z1 was replaced with the particulate polymers Z3, Z4, Z2, and Z5 in Examples 3-8, 3-9, 3-10, and 3-21, respectively.

Electrode producibility, close adherence between a negative electrode mixed material layer and a current collector, and lithium ion secondary battery rate characteristics, cycle characteristics, and preservation stability were evaluated in the same way as in Example 3-1. The results are shown in Tables 7 and 8.

Examples 3-11 to 3-13

In each example, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that the amount of the copolymer X3 was changed as shown in Table 8.

Electrode producibility, close adherence between a negative electrode mixed material layer and a current collector, and lithium ion secondary battery rate characteristics, cycle characteristics, and preservation stability were evaluated in the same way as in Example 3-1. The results are shown in Table 8.

Examples 3-15 to 3-18

In each example, a copolymer X (water-soluble in each example) was produced in the same way as the copolymer X3 with the exception that the monomers shown in Table 8 were used in the proportions shown in the same table. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-12 with the exception that a binder composition containing the aforementioned copolymer X and the particulate polymer Z1 was used.

The degree of swelling in electrolysis solution of the copolymer X was measured in the same way as in Example 3-1. Moreover, electrode producibility, close adherence between a negative electrode mixed material layer and a current collector, and lithium ion secondary battery rate characteristics, cycle characteristics, and preservation stability were evaluated in the same way as in Example 3-1. The results are shown in Table 8.

Example 3-26

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that, in production of the aqueous solution containing the copolymer X, the 10% lithium hydroxide aqueous solution was replaced with a 10% sodium hydroxide aqueous solution.

Electrode producibility, close adherence between a negative electrode mixed material layer and a current collector, and lithium ion secondary battery rate characteristics, cycle characteristics, and preservation stability were evaluated in the same way as in Example 3-1. The results are shown in Table 9.

Comparative Examples 3-1 to 3-3

In each comparative example, a copolymer X (water-soluble in each comparative example) was produced in the same way as the copolymer X3 with the exception that the monomers shown in Table 9 were used in the proportions shown in the same table. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that the aforementioned copolymer X and the particulate polymer Z shown in Table 9 were used.

The degree of swelling in electrolysis solution of the copolymer X was measured in the same way as in Example 3-1. Moreover, electrode producibility, close adherence between a negative electrode mixed material layer and a current collector, and lithium ion secondary battery rate characteristics, cycle characteristics, and preservation stability were evaluated in the same way as in Example 3-1. The results are shown in Table 9.

Comparative Example 3-4

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 3-3 with the exception that the copolymer X3 was replaced with a copolymer X produced by the following method.

The degree of swelling in electrolysis solution of the copolymer X was measured in the same way as in Example 3-1. Moreover, electrode producibility, close adherence between a negative electrode mixed material layer and a current collector, and lithium ion secondary battery rate characteristics, cycle characteristics, and preservation stability were evaluated in the same way as in Example 3-1. The results are shown in Table 9.

<Production of Aqueous Solution Containing Copolymer X>

A 5 MPa pressure vessel equipped with a stirrer was charged with 24.0 parts (24.4%) of acrylic acid as the ethylenically unsaturated carboxylic acid compound (A), 72.4 parts (73.6%) of ethyl acrylate (water-solubility at 20° C.: 2 g/100 g), 2.0 parts (2.0%) of ethylene glycol dimethacrylate as the compound (B), 1.0 parts of polyoxyalkylene alkenyl ether ammonium sulfate (LATEMUL PD-104 produced by Kao Corporation) as a reactive surfactant, 0.6 parts of t-dodecyl mercaptan, 150 parts of deionized water, and 1.0 parts of potassium persulfate (polymerization initiator). The contents of the pressure vessel were sufficiently stirred and were then heated to 60° C. to initiate polymerization. Cooling was performed in order to terminate the reaction once the polymerization conversion rate had reached 96%. Thereafter, a 10% sodium hydroxide aqueous solution was added in order to adjust the pH to 8 and yield an aqueous solution containing a copolymer X (water-soluble).

In Tables 7-9 shown below:
"AA" represents acrylic acid;
"AAm" represents acrylamide;
"2-HEA" represents 2-hydroxyethyl acrylate;
"AN" represents acrylonitrile;
"EDMA" represents ethylene glycol dimethacrylate;
"EPETA" represents ethoxylated pentaerythritol tetraacrylate;
"MA" represents methyl acrylate; and
"EA" represents ethyl acrylate.

TABLE 7

| | | | | Example 3-1 | Example 3-2 | Example 3-3 | Example 3-4 | Example 3-5 | Example 3-6 | Example 3-7 | Example 3-8 | Example 3-9 | Example 3-10 |
|---|---|---|---|---|---|---|---|---|---|---|---|---|---|
| Copolymer X | Monomer composition | Ethylenically unsaturated carboxylic acid compound (A) [mass %] | AA | 25.0 | 25.0 | 25.0 | 25.0 | 25.0 | 50.0 | 75.0 | 25.0 | 25.0 | 25.0 |
| | | Compound (B) [mass %] | AAm | 75.0 | 75.0 | 75.0 | 75.0 | 75.0 | 50.0 | 25.0 | 75.0 | 75.0 | 75.0 |
| | | | 2-HEA | — | — | — | — | — | — | — | — | — | — |
| | | | AN | — | — | — | — | — | — | — | — | — | — |
| | | | EDMA | — | — | — | — | — | — | — | — | — | — |
| | | Multifunctional compound (C) [mass %] | EPETA | — | — | — | — | — | — | — | — | — | — |
| | | Other compounds [mass %] | MA | — | — | — | — | — | — | — | — | — | — |
| | | | EA | — | — | — | — | — | — | — | — | — | — |
| | | A/B [—] | | 0.33 | 0.33 | 0.33 | 0.33 | 0.33 | 1.00 | 3.00 | 0.33 | 0.33 | 0.33 |
| | | Compound used in neutralization | | LiOH | LiOH | LiOH | LiOH | LiOH | LiOH | LiOH | LiOH | LiOH | LiOH |
| | | Degree of swelling in electrolysis solution [mass %] | | 105 | 105 | 105 | 105 | 105 | 110 | 110 | 105 | 105 | 105 |
| | | Blending amount [parts by mass] | | 1 | 1 | 1 | 1 | 1 | 1 | 1 | 1 | 1 | 1 |
| Particulate polymer Z | | Type | | Z1 | Z1 | Z1 | Z1 | Z1 | Z1 | Z1 | Z3 | Z4 | Z2 |
| | | Gel content [mass %] | | 91 | 91 | 91 | 91 | 91 | 91 | 91 | 85 | 95 | 90 |
| | | Degree of swelling in electrolysis solution [mass %] | | 150 | 150 | 150 | 150 | 150 | 150 | 150 | 150 | 150 | 450 |
| | | Blending amount [parts by mass] | | 0.2 | 0.5 | 1 | 1.5 | 2 | 1 | 1 | 1 | 1 | 1 |
| | | Z/X [—] | | 0.20 | 0.50 | 1.00 | 1.50 | 2.00 | 1.00 | 1.00 | 1.00 | 1.00 | 1.00 |
| Electrode producibility | | | | A | A | A | A | A | A | A | A | A | A |
| Close adherence between negative electrode mixed material layer and current collector | | | | C | B | A | A | A | A | A | C | C | B |
| Rate characteristics | | | | A | A | A | A | A | B | B | B | B | A |
| Cycle characteristics | | | | B | A | A | A | B | B | C | B | B | A |
| Preservation stability | | | | B | A | A | A | B | B | C | B | B | A |

TABLE 8

|  |  |  |  | Example 3-11 | Example 3-12 | Example 3-13 | Example 3-14 | Example 3-15 | Example 3-16 |
|---|---|---|---|---|---|---|---|---|---|
| Co-polymer X | Monomer composition | Ethylenically unsaturated carboxylic acid compound (A) [mass %] | AA | 25.0 | 25.0 | 25.0 | 24.0 | 25.0 | 25.0 |
|  |  | Compound (B) [mass %] | AAm | 75.0 | 75.0 | 75.0 | 75.0 | 70.0 | 65.0 |
|  |  |  | 2-HEA | — | — | — | — | — | — |
|  |  |  | AN | — | — | — | — | — | — |
|  |  |  | EDMA | — | — | — | — | — | — |
|  |  | Multi-functional compound (C) [mass %] | EPETA | — | — | — | 1.0 | 5.0 | 10.0 |
|  |  | Other compounds [mass %] | MA | — | — | — | — | — | — |
|  |  |  | EA | — | — | — | — | — | — |
|  |  | A/B [—] |  | 0.33 | 0.33 | 0.33 | 0.32 | 0.36 | 0.38 |
|  |  | Compound used in neutralization |  | LiOH | LiOH | LiOH | LiOH | LiOH | LiOH |
|  |  | Degree of swelling in electrolysis solution [mass %] |  | 105 | 105 | 105 | 105 | 105 | 110 |
|  |  | Blending amount [parts by mass] |  | 0.6 | 1.5 | 2 | 1 | 1.5 | 1.5 |
| Particulate polymer Z |  | Type |  | Z1 | Z1 | Z1 | Z1 | Z1 | Z1 |
|  |  | Gel content [mass %] |  | 91 | 91 | 91 | 91 | 91 | 91 |
|  |  | Degree of swelling in electrolysis solution [mass %] |  | 150 | 150 | 150 | 150 | 150 | 150 |
|  |  | Blending amount [parts by mass] |  | 1 | 1 | 1 | 1 | 1 | 1 |
|  |  | Z/X [—] |  | 1.67 | 0.67 | 0.50 | 1.00 | 0.67 | 0.67 |
|  |  | Electrode producibility |  | A | B | C | A | A | A |
|  |  | Close adherence between negative electrode mixed material layer and current collector |  | C | B | B | A | A | A |
|  |  | Rate characteristics |  | C | A | B | A | A | A |
|  |  | Cycle characteristics |  | B | A | A | A | A | A |
|  |  | Preservation stability |  | B | A | A | A | A | A |

|  |  |  |  | Example 3-17 | Example 3-18 | Example 3-19 | Example 3-20 | Example 3-21 |
|---|---|---|---|---|---|---|---|---|
| Co-polymer X | Monomer composition | Ethylenically unsaturated carboxylic acid compound (A) [mass %] | AA | 25.0 | 20.0 | 25.0 | 25.0 | 25.0 |
|  |  | Compound (B) [mass %] | AAm | 60.0 | 50.0 | 70.0 | 60.0 | 75.0 |
|  |  |  | 2-HEA | — | — | — | — | — |
|  |  |  | AN | — | — | — | — | — |
|  |  |  | EDMA | — | — | — | — | — |
|  |  | Multi-functional compound (C) [mass %] | EPETA | 15.0 | 30.0 | — | — | — |
|  |  | Other compounds [mass %] | MA | — | — | 5.0 | 15.0 | — |
|  |  |  | EA | — | — | — | — | — |
|  |  | A/B [—] |  | 0.42 | 0.40 | 0.36 | 0.42 | 0.33 |
|  |  | Compound used in neutralization |  | LiOH | LiOH | LiOH | LiOH | LiOH |
|  |  | Degree of swelling in electrolysis solution [mass %] |  | 115 | 118 | 110 | 118 | 105 |
|  |  | Blending amount [parts by mass] |  | 1.5 | 1.5 | 1 | 1 | 1 |
| Particulate polymer Z |  | Type |  | Z1 | Z1 | Z1 | Z1 | Z5 |
|  |  | Gel content [mass %] |  | 91 | 91 | 91 | 91 | 91 |
|  |  | Degree of swelling in electrolysis solution [mass %] |  | 150 | 150 | 150 | 150 | 150 |
|  |  | Blending amount [parts by mass] |  | 1 | 1 | 1 | 1 | 1 |
|  |  | Z/X [—] |  | 0.67 | 0.67 | 1.00 | 1.00 | 1.00 |
|  |  | Electrode producibility |  | A | A | A | A | A |
|  |  | Close adherence between negative electrode mixed material layer and current collector |  | A | B | A | A | A |
|  |  | Rate characteristics |  | A | B | A | A | A |
|  |  | Cycle characteristics |  | B | B | A | A | A |
|  |  | Preservation stability |  | B | B | B | B | A |

TABLE 9

| | | | | Example 3-22 | Example 3-23 | Example 3-24 | Example 3-25 | Example 3-26 |
|---|---|---|---|---|---|---|---|---|
| Co-polymer X | Monomer composition | Ethylenically unsaturated carboxylic acid compound (A) [mass %] | AA | 25.0 | 50.0 | 25.0 | 25.0 | 25.0 |
| | | Compound (B) [mass %] | AAm | — | — | — | 75.0 | 75.0 |
| | | | 2-HEA | 75.0 | 50.0 | — | — | — |
| | | | AN | — | — | 75.0 | — | — |
| | | | EDMA | — | — | — | — | — |
| | | Multifunctional compound (C) [mass %] | EPETA | — | — | — | — | — |
| | | Other compounds [mass %] | MA | — | — | — | — | — |
| | | | EA | — | — | — | — | — |
| | A/B [—] | | | 0.33 | 1.00 | 0.33 | 0.33 | 0.33 |
| | Compound used in neutralization | | | LiOH | LiOH | LOH | LOH | NaOH |
| | Degree of swelling in electrolysis solution [mass %] | | | 107 | 113 | 115 | 105 | 105 |
| | Blending amount [parts by mass] | | | 1 | 1 | 1 | 1 | 1 |
| Particulate polymer Z | Type | | | Z1 | Z1 | Z1 | Z1 | Z1 |
| | Gel content [mass %] | | | 91 | 91 | 91 | 91 | 91 |
| | Degree of swelling in electrolysis solution [mass %] | | | 150 | 150 | 150 | 150 | 150 |
| | Blending amount [parts by mass] | | | 1 | 1 | 1 | 3 | 1 |
| | Z/X [—] | | | 1.00 | 1.00 | 1.00 | 3.00 | 1.00 |
| Electrode produciblity | | | | A | A | A | B | A |
| Close adherence between negative electrode mixed material layer and current collector | | | | A | B | B | A | A |
| Rate characteristics | | | | A | B | C | B | B |
| Cycle characteristics | | | | A | B | C | C | A |
| Preservation stability | | | | A | B | C | C | A |

| | | | | Comparative Example 3-1 | Comparative Example 3-2 | Comparative Example 3-3 | Comparative Example 3-4 |
|---|---|---|---|---|---|---|---|
| Co-polymer X | Monomer composition | Ethylenically unsaturated carboxylic acid compound (A) [mass %] | AA | 25.0 | 10.0 | 80.0 | 24.4 |
| | | Compound (B) [mass %] | AAm | 40.0 | 80.0 | 10.0 | — |
| | | | 2-HEA | — | — | — | — |
| | | | AN | — | — | — | — |
| | | | EDMA | — | — | — | 2.0 |
| | | Multifunctional compound (C) [mass %] | EPETA | — | — | — | — |
| | | Other compounds [mass %] | MA | 35.0 | 10.0 | 10.0 | — |
| | | | EA | — | — | — | 73.6 |
| | A/B [—] | | | 0.63 | 0.13 | 8.00 | 12.20 |
| | Compound used in neutralization | | | LOH | LiOH | LOH | NaOH |
| | Degree of swelling in electrolysis solution [mass %] | | | 140 | 125 | 125 | 118 |
| | Blending amount [parts by mass] | | | 1 | 1 | 1 | 1 |
| Particulate polymer Z | Type | | | Z1 | Z2 | Z1 | Z1 |
| | Gel content [mass %] | | | 91 | 90 | 91 | 91 |
| | Degree of swelling in electrolysis solution [mass %] | | | 150 | 450 | 150 | 150 |
| | Blending amount [parts by mass] | | | 1 | 1 | 1 | 1 |
| | Z/X [—] | | | 1.00 | 1.00 | 1.00 | 1.00 |
| Electrode produciblity | | | | A | B | C | C |
| Close adherence between negative electrode mixed material layer and current collector | | | | C | C | C | C |
| Rate characteristics | | | | D | D | D | D |
| Cycle characteristics | | | | D | D | D | D |
| Preservation stability | | | | D | D | D | D |

From Examples 3-1 to 3-26 and Comparative Examples 3-1 to 3-4 in Tables 7-9, it can be seen that, in Examples 3-1 to 3-26, lithium ion secondary battery internal resistance could be sufficiently reduced while also obtaining excellent lithium ion secondary battery life characteristics, such as cycle characteristics and preservation stability.

Moreover, Examples 3-1 to 3-5, 3-11 to 3-13, and 3-25 in the aforementioned tables demonstrate that lithium ion secondary battery internal resistance can be further reduced, and electrode producibility, close adherence between a negative electrode mixed material layer and a current collector, and life characteristics can be further improved by changing the blending amount of the copolymer X, the blending amount of the particulate polymer Z, and the ratio (Z/X) of these blending amounts.

Furthermore, Examples 3-3, 3-6, 3-7, 3-14, and 3-22 to 3-24 and Examples 3-12 and 3-15 to 3-20 in the aforementioned tables demonstrate that lithium ion secondary battery internal resistance can be further reduced, and electrode producibility, close adherence between a negative electrode mixed material layer and a current collector, and life characteristics can be further improved by changing the types and blending proportions of monomers in production of the copolymer X.

Also, Examples 3-3, 3-8 to 3-10, and 3-21 in the aforementioned tables demonstrate that lithium ion secondary battery internal resistance can be further reduced, and close adherence between a negative electrode mixed material layer and a current collector and life characteristics can be further improved by changing the type of the particulate polymer Z. In particular, it can be seen from comparison of Examples 3-3 and 3-21 and Examples 3-8 and 3-9 that lithium ion secondary battery internal resistance can be further reduced, and close adherence between a negative electrode mixed material layer and a current collector and life characteristics can be further improved by changing the gel content of the particulate polymer Z when the particulate polymer Z is a styrene-butadiene-based polymer.

Furthermore, Examples 3-3 and 3-26 in the aforementioned tables demonstrate that lithium ion secondary battery internal resistance can be further reduced by using a lithium hydroxide aqueous solution in neutralization of the aqueous solution containing the copolymer X such that the resultant copolymer X has a lithium carboxylate group.

Note that in Comparative Example 3-4 in the aforementioned tables, the copolymer X was produced using a small amount of ethylene glycol dimethacrylate as the compound (B) instead of acrylamide, which was not used, and using ethyl acrylate having low water-solubility. It can be seen that although it is possible to restrict the degree of swelling in electrolysis solution to less than 120 mass % through use of ethylene glycol dimethacrylate, which is crosslinkable, poor results were obtained in Comparative Example 3-4 for all of the evaluation categories, including life characteristics.

(Experiment 4)

Example 4-1

[Production of Aqueous Solution Containing Copolymer X4]

A 3 L flask equipped with a septum was charged with 1510.5 g of deionized water, 50 g (25.0%) of acrylic acid as the ethylenically unsaturated carboxylic acid compound (A), and 150 g (75.0%) of acrylamide as the compound (B). Note that the acrylic acid was added as an 80% acrylic acid aqueous solution and the acrylamide was added as a 40% acrylamide aqueous solution. Next, bubbling with nitrogen gas was performed for 60 minutes at a flow rate of 100 mL/minute in order to remove dissolved oxygen and the inside of the flask was then maintained at a positive pressure through a flow rate of 50 mL/minute.

The flask was heated to 40° C. under stirring and 2.0 g of tetramethylenediamine was mixed in as a catalyst aid. Thereafter, a polymerization catalyst aqueous solution that had been prepared in advance by mixing 1.0 g of a 2.0% potassium persulfate aqueous solution and 49 g of deionized water was dripped into the flask using a syringe in order to initiate a polymerization reaction. After 3 hours had passed, 0.6 g of tetramethylenediamine and 30.0 g of a 0.2% potassium persulfate aqueous solution were added using a syringe and the flask was heated to a temperature of 80° C. in order to further increase the reaction conversion rate while promoting polymerization of residual monomers. Once 1 hour had passed after reaching 80° C., a further 0.6 g of tetramethylenediamine and 30.0 g of the 0.2% potassium persulfate aqueous solution were added using a syringe and mixing was performed for a further 2 hours.

Thereafter, the flask was cooled to 40° C. and was converted to an air atmosphere. The system was then adjusted to a pH of 8 using a 5% lithium hydroxide aqueous solution to yield an aqueous solution containing a copolymer X4 (water-soluble) having a lithium carboxylate group. The degree of swelling in electrolysis solution of the copolymer X4 was measured. The results are shown in Table 10.

The resultant aqueous solution of the copolymer X4 had a polymer solid content concentration of 9.7%. Moreover, upon analysis by high performance liquid chromatography, the amount of residual acrylic acid was below the detection limit (less than 1 ppm) and the amount of residual acrylamide was 50 ppm. The viscosity of a 1% solid content diluted solution of the copolymer X4 measured by a B-type viscometer at 60 rpm was 780 mPa·s. The molecular weight and molecular weight distribution of the copolymer X4 were measured by GPC (HLC-8220 produced by Tosoh Corporation) using a standard polyethylene oxide reference and a separation column (Shodex OHpak SB-807 HQ, SB-806M HQ produced by Showa Denko K.K.) with an eluent of 0.1 M $NaNO_3$, a flow rate of 0.5 mL/minute, and a column temperature of 40° C. The aqueous solution of the copolymer X4 was used as a sample and was diluted to 0.05 weight % for measurement. The results of the aforementioned measurement were a weight-average molecular weight (Mw) of 10,200,00 and a molecular weight distribution (Mw/Mn) of 25.

[Production of Slurry Composition for Lithium Ion Secondary Battery Negative Electrode-Use]

A planetary mixer was charged with 100 parts of artificial graphite (theoretical capacity: 360 mAh/g, BET specific surface area: 3.50 $m^2/g$) as a negative electrode active material and 1.0 parts by solid content equivalents of the aqueous solution containing the copolymer X4 (solid content concentration: 4.5%). The contents of the planetary mixer were diluted to a solid content concentration of 60% using deionized water. Thereafter, kneading was performed for 60 minutes at a rotational speed of 40 rpm to yield a slurry in the form of a paste. A further 80 parts of deionized water was added in order to adjust the viscosity to 1100±100 mPa·s (measured by a B-type viscometer at 12 rpm) and the particulate polymer Z1 (styrene-butadiene copolymer) was added such as to be contained in an amount of 1.0 parts by solid content equivalents. Kneading was then performed for 30 minutes at a rotational speed of 40 rpm to yield a slurry composition for lithium ion secondary battery negative electrode-use. At this point, the slurry composition had a solid content concentration of 45 mass %.

[Production of Negative Electrode for Lithium Ion Secondary Battery-Use]

A comma coater was used to apply the slurry composition for lithium ion secondary battery negative electrode-use onto the surface of copper foil of 15 μm in thickness, used as a current collector, such that the application amount of the slurry composition was from 12.8 $mg/cm^2$ to 13.2 $mg/cm^2$. The copper foil onto which the slurry composition for lithium ion secondary battery negative electrode-use had been applied was conveyed inside an 80° C. oven for 2 minutes and a 110° C. oven for 2 minutes at a speed of 300 mm/minute in order to dry the slurry composition on the copper foil, and thereby obtain a negative electrode web.

The resultant negative electrode web was pressed using a roll press such as to have a density of from 1.68 g/cm$^3$ to 1.72 g/cm$^3$. The pressed negative electrode web was then left for 4 hours under vacuum conditions at an ambient temperature of 105° C. in order to remove moisture and further promote crosslinking, and a negative electrode was obtained as a result. The negative electrode was used in order to measure and calculate the BET specific surface area of the electrode and the degree of coating of the electrode active material. The results are shown in Table 10.

[Production of Positive Electrode for Lithium Ion Secondary Battery-Use]

A planetary mixer was charged with 100 parts of LiCoO$_2$ as a positive electrode active material, 2 parts of acetylene black (HS-100 produced by Denki Kagaku Kogyo Kabushiki Kaisha) as a conductive material, and 2 parts of PVDF (polyvinylidene fluoride, KF-1100 produced by Kureha Corporation) as a binding material. 2-Methylpyrrolidone was also added as a dispersion medium such that the total solid content concentration was 67% and mixing was performed to yield a slurry composition for lithium ion secondary battery positive electrode-use.

A comma coater was used to apply the resultant slurry composition for lithium ion secondary battery positive electrode-use onto aluminum foil of 20 μm in thickness, used as a current collector, such that the application amount of the slurry composition was from 26.5 mg/cm$^2$ to 27.5 mg/cm$^2$. Thereafter, the aluminum foil onto which the slurry composition for lithium ion secondary battery positive electrode-use had been applied was conveyed inside a 60° C. oven for 2 minutes at a speed of 0.5 m/minute in order to dry the slurry composition. Thereafter, heat treatment was performed for 2 minutes at a temperature of 120° C. to obtain a positive electrode web.

The resultant positive electrode web was pressed using a roll press such as to have a density of from 3.40 g/cm$^3$ to 3.50 g/cm$^3$. The pressed positive electrode web was then left for 3 hours under vacuum conditions at an ambient temperature of 120° C. in order to remove the dispersion medium, and a positive electrode was obtained as a result

[Production of Lithium Ion Secondary Battery]

A wound cell (discharge capacity equivalent to 480 mAh) was prepared using a single-layer separator made from polypropylene and the above-described negative and positive electrodes, and was placed inside an aluminum packing material. Thereafter, the aluminum packing material was filled with an LiPF$_6$ solution having a concentration of 1.0 M as an electrolysis solution (mixed solvent of 3/7 (volume ratio) ethylene carbonate (EC)/ethyl methyl carbonate (EMC) used as solvent; 2 volume % (solvent ratio) of vinylene carbonate contained as additive). The aluminum packing material was then closed with heat sealing at a temperature of 150° C. to tightly seal up the opening of the aluminum packing material, and a lithium ion secondary battery was accordingly produced. The resultant lithium ion secondary battery was used in order to evaluate rate characteristics, cycle characteristics, and presence of lithium deposition. The results are shown in Table 10.

Examples 4-2 and 4-3

In each example, a copolymer X (water-soluble in each example) was produced in the same way as the copolymer X4 with the exception that the monomers shown in Table 10 were used in the proportions shown in the same table. Moreover, a slurry composition for lithium ion secondary battery negative electrode-use, a negative electrode for lithium ion secondary battery-use, a positive electrode for lithium ion secondary battery-use, and a lithium ion secondary battery were produced in the same way as in Example 4-1 with the exception that an aqueous solution containing the aforementioned copolymer X was used as the binder composition.

The degree of swelling in electrolysis solution of the copolymer X, BET specific surface area of an electrode, and degree of coating of an electrode active material were measured in the same way as in Example 4-1. Moreover, lithium ion secondary battery rate characteristics and cycle characteristics, and presence of lithium deposition were evaluated in the same way as in Example 4-1. The results are shown in Table 10.

Example 4-4

A slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 4-1 with the exception that the amounts of the copolymer X4 and the particulate polymer Z1 were changed as shown in Table 10.

The degree of swelling in electrolysis solution of the copolymer X, BET specific surface area of an electrode, and degree of coating of an electrode active material were measured in the same way as in Example 4-1. Moreover, lithium ion secondary battery rate characteristics and cycle characteristics, and presence of lithium deposition were evaluated in the same way as in Example 4-1. The results are shown in Table 10.

Example 4-5

A planetary mixer was charged with 100 parts of artificial graphite (theoretical capacity: 360 mAh/g, BET specific surface area: 3.50 m$^2$/g) as a negative electrode active material, 0.5 parts by solid content equivalents of an aqueous solution containing the copolymer X4 (solid content concentration: 4.5%) produced in the same way as in Example 4-1, and 0.5 parts by solid content equivalents of carboxymethyl cellulose (MAC800LC produced by Nippon Paper Industries Co., Ltd.). Next, 1.0 parts by solid content equivalents of the aqueous dispersion of the particulate polymer Z1 was added and kneading was performed for 45 minutes at a rotational speed of 40 rpm. Thereafter, the viscosity was adjusted to 1100±100 mPa·s (measured by a B-type viscometer at 12 rpm) using deionized water to yield a slurry composition for lithium ion secondary battery negative electrode-use. A slurry composition for lithium ion secondary battery positive electrode-use, a negative electrode for lithium ion secondary battery-use, a positive electrode for lithium ion secondary battery-use, and a lithium ion secondary battery were produced in the same way as in Example 4-1 with the exception that the above-described slurry composition for negative electrode-use was used.

The degree of swelling in electrolysis solution of the copolymer X, BET specific surface area of an electrode, and degree of coating of an electrode active material were measured in the same way as in Example 4-1. Moreover, lithium ion secondary battery rate characteristics and cycle characteristics, and presence of lithium deposition were evaluated in the same way as in Example 4-1. The results are shown in Table 10.

Example 4-6

A planetary mixer was charged with 100 parts of artificial graphite (theoretical capacity: 360 mAh/g, BET specific surface area: 3.50 m$^2$/g) as a negative electrode active material and 1.0 parts by solid content equivalents of an aqueous solution containing the copolymer X4 (solid content concentration: 4.5%) that was produced in the same way as in Example 4-1. Next, 0.15 parts by solid content equivalents of an aqueous solution containing the water-soluble polymer Y1 that was produced in the same way as in Experiment 2 was added into the planetary mixer and kneading was subsequently performed for 45 minutes at a rotational speed of 40 rpm. Next, 1.0 parts by solid content equivalents of the aqueous dispersion of the particulate polymer Z1 was added and kneading was performed for 45 minutes at a rotational speed of 40 rpm. Thereafter, the viscosity was adjusted to 1100±100 mPa·s (measured by a B-type viscometer at 12 rpm) using deionized water to yield a slurry composition for lithium ion secondary battery negative electrode-use. A slurry composition for lithium ion secondary battery positive electrode-use, a negative electrode for lithium ion secondary battery-use, a positive electrode for lithium ion secondary battery-use, and a lithium ion secondary battery were produced in the same way as in Example 4-1 with the exception that the above-described slurry composition for negative electrode-use was used.

The degree of swelling in electrolysis solution of the copolymer X, BET specific surface area of an electrode, and degree of coating of an electrode active material were measured in the same way as in Example 4-1. Moreover, lithium ion secondary battery rate characteristics and cycle characteristics, and presence of lithium deposition were evaluated in the same way as in Example 4-1. The results are shown in Table 10.

Comparative Example 4-1

A copolymer X (water-soluble) was produced in the same way as the copolymer X4 with the exception that the monomers shown in Table 10 were used in the proportions shown in the same table. Moreover, a slurry composition for lithium ion secondary battery negative electrode-use, a slurry composition for lithium ion secondary battery positive electrode-use, a negative electrode for lithium ion secondary battery-use, a positive electrode for lithium ion secondary battery-use, and a lithium ion secondary battery were produced in the same way as in Example 4-1 with the exception that the aforementioned copolymer X was used.

Also note that as shown in Table 10, methyl acrylate was used as another compound (monomer) in production of the copolymer X in addition to the materials used in Example 4-1.

The degree of swelling in electrolysis solution of the copolymer X, BET specific surface area of an electrode, and degree of coating of an electrode active material were measured in the same way as in Example 4-1. Moreover, lithium ion secondary battery rate characteristics and cycle characteristics, and presence of lithium deposition were evaluated in the same way as in Example 4-1. The results are shown in Table 10.

In Table 10 shown below:
"AA" represents acrylic acid;
"AAm" represents acrylamide; and
"MA" represents methyl acrylate.

TABLE 10

| | | | | Example 4-1 | Example 4-2 | Example 4-3 | Example 4-4 | Example 4-5 | Example 4-6 | Comparative Example 4-1 |
|---|---|---|---|---|---|---|---|---|---|---|
| Copolymer X | Monomer composition | Ethylenically unsaturated carboxylic acid compound (A) [mass %] | AA | 25.0 | 50.0 | 75.0 | 25.0 | 25.0 | 25.0 | 10.0 |
| | | Compound (B) [mass %] | AAm | 75.0 | 50.0 | 25.0 | 75.0 | 75.0 | 75.0 | 80.0 |
| | | Other compounds [mass %] | MA | — | — | — | — | — | — | 10.0 |
| | | A/B [—] | | 0.33 | 1.00 | 3.00 | 0.33 | 0.33 | 0.33 | 0.13 |
| | Compound used in neutralization | | | LiOH | LiOH | LiOH | LiOH | LiOH | LiOH | LiOH |
| | Degree of swelling in electrolysis solution [mass %] | | | 105 | 110 | 110 | 105 | 105 | 105 | 125 |
| | Blending amount [parts by mass] | | | 1 | 1 | 1 | 1.5 | 0.5 | 1 | 1 |
| Water-soluble polymer Y | Type | | | — | — | — | — | — | Y1 | — |
| | Degree of swelling in electrolysis solution [mass %] | | | — | — | — | — | — | 350 | — |
| | Blending amount [parts by mass] | | | — | — | — | — | — | 0.15 | — |
| | Y/X [—] | | | — | — | — | — | — | 0.150 | — |
| Particulate polymer Z | Type | | | Z1 | Z1 | Z1 | Z1 | Z1 | Z1 | Z1 |
| | Gel content [mass %] | | | 91 | 91 | 91 | 91 | 91 | 91 | 91 |
| | Degree of swelling in electrolysis solution [mass %] | | | 150 | 150 | 150 | 150 | 150 | 150 | 150 |
| | Blending amount [parts by mass] | | | 1.0 | 1.0 | 1.0 | 0.5 | 1.0 | 1.0 | 1.0 |
| | Z/X [—] | | | 1.00 | 1.00 | 1.00 | 0.33 | 2.00 | 1.00 | 1.00 |
| | Z/(X + Y) [—] | | | — | — | — | — | — | 0.87 | — |
| Thickener | Type | | | — | — | — | — | CMC | — | — |
| | Blending amount [parts by mass] | | | — | — | — | — | 0.5 | — | — |
| Electrode BET specific surface area [m$^2$/g] | | | | 1.87 | 1.80 | 1.75 | 1.50 | 1.95 | 1.70 | 2.53 |
| Degree of coating of electrode active material [—] | | | | 0.47 | 0.49 | 0.50 | 0.57 | 0.44 | 0.51 | 0.28 |
| Rate characteristics | | | | A | B | B | A | B | A | D |

TABLE 10-continued

|  | Example 4-1 | Example 4-2 | Example 4-3 | Example 4-4 | Example 4-5 | Example 4-6 | Comparative Example 4-1 |
|---|---|---|---|---|---|---|---|
| Cycle characteristics | A | A | B | C | C | A | D |
| Lithium deposition | No | No | No | No | No | No | Yes |

From Examples 4-1 to 4-6 and Comparative Example 4-1 in Table 10, it can be seen that, in Examples 4-1 to 4-6, excellent lithium ion secondary battery cycle characteristics could be obtained while also sufficiently reducing lithium ion secondary battery internal resistance, and lithium deposition could be inhibited.

INDUSTRIAL APPLICABILITY

According to the present disclosure, it is possible to provide a binder composition for lithium ion secondary battery electrode-use that reduces internal resistance of a lithium ion secondary battery while also providing the lithium ion secondary battery with excellent life characteristics.

Moreover, according to the present disclosure, it is possible to provide a slurry composition for lithium ion secondary battery electrode-use that reduces internal resistance of a lithium ion secondary battery while also providing the lithium ion secondary battery with excellent life characteristics.

Furthermore, according to the present disclosure, it is possible to provide an electrode that reduces internal resistance of a lithium ion secondary battery while also providing the lithium ion secondary battery with excellent life characteristics, and to provide a lithium ion secondary battery that has reduced internal resistance and excellent life characteristics.

The invention claimed is:

1. A binder composition for lithium ion secondary battery electrode-use comprising
a copolymer X and a solvent, wherein
the copolymer X is obtained through polymerization of a monomer composition X,
the monomer composition X contains an ethylenically unsaturated carboxylic acid compound (A) a compound (B) that is copolymerizable and has an ethylenically unsaturated bond, and a multifunctional compound (C) having a polyoxyalkylene structure and at least two ethylenically unsaturated bonds,
the ethylenically unsaturated carboxylic acid compound (A) is selected from the group consisting of acrylic acid, methacrylic acid, an acrylic acid salt, and a methacrylic acid salt,
the compound (B) is either or both of acrylamide and methacrylamide,
the multifunctional compound (C) is an ethoxylated pentaerythritol tetraacrylate represented by the following general formula (V):

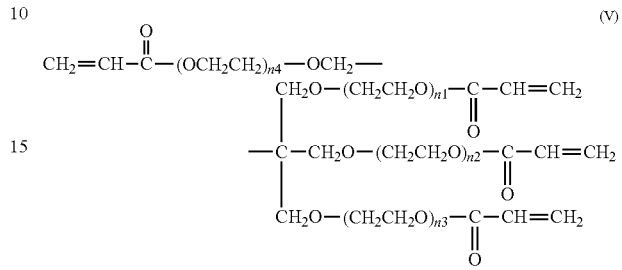

in the formula (V), n1, n2, n3, and n4 are integers of greater than or equal to 2 that may be the same or different,
in the monomer composition X, a percentage content of the ethylenically unsaturated carboxylic acid compound (A) among all monomers is at least 21.0 mass % and no greater than 50.0 mass %, a percentage content of the compound (B) among all monomers is at least 48.0 mass % and no greater than 75.0 mass %, and a percentage content of the multifunctional compound (C) among all monomers is at least 0.1 mass % and no greater than 20.0 mass %, and
the copolymer X has a degree of swelling in electrolysis solution of less than 120 mass %, and wherein
the degree of swelling is measured using an $LiPF_6$ solution having a concentration of 1.0 M as the electrolysis solution in which mixed solvent of 3/7 (volume ratio) ethylene carbonate/ethyl methyl carbonate is used as solvent, and 2 volume % of vinylene carbonate is contained as additive.

2. The binder composition for lithium ion secondary battery electrode-use of claim 1, wherein
a value (A/B) obtained by dividing the percentage content of the ethylenically unsaturated carboxylic acid compound (A) among all monomers in the monomer composition X by the percentage content of the compound (B) among all monomers in the monomer composition X is less than 1.5.

3. The binder composition for lithium ion secondary battery electrode-use of claim 1, wherein
the copolymer X has a lithium carboxylate group.

4. The binder composition for lithium ion secondary battery electrode-use of claim 1, further comprising
a water-soluble polymer Y having a degree of swelling in electrolysis solution of at least 120 mass %, wherein
the degree of swelling is measured using an $LiPF_6$ solution having a concentration of 1.0 M as the electrolysis solution in which mixed solvent of 3/7 (volume ratio) ethylene carbonate/ethyl methyl carbonate is used as solvent, and 2 volume % of vinylene carbonate is contained as additive, and wherein
the copolymer X is water-soluble,
the water-soluble polymer Y is obtained through polymerization of a monomer composition Y,
the monomer composition Y contains methacrylic acid, ethyl acrylate, and ethylene dimethacrylate, and in the monomer composition Y, a percentage content of the methacrylic acid among all monomers is at least 25 mass % and no greater than 40 mass %, a percentage content of the ethyl acrylate among all monomers is at least 45 mass % and no greater than 70 mass %, and a percentage content of the ethylene dimethacrylate among all monomers is at least 0.2 mass % and no greater than 2 mass %.

5. The binder composition for lithium ion secondary battery electrode-use of claim 4, wherein
a value (Y/X) obtained by dividing an amount of mass of the water-soluble polymer Y included in the binder composition by an amount of mass of the copolymer X included in the binder composition is at least 0.01 and no greater than 0.5.

6. The binder composition for lithium ion secondary battery electrode-use of claim 4, wherein
the monomer composition Y further contains a fluorine-containing monomer.

7. The binder composition for lithium ion secondary battery electrode-use of claim 1, further comprising
a particulate polymer Z, wherein
the copolymer X is water-soluble.

8. The binder composition for lithium ion secondary battery electrode-use of claim 7, wherein
a value (Z/X) obtained by dividing an amount of mass of the particulate polymer Z included in the binder composition by an amount of mass of the copolymer X included in the binder composition is at least 0.05 and no greater than 3.

9. The binder composition for lithium ion secondary battery electrode-use of claim 7, wherein
the particulate polymer Z has a gel content of at least 85 mass % and no greater than 98 mass %.

10. The binder composition for lithium ion secondary battery electrode-use of claim 7, wherein
the particulate polymer Z has a degree of swelling in electrolysis solution of at least 140 mass % and less than 800 mass %, and wherein
the degree of swelling is measured using an $LiPF_6$ solution having a concentration of 1.0 M as the electrolysis solution in which mixed solvent of 3/7 (volume ratio) ethylene carbonate/ethyl methyl carbonate is used as solvent, and 2 volume % of vinylene carbonate is contained as additive,
the particulate polymer Z is either or both of a styrene-butadiene-based polymer and an acrylic-based polymer,
the styrene-butadiene-based polymer is obtained through polymerization of a monomer composition Z1,
the monomer composition Z1 contains styrene and 1,3-butadiene,
in the monomer composition Z1, a percentage content of the styrene among all monomers is at least 55 mass % and no greater than 65 mass %, and a percentage content of the 1,3-butadiene among all monomers is at least 30 mass % and no greater than 35 mass %,
the acrylic-based polymer is obtained through polymerization of a monomer composition Z2,
the monomer composition Z2 contains n-butyl acrylate, and
in the monomer composition Z2, a percentage content of the n-butyl acrylate among all monomers is at least 58 mass % and no greater than 94 mass %.

11. The binder composition for lithium ion secondary battery electrode-use of claim 7, wherein
the particulate polymer Z is either or both of a styrene-butadiene-based polymer and an acrylic-based polymer.

12. A slurry composition for lithium ion secondary battery electrode-use comprising:
the binder composition for lithium ion secondary battery electrode-use of claim 1; and
an electrode active material.

13. An electrode for lithium ion secondary battery-use comprising:
a current collector; and
an electrode mixed material layer on the current collector, wherein
the electrode mixed material layer is formed using the slurry composition for lithium ion secondary battery electrode-use of claim 12.

14. The electrode for lithium ion secondary battery-use of claim 13, wherein
a degree of coating of the electrode active material calculated by formula (1) shown below
degree of coating of electrode active material=(BET specific surface area of electrode active material−BET specific surface area of electrode)/BET specific surface area of electrode active material (1)
is at least 0.25 and no greater than 0.70.

15. A lithium ion secondary battery comprising
a positive electrode, a negative electrode, an electrolysis solution, and a separator, wherein
either or both of the positive electrode and the negative electrode are the electrode for lithium ion secondary battery-use of claim 13.

16. The binder composition for lithium ion secondary battery electrode-use of claim 1, wherein
the ethylenically unsaturated carboxylic acid compound (A) is either or both of acrylic acid and an acrylic acid salt.

17. The binder composition for lithium ion secondary battery electrode-use of claim 1, wherein
the compound (B) is acrylamide.

18. The binder composition for lithium ion secondary battery electrode-use of claim 16, wherein
the compound (B) is acrylamide.

* * * * *